(12) United States Patent
Palat et al.

(10) Patent No.: US 11,438,954 B2
(45) Date of Patent: Sep. 6, 2022

(54) UNIFYING SPLIT BEARERS IN LTE INTERWORKING

(71) Applicant: Apple Inc., Cupertino, CA (US)

(72) Inventors: Sudeep Palat, Gloucestershire (GB); Seau Lim, Wiltshire (GB); Yujian Zhang, Beijing (CN); Richard Burbidge, Oxfordshire (GB); Youn Hyoung Heo, Seoul (KR); Pingping Zong, Randolph, NJ (US)

(73) Assignee: Apple Inc., Cupertino, CA (US)

( * ) Notice: Subject to any disclaimer, the term of this patent is extended or adjusted under 35 U.S.C. 154(b) by 415 days.

(21) Appl. No.: 16/465,398

(22) PCT Filed: May 5, 2018

(86) PCT No.: PCT/US2018/031272
§ 371 (c)(1),
(2) Date: May 30, 2019

(87) PCT Pub. No.: WO2018/204899
PCT Pub. Date: Nov. 8, 2018

(65) Prior Publication Data
US 2021/0282213 A1  Sep. 9, 2021

Related U.S. Application Data

(60) Provisional application No. 62/501,879, filed on May 5, 2017.

(51) Int. Cl.
*H04W 72/12* (2009.01)
*H04L 5/00* (2006.01)
(Continued)

(52) U.S. Cl.
CPC ........... *H04W 76/27* (2018.02); *H04W 76/15* (2018.02)

(58) Field of Classification Search
None
See application file for complete search history.

(56) References Cited

U.S. PATENT DOCUMENTS 10,681,598 B1 * 6/2020 Sitaram ........... H04W 36/00837
10,834,771 B2 * 11/2020 Sharma ............... H04W 12/037
(Continued)

FOREIGN PATENT DOCUMENTS

WO  2016021890 A1  2/2016

OTHER PUBLICATIONS

NTT Docomo et al: "Further Analysis of unified split bearer—UE procedure aspects", R2-1704343—3rd Generation Partnership Project (3GPP)—May 3, 2017.
(Continued)

*Primary Examiner* — Sithu Ko
(74) *Attorney, Agent, or Firm* — Eschweiler & Potashnik, LLC

(57) ABSTRACT

Techniques for unifying split bearers at user equipment (UE) in an Evolved-Universal Terrestrial Radio Access-New Radio (E-ULTRA NR) dual connectivity (EN-DC) environment are described. According to various such techniques, a radio resource control (RRC) message can include an encapsulated configuration for a secondary cell group (SCG). Packet data convergence protocol (PDCP) configurations for MN or SN split bearers can be included in the master cell group (MCG) configuration in the RRC message or in the encapsulated SCG configuration. In some examples, an RRC message can include an encapsulated SCG configuration and an encapsulated PDCP configuration, where the encapsulated PDCP configuration including PDCP configuration information for the MN or SN split bearer. Other embodiments are described and claimed.

24 Claims, 44 Drawing Sheets

(51) Int. Cl.
*H04W 76/27* (2018.01)
*H04W 76/15* (2018.01)

(56) References Cited

U.S. PATENT DOCUMENTS

| | | | | |
|---|---|---|---|---|
| 10,834,772 | B2* | 11/2020 | Wang | H04W 76/11 |
| 2015/0215965 | A1* | 7/2015 | Yamada | H04W 36/0069 370/329 |
| 2015/0264562 | A1* | 9/2015 | Wu | H04W 12/04 380/270 |
| 2016/0057687 | A1* | 2/2016 | Horn | H04W 24/10 370/331 |
| 2017/0222876 | A1* | 8/2017 | Van Der Velde | H04W 36/0055 |
| 2017/0332354 | A1* | 11/2017 | Chang | H04M 3/42289 |
| 2018/0092085 | A1* | 3/2018 | Shaheen | H04W 76/16 |
| 2018/0227805 | A1* | 8/2018 | Jang | H04W 72/1215 |
| 2018/0367990 | A1* | 12/2018 | Ingale | H04W 74/0833 |
| 2019/0045398 | A1* | 2/2019 | Chai | H04L 5/0057 |
| 2019/0159274 | A1* | 5/2019 | Hong | H04W 76/15 |

OTHER PUBLICATIONS

Intel Corporation: "RRC aspects for LTE-NR interworking", R2-163587, 3rd Generation Partnership Project (3GPP)—May 22, 2016.
Ericsson: "Overview of RRC Architecture options for the LTE-NR tight interworking", R2-164005—3rd Generation Partnership Project (3GPP)—May 22, 2016.
Intel Corporation: "RRC aspects of unifying split bearer types", R2-1704798—3rd Generation Partnership Project (3GPP)—May 6, 2017.
International Search Report and Written Opinion for the International Patent Application No. PCT/US2018/031272, dated Aug. 7, 2018, 10 pages.

* cited by examiner

400

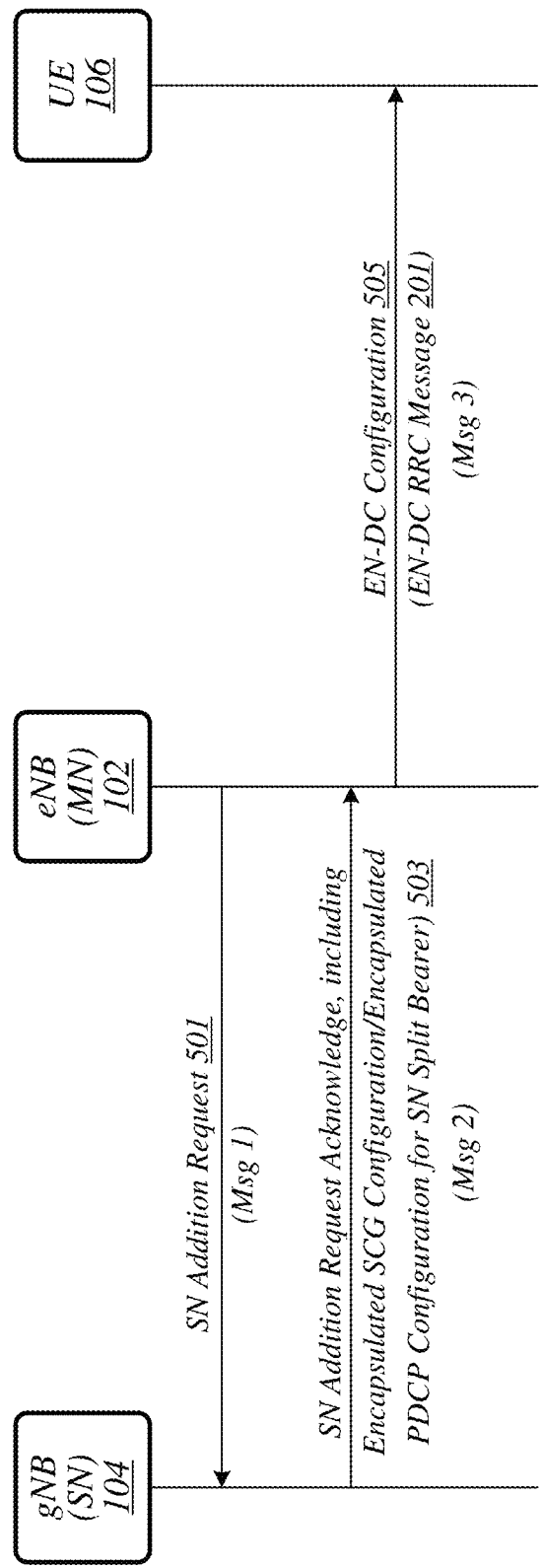

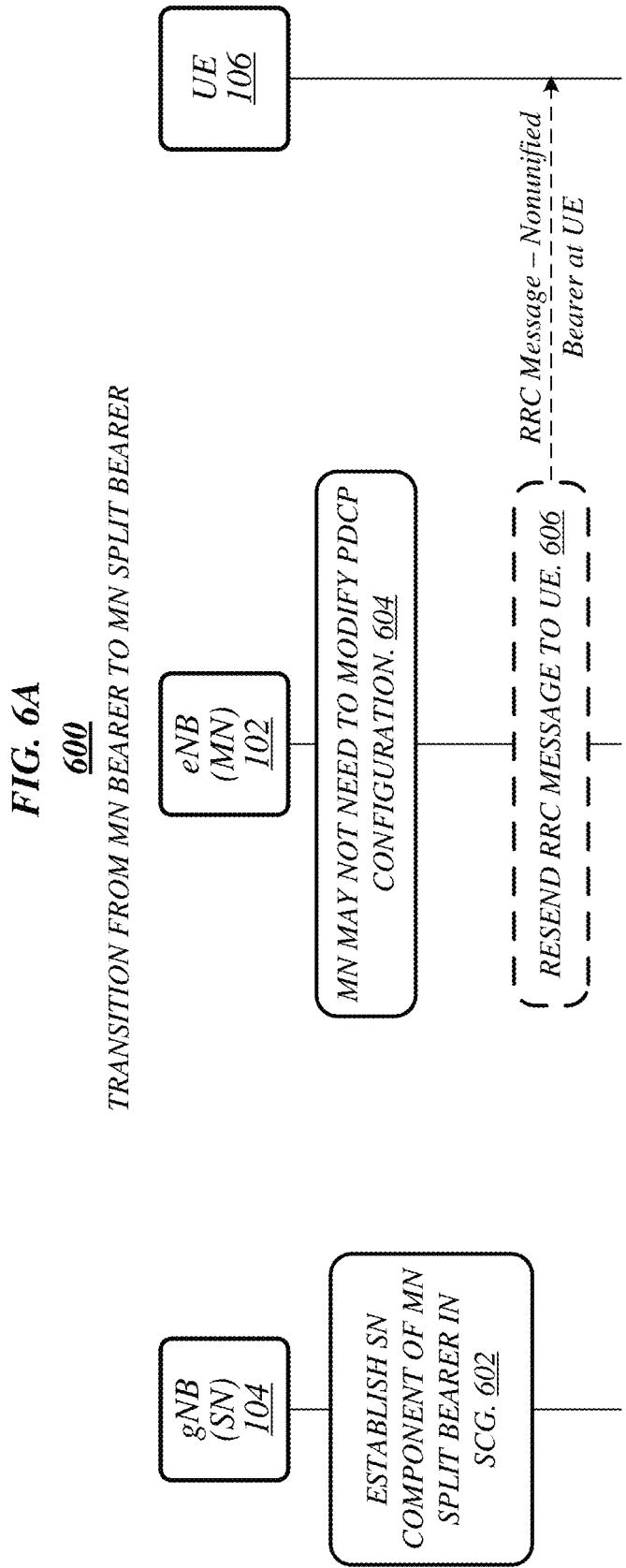

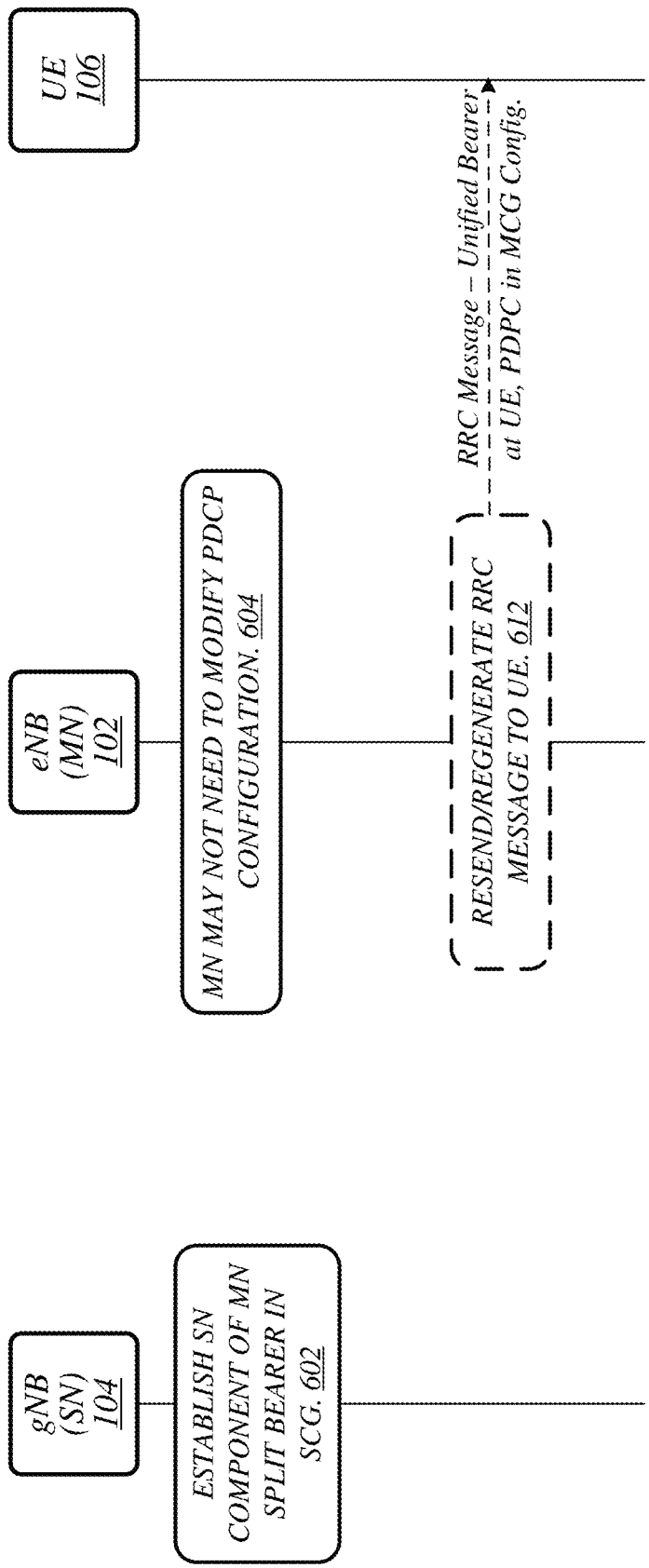

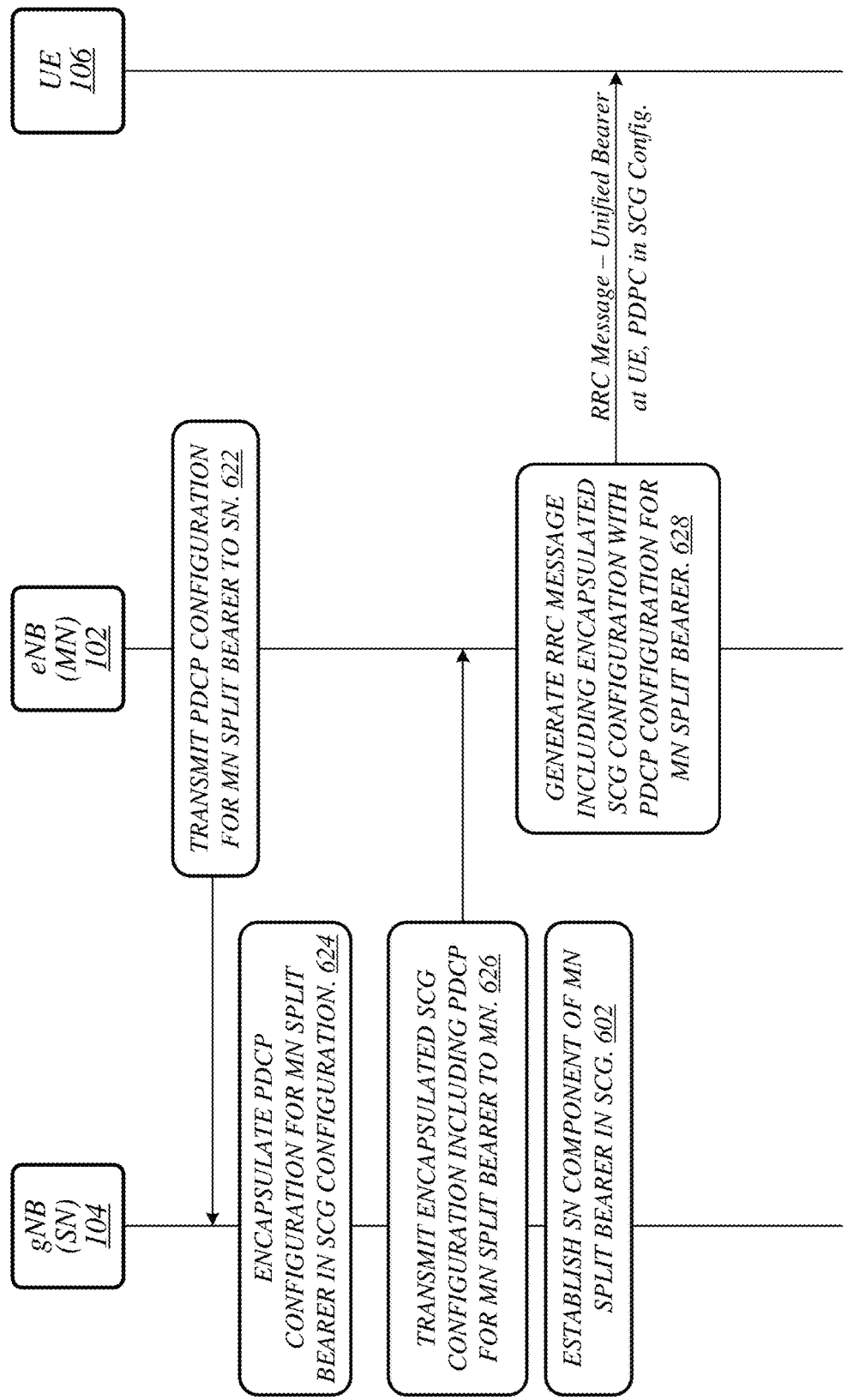

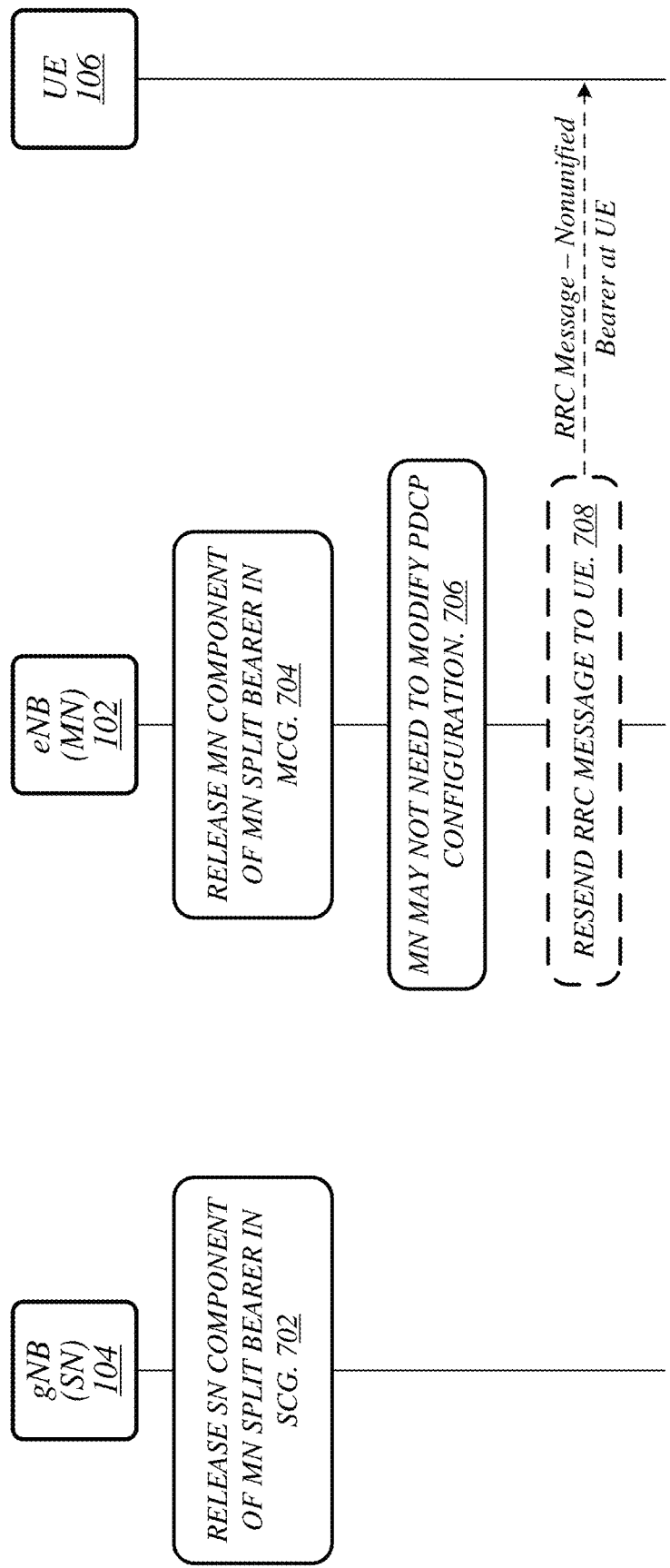

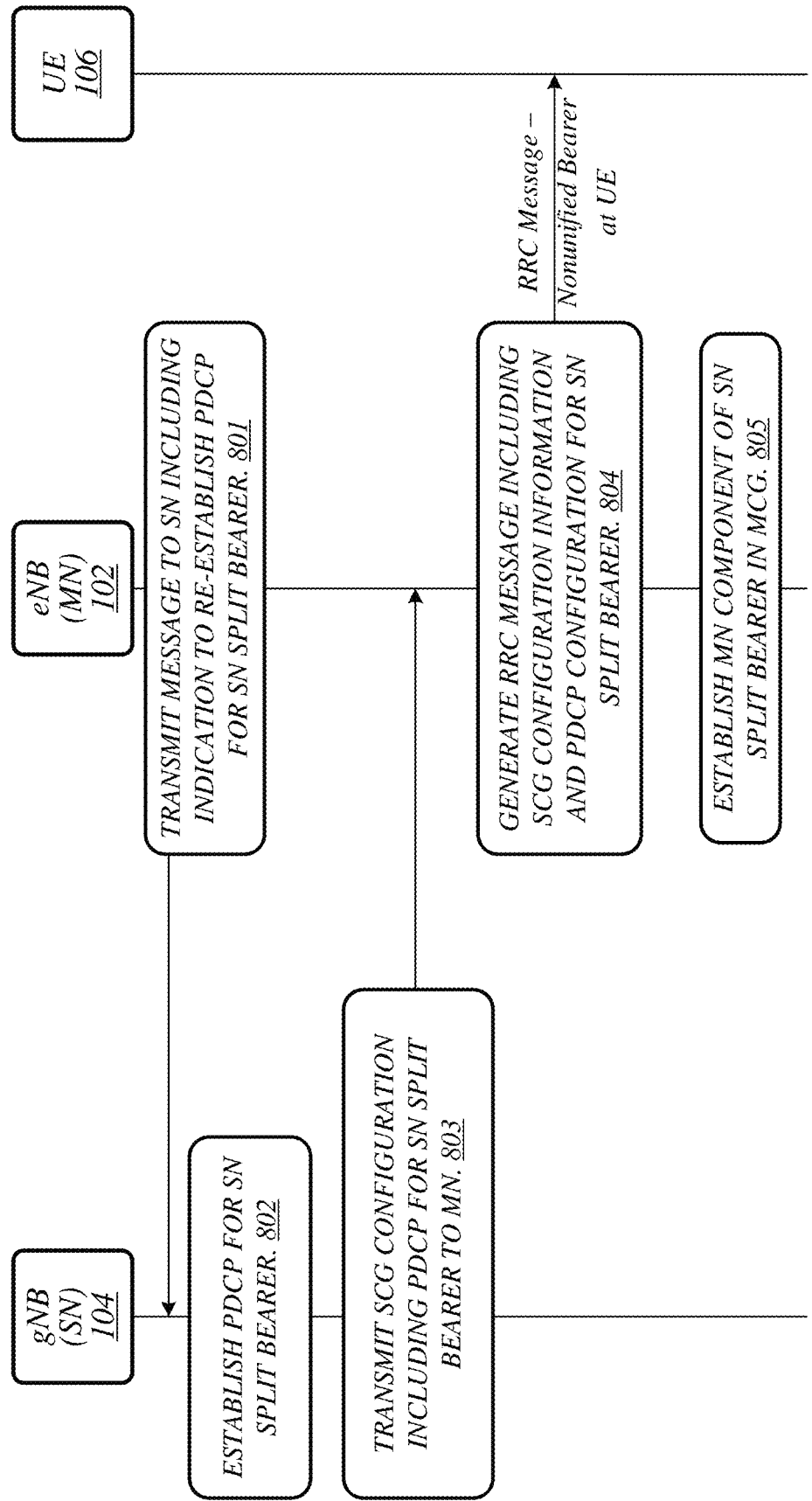

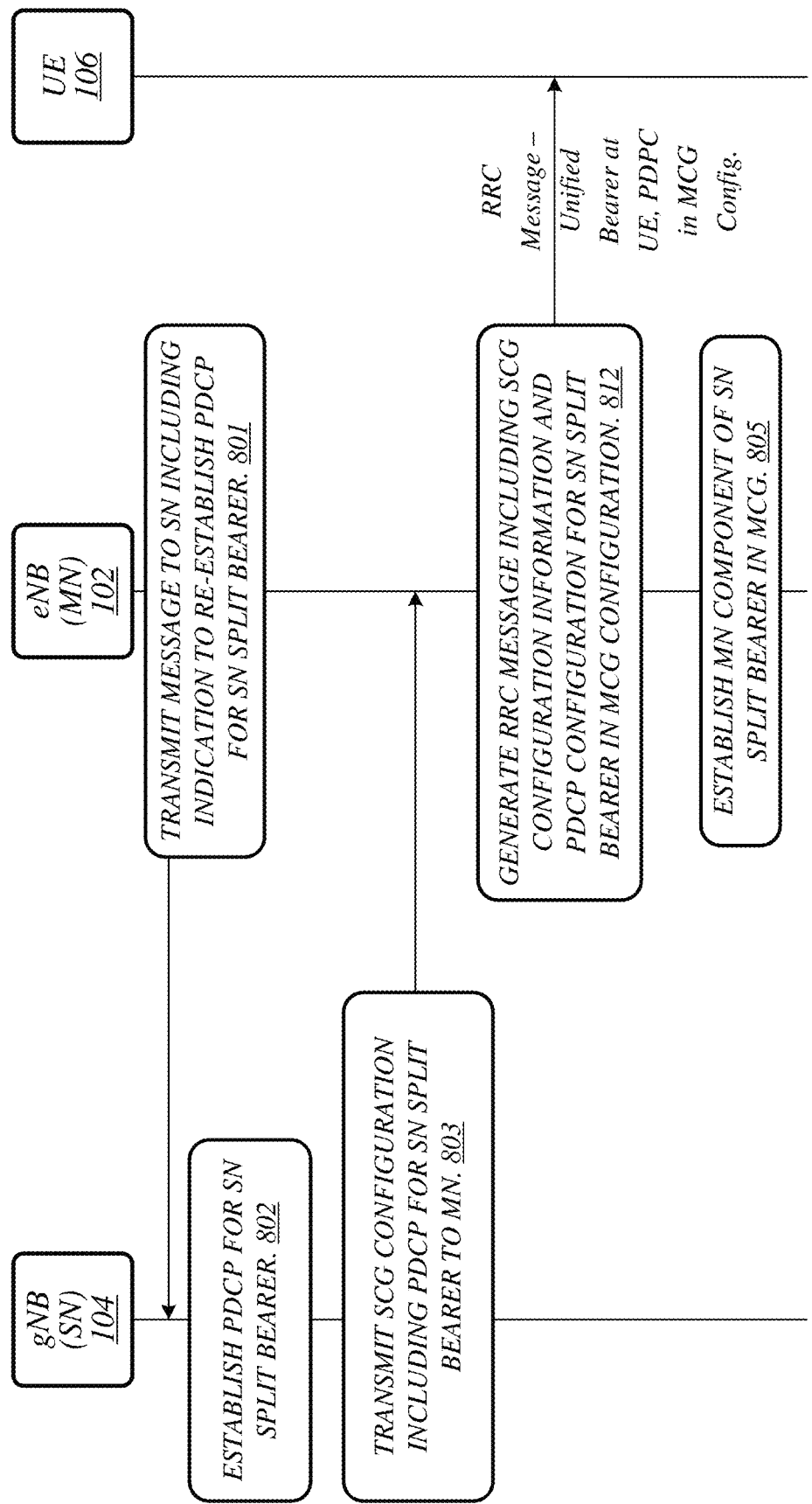

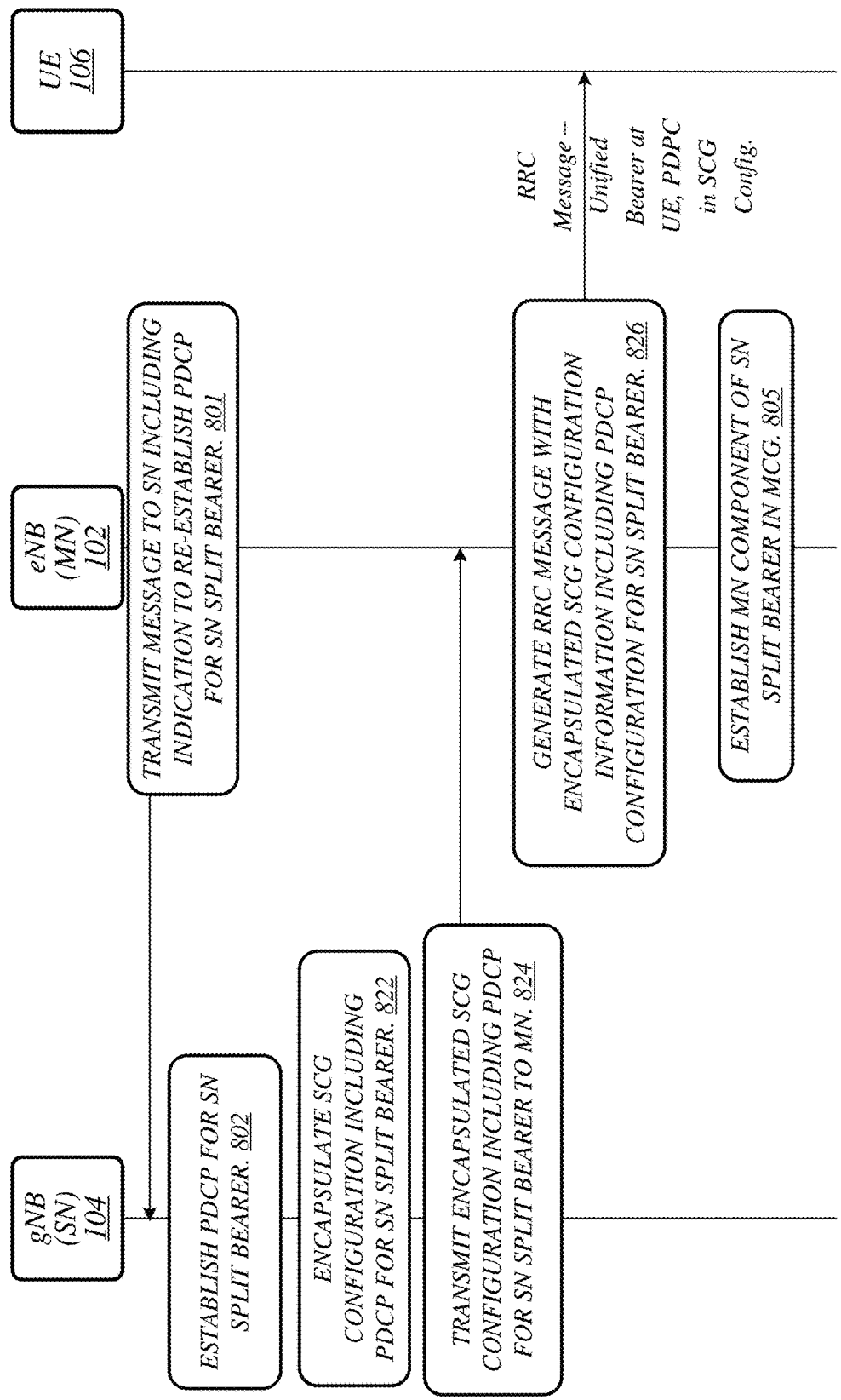

830
TRANSITION FROM MN BEARER TO SN SPLIT BEARER

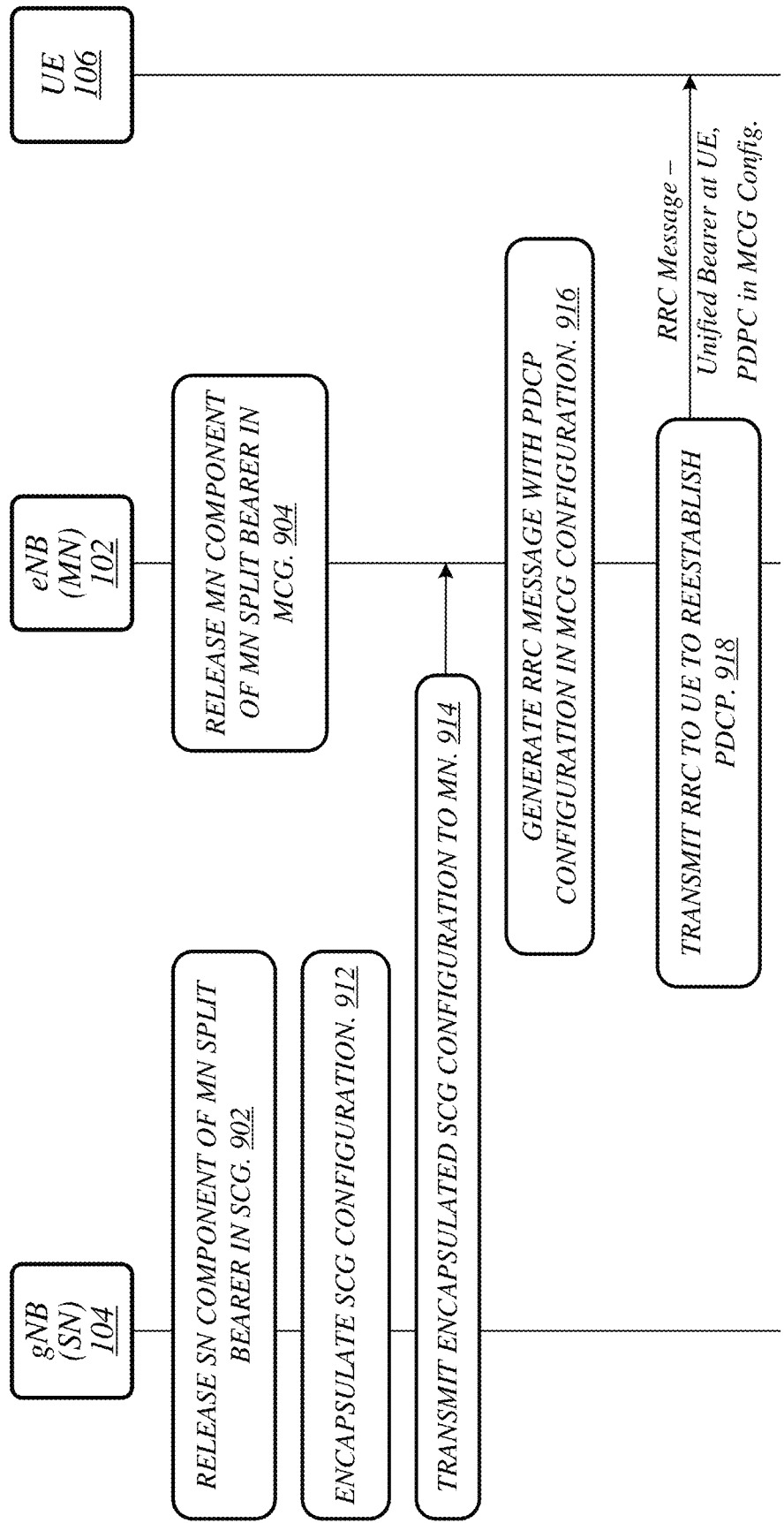

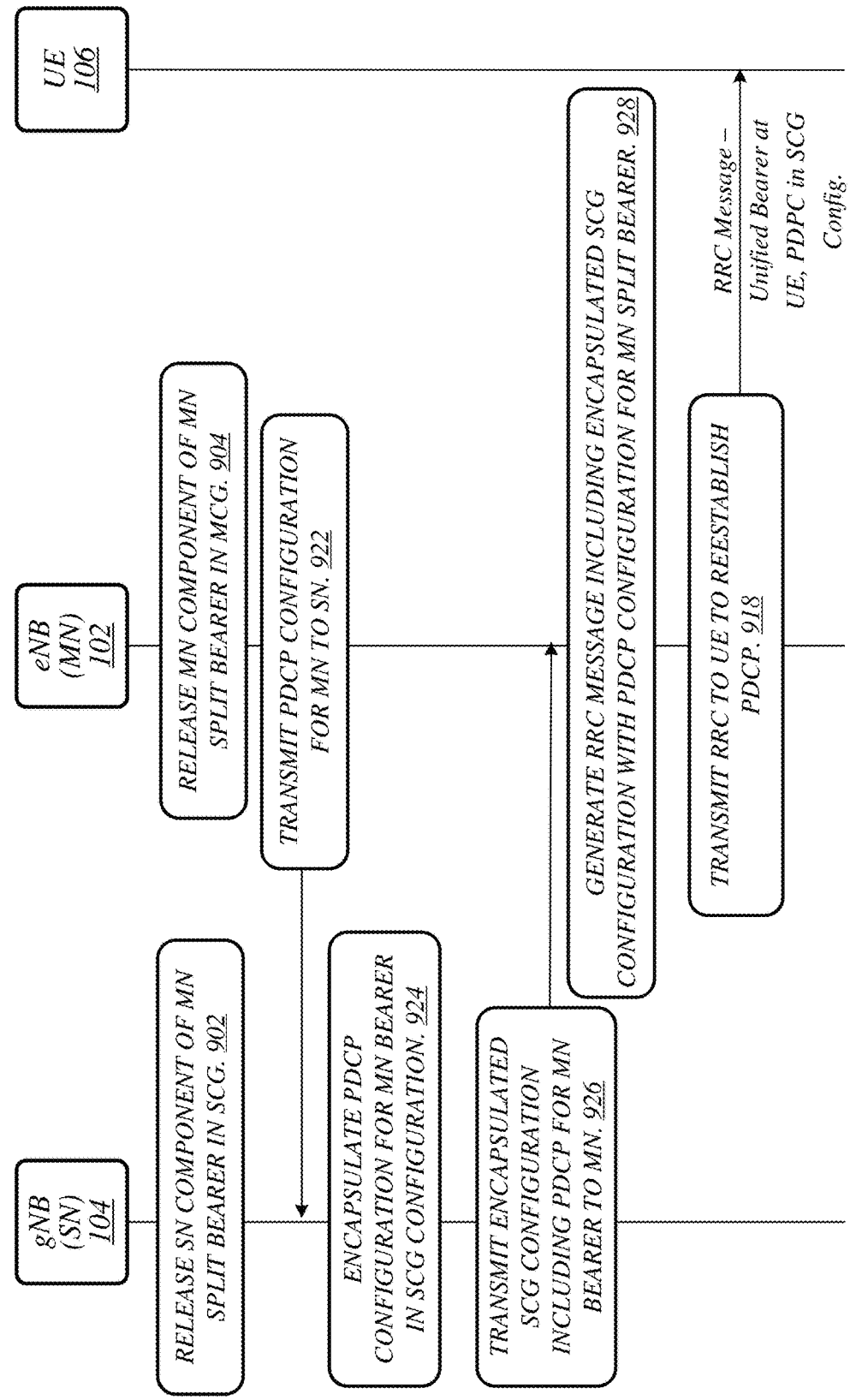

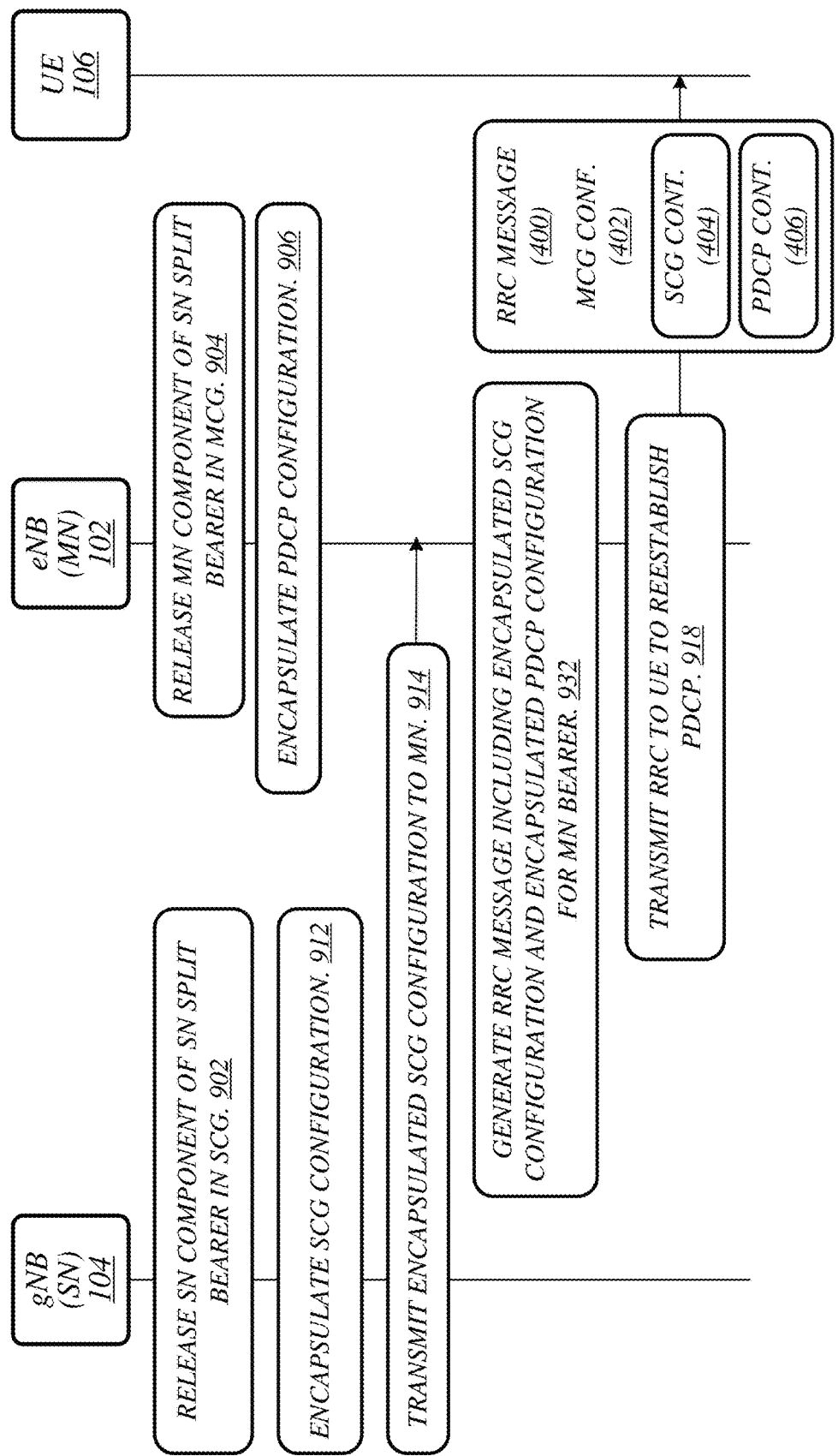

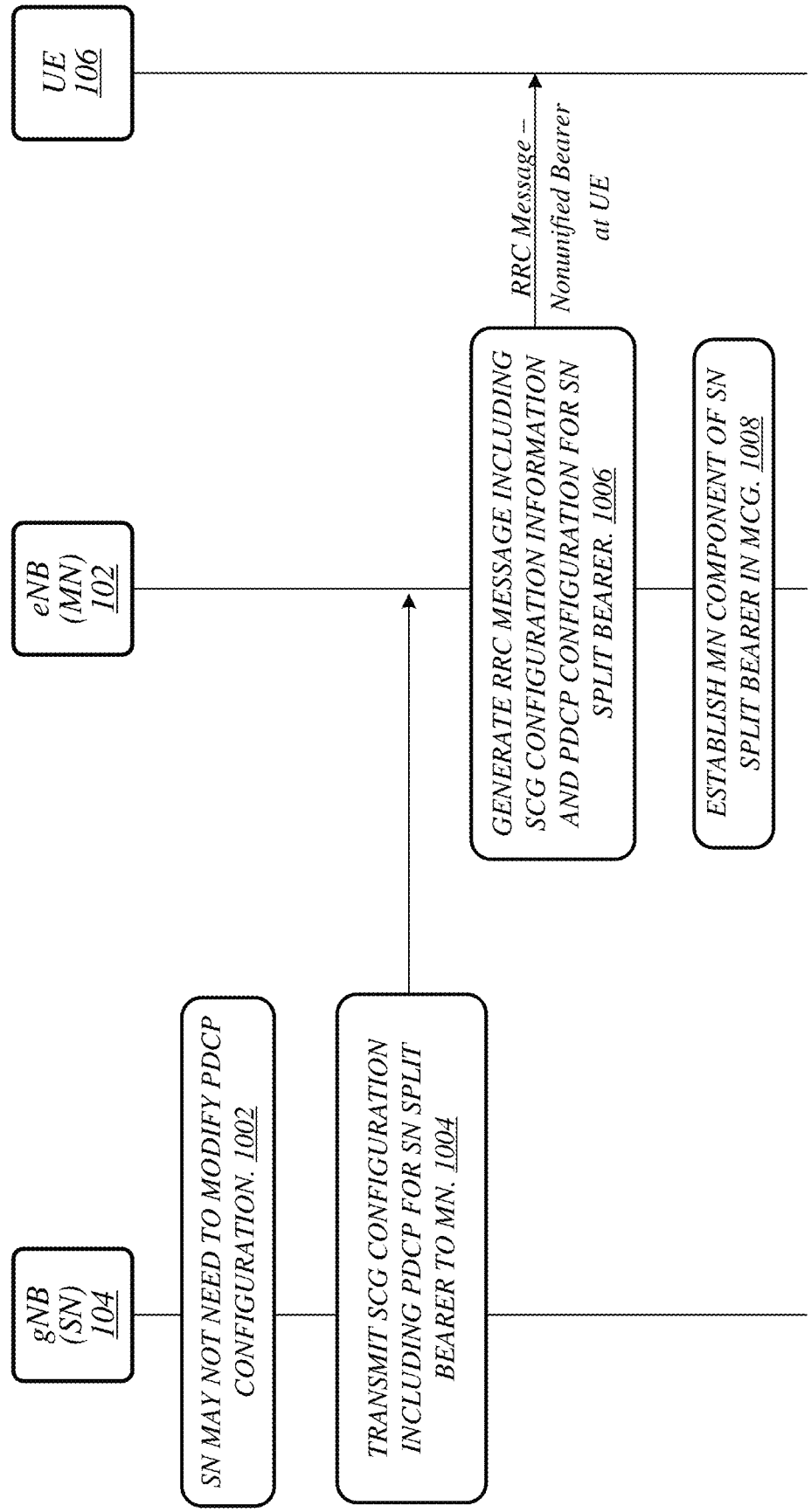

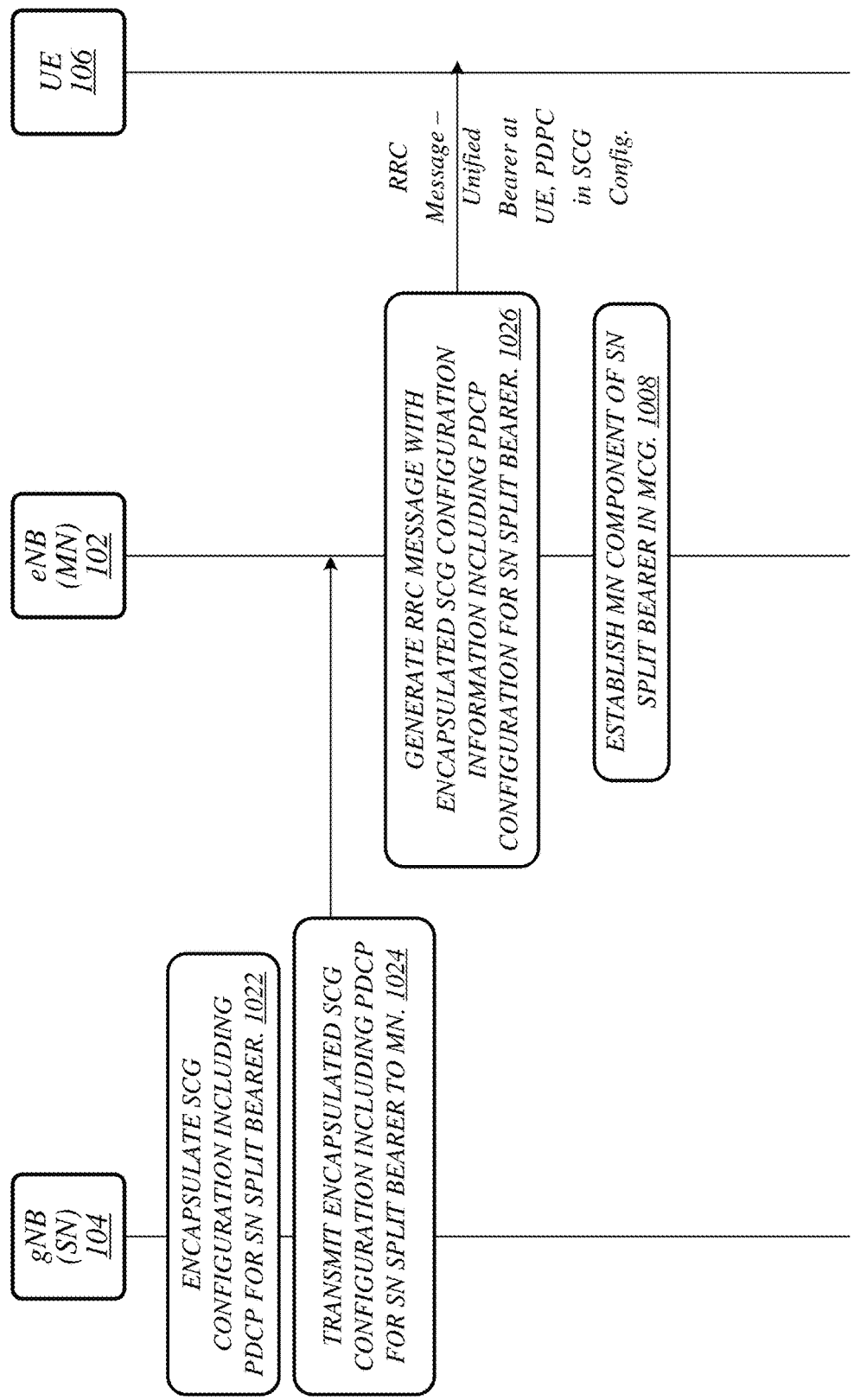

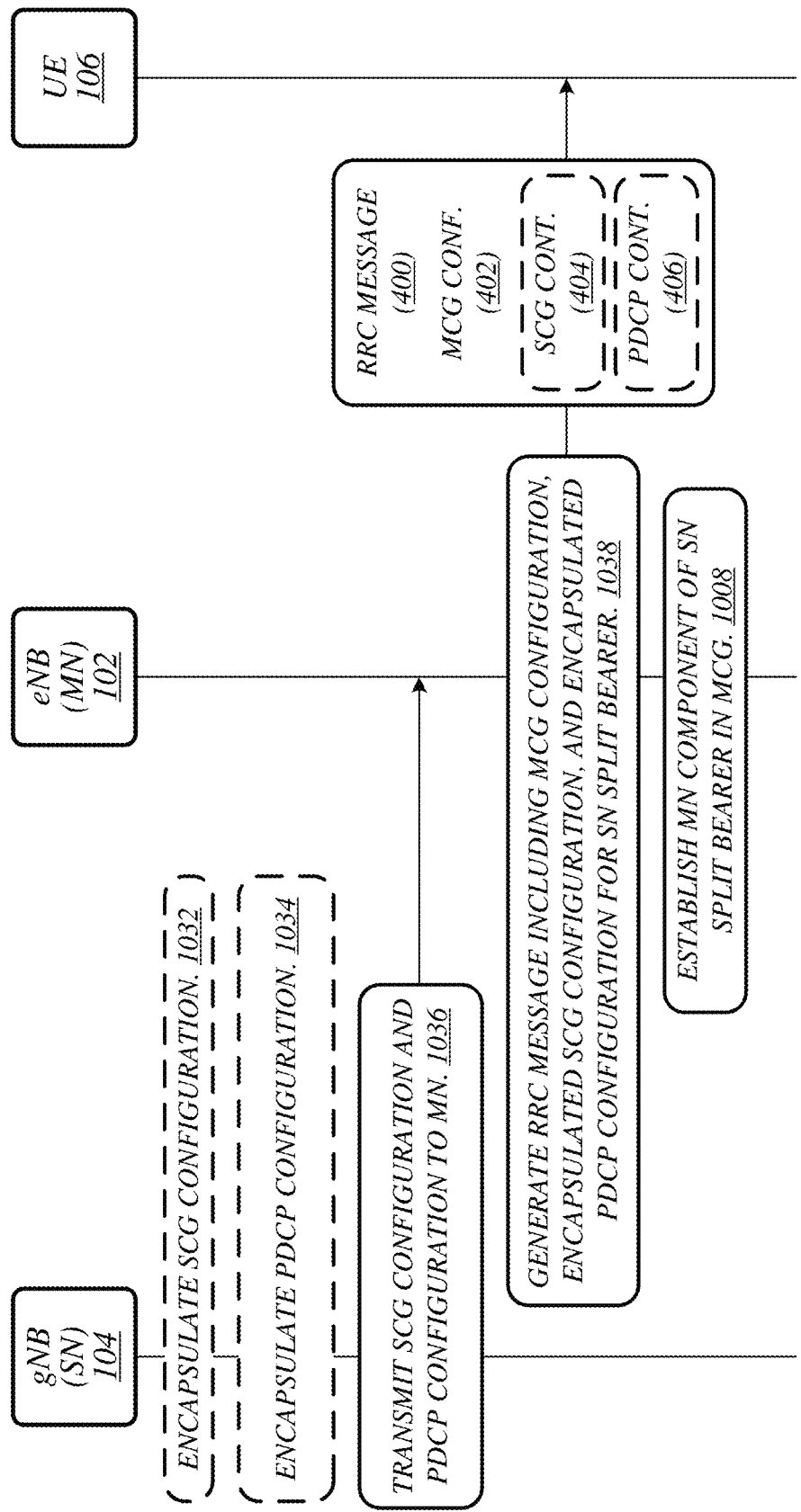

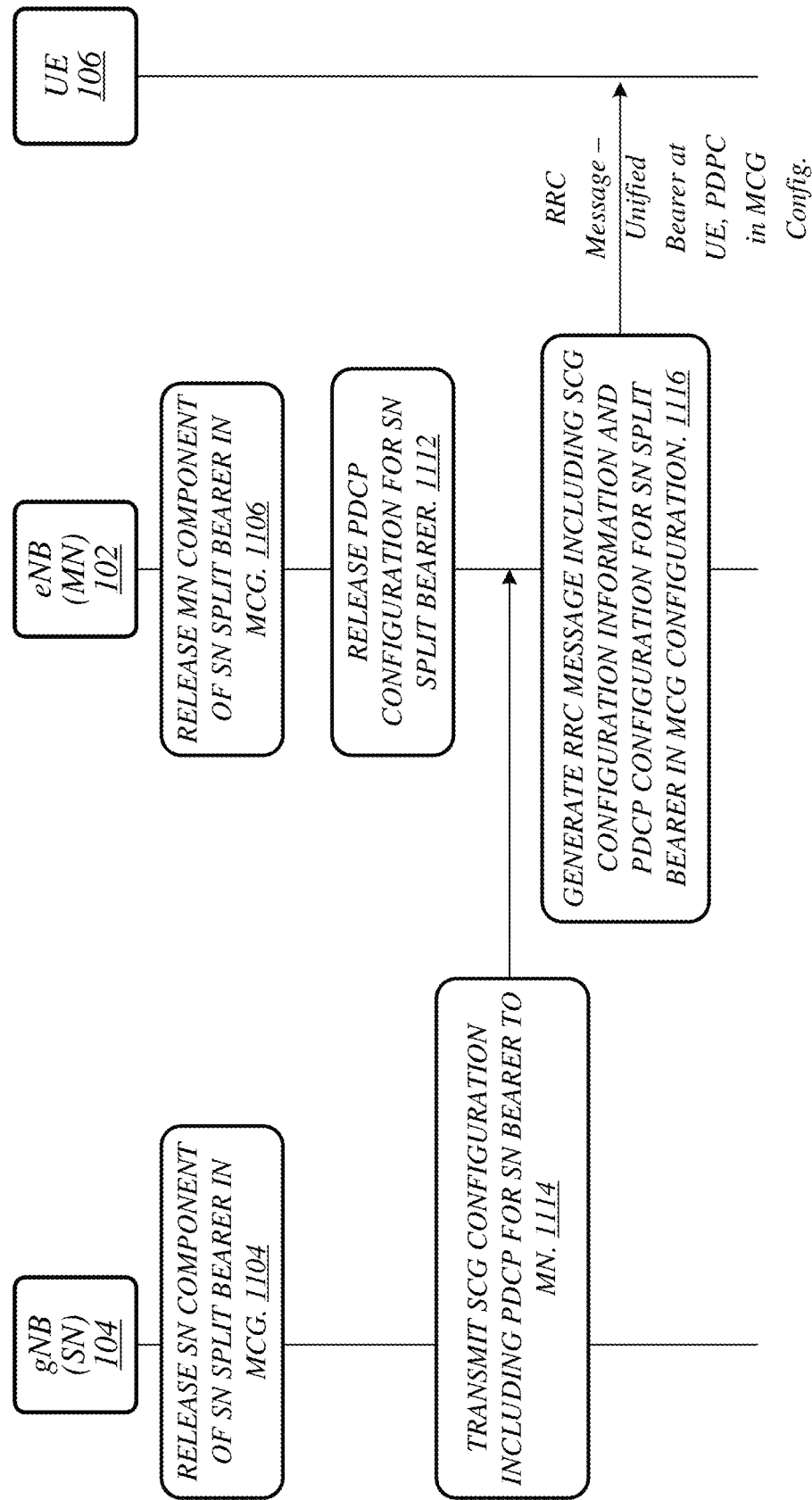

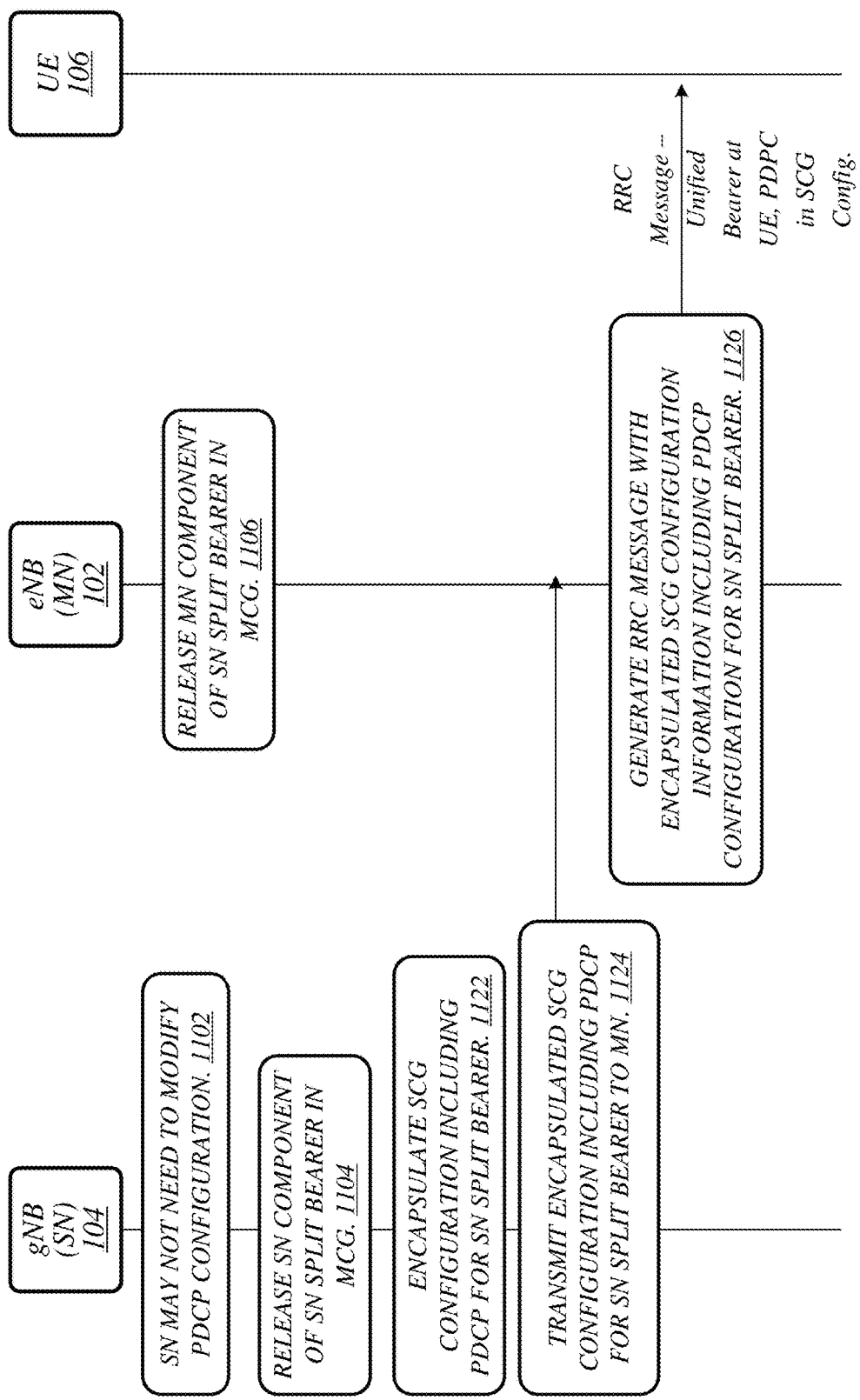

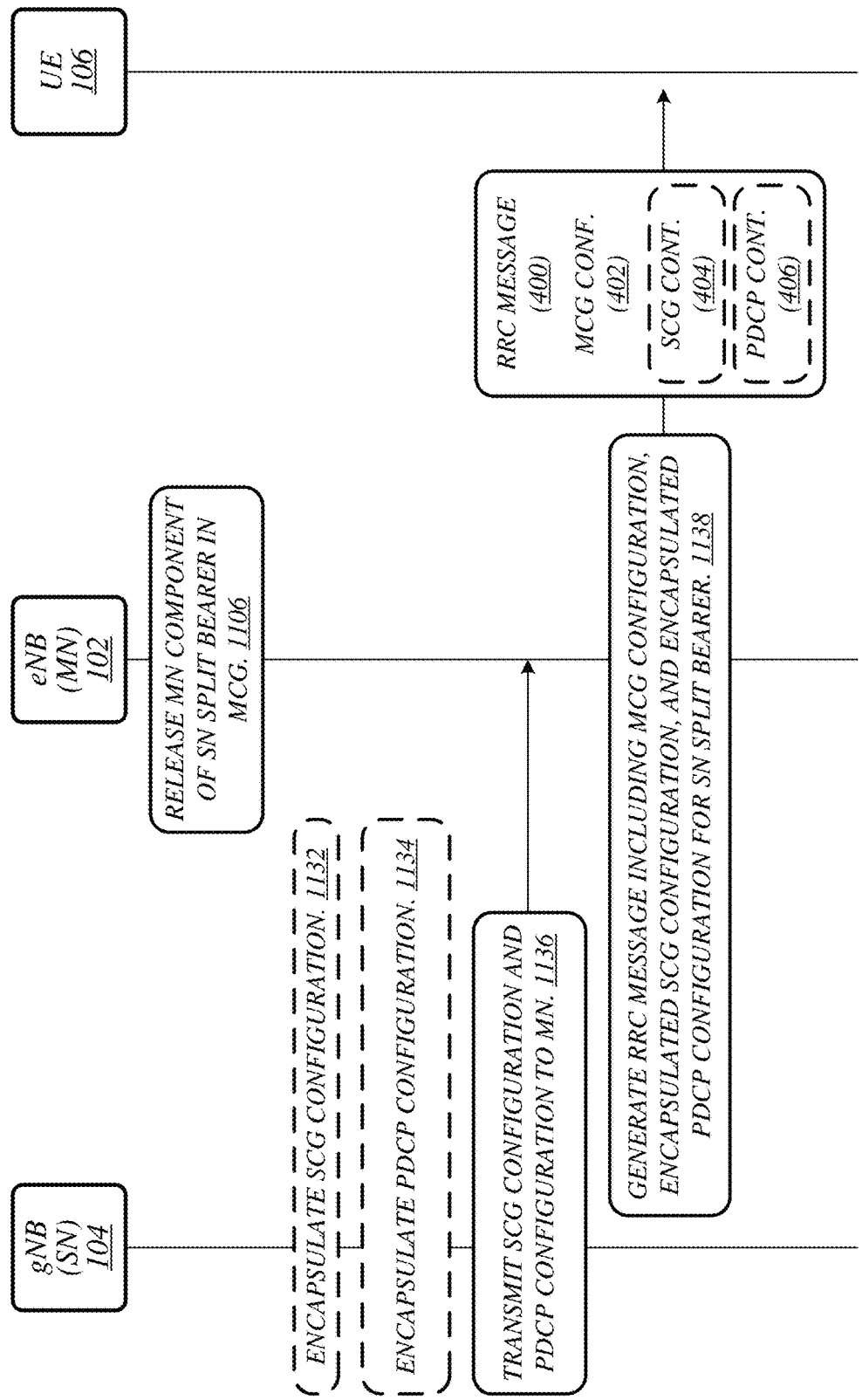

1200

1300

1400

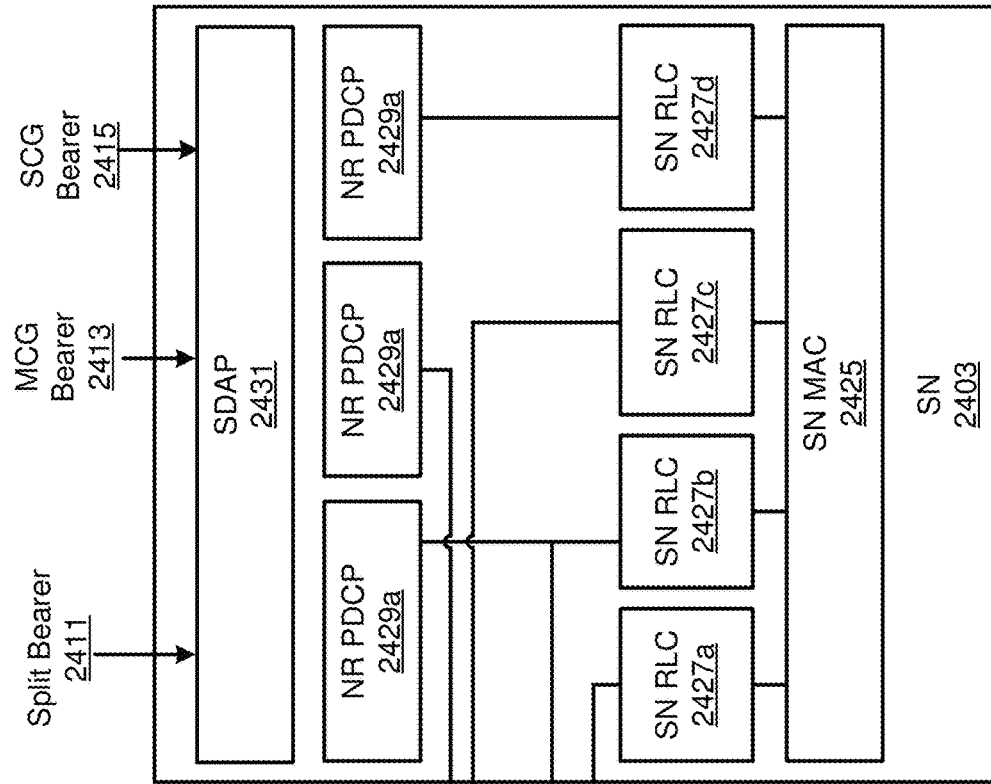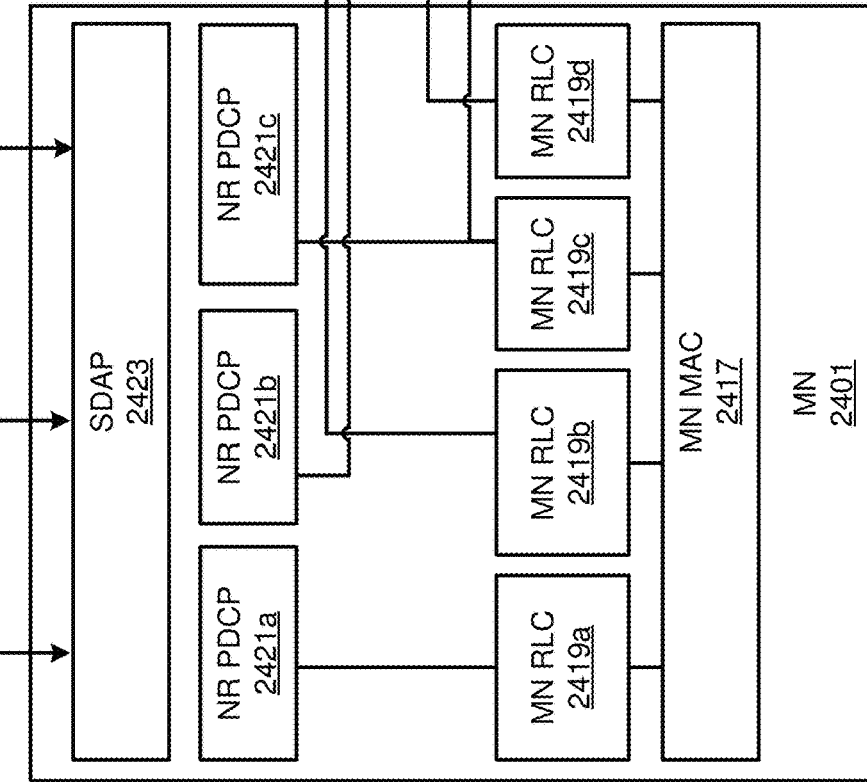
FIG. 24

UNIFYING SPLIT BEARERS IN LTE INTERWORKING

CROSS-REFERENCE TO RELATED APPLICATIONS

This application is a national phase application claiming the benefit of and priority to International Patent Application No. PCT/US2018/031272, entitled "UNIFYING SPLIT BEARERS IN LTE INTERWORKING", filed May 5, 2018, which claims priority to U.S. Provisional Patent Application No. 62/501,879, filed May 5, 2017, entitled "UNIFYING SPLIT BEARERS IN LTE INTERWORKING", which are hereby incorporated by reference in their entireties.

TECHNICAL FIELD

Embodiments herein generally relate to communications between devices in broadband wireless communications networks.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to provide simple and seamless wireless connectivity solutions. NR is intended to enable everything connected by wireless while delivering fast, rich content and services.

BRIEF DESCRIPTION OF THE DRAWINGS

FIG. 5 illustrates a second embodiment of a communication flow.

FIGS. 6A-6D illustrates embodiments of third, fourth, fifth, and sixth communication flows.

FIGS. 7A-7D illustrates embodiments of seventh, eighth, ninth, and tenth communication flows.

FIGS. 8A-8D illustrates embodiments of eleventh, twelfth, thirteenth, and fourteenth communication flows.

FIGS. 9A-9D illustrates embodiments of fifteenth, sixteenth, seventeenth, and eighteenth communication flows.

FIGS. 10A-10D illustrates embodiments of nineteenth, twentieth, twenty first, and twenty second communication flows.

FIGS. 11A-11D illustrates embodiments of twenty third, twenty fourth, twenty fifth, and twenty sixth communication flows.

FIG. 24 illustrates an embodiment of second example of bearer termination options on the network side.

DETAILED DESCRIPTION

Figure 1:
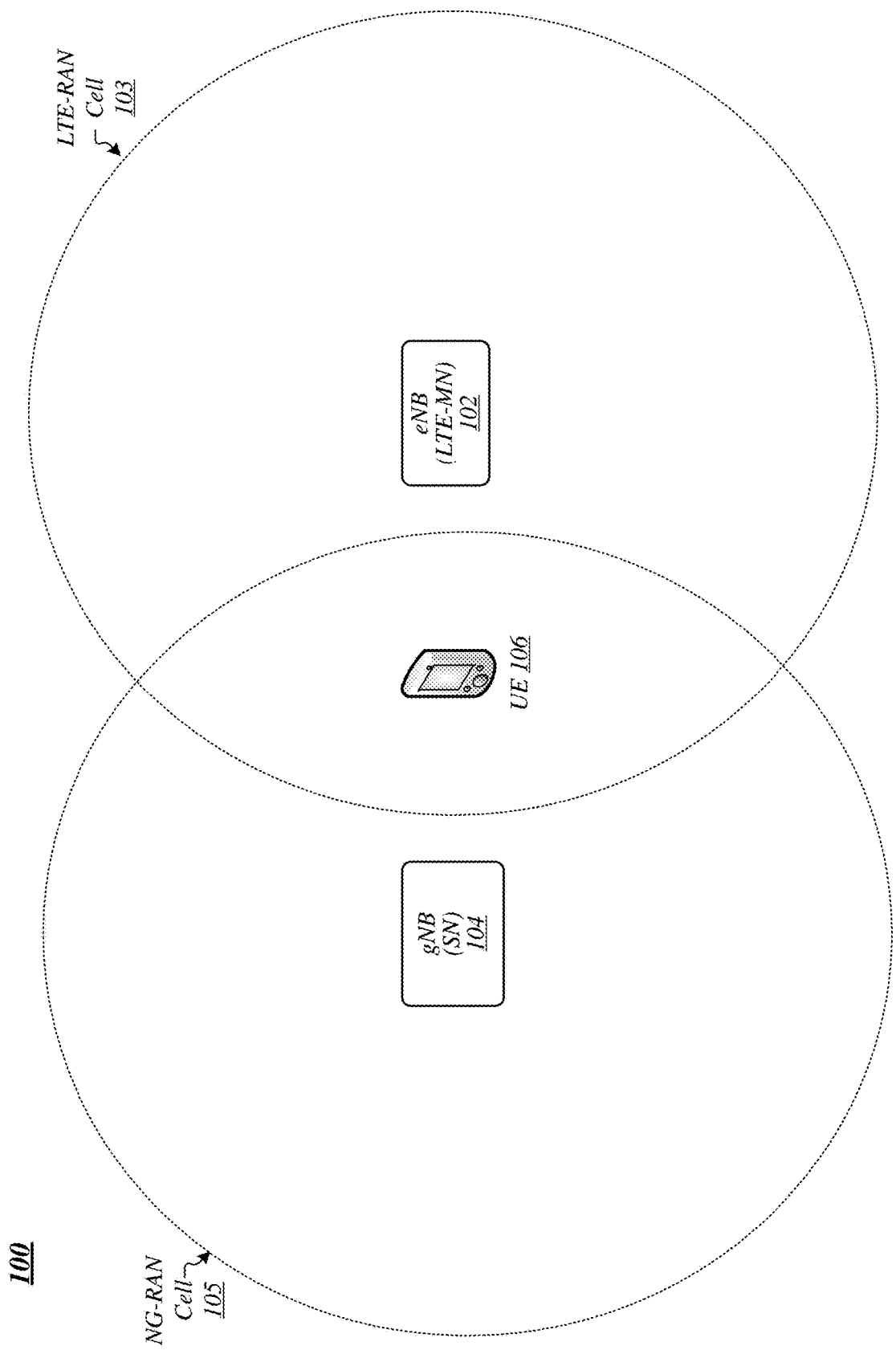
FIG. 1 illustrates an embodiment of a first operating environment.

A User equipment (UE) can simultaneously communicate with multiple base stations. For example, Evolved-Universal Terrestrial Radio Access-New Radio (E-ULTRA NR) provides for dual connectivity (EN-DC) for a UE, where the UE can simultaneously connect to an NR base station and an LTE base station. This is facilitated with LTE-NR interworking. As an example, the UE can connect to an NR base station for the user plane and the LTE base station for the control plane. LTE-NR interworking uses split bearers to send data over LTE and NR in a dual connectivity configuration as detailed above. Two different types of split bearers are defined; master node (MN) and secondary node (SN) split bearers.

In general, the present disclosure provides a configuration wherein MN and SN split bearers can be unified for the UE. Thus, the present disclosure provides that MN and SN split bearer deployments and configurations can be hidden from the UE by unifying them within the UE configuration, while still being available as options on the network side. For example, the present disclosure provides a container for the packet data convergence protocol (PDCP) configuration, wherein the container can be populated with MN and SN split bearers. Each of the MN and SN split bearers can have independent configuration of security keys or algorithms as part of the PDCP configuration.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), 3GPP LTE-Advanced (LTE-A), 3GPP LTE-Advanced Pro, and/or 3GPP fifth generation (5G)/new radio (NR) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11ah, IEEE 802.11ax, IEEE 802.11ay, and/or IEEE 802.11y standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards, and/or near-field communication (NFC) standards such as standards developed by the NFC Forum, including any revisions, progeny, and/or variants of any of the above. The embodiments are not limited to these examples.

FIG. 1 illustrates an example of an operating environment 100 that may be representative of various embodiments. In operating environment 100, an evolved node B (eNB) 102 serves an LTE (LTE) radio access network (RAN) cell 103. LTE-RAN cell 103 may generally be representative of a radio access network cell within which wireless communications are performed in accordance with 3rd Generation Partnership Project (3GPP) Long-Term Evolution (LTE) radio interface protocols. Operating environment 100 further includes a next generation node B (gNB) 104, which serves a next generation RAN (NG-RAN) cell 105. NG-RAN cell 105 may generally be representative of a radio access network cell within which wireless communications are performed in accordance with 3rd Generation Partnership Project (3GPP) fifth generation (5G) new radio (NR) radio interface protocols. In some examples, the NG-RAN cell 105 may be a small cell within the LTE-RAN cell 103. Examples are not limited in this context.

User equipment (UE) 106 located within LTE-RAN cell 103 and NG-RAN cell 105 may wirelessly communicate with both eNB 102 and gNB 104 according to such protocols in conjunction with establishing and utilizing wireless data connectivity via both eNB 102 and gNB 104. For example, UE 106 may communicate with eNB 102 and gNB 104 in accordance with EN-DC (also referred to as Non-standalone) and LTE-NR interworking communication protocols. In such a communication configuration, the eNB 102 may be referred to as the master node (MN) and the LTE-RAN cell 103 is referred to as the master cell group (MCG), or as part of a MCG; while the gNB 104 can be referred to as the secondary node (SN) and the NG-RAN cell 105 is referred to as the secondary cell group (SCG), as part of a SCG. Wireless communication between UE 106 and MN 102 and SN 104 can be established via an RRC framework, such as, for example, an EN-DC RRC framework.

It is noted, that is some examples, the MCG may comprise a number of LTE-RAN cells 103 and the SCG may comprise a number of NR-RAN cells 105, such as, for example, may be implemented using Carrier Aggregation. With some examples, MCG may comprise a different number of LTE-RAN cells 103 than SCG comprises NR-RAN cells 105. Furthermore, it is noted that the present disclosure uses the configuration described above where the MN is eNB 103 and the SN is gNB 104. This configuration is depicted and referenced throughout for purposes of clarity. However, other configurations could be provided that implement the techniques described herein. For example, in some embodiments, the MN and MCG could correspond to a gNB and NR-RAN cell while the SN and SCG correspond to an eNB and LTE-RAN cell. Such a configuration is referred to as NG-(R)AN Supported NR-E-UTRA DC (NE-DC). In other embodiments, the eNB may be connected to the 5G Core network in a configuration referred to as m ng-EN-DC. In yet other embodiments, both the MN and MCG as well as the SN and SCG could be from respective gNBs and NR-RAN cells. Examples are not limited in this context.

RRC defines the signaling and behaviors undertaken between the UE 106 and network (e.g., the eNB 102 and the gNB 104). RRC encompasses connection reconfiguration, measurement, and reporting, which in turn enables effective communication and seamless mobility for the UE 106 through the network (e.g., LTE-RAN cell 103, NG-RAN cell 105, etc.). The UE 106 must be configured to operate in accordance with the RRC signaling for both the eNB 102 and the gNB 104. RRC messages are typically used to configure the UE 106 for communication with the eNB 102 and gNB 104 via packet data convergence protocol (PDCP). A number of radio bearers (RBs) can be setup between the UE and network. There are two types of Radio bearers, Signalling Radio bearer (SRB) and Data Radio Bearer (DRB). SRB is used to carry RRC and NAS other signalling messages and DRB is used to carry user data between the UE and network. The protocol stack for an SRB is shown in FIGS. 19-24.

In general, when configured for EN-DC, the UE 106 can exchange data via PDCP with the eNB 102 and/or the gNB 104. In some examples, data from a core network (CN)

coupled to eNB 102 or gNB 104 and destined for UE 106 can be split and forwarded to the UE 106 from both the eNB 102 and the gNB 106. This is referred to as a split DRB (or split bearer). In another example of a split bearer, the RRC messages for UE 106 originating at the eNB 103 could be split or duplicated and sent over both LTE-RAN cell 103 and the NR-RAN cell 105. This is referred to as split SRB. Multiple types of split and non-split bearers can be defined, for example:

For MN terminated bearers, the user plane connection to the CN entity is terminated in the MN;

For SN terminated bearers, the user plane connection to the CN entity is terminated in the SN;

The transport of user plane data over the Uu either involves MCG or SCG radio resources or both:

For MCG bearers, only MCG radio resources are involved;

For SCG bearers, only SCG radio resources are involved;

For split bearers, both MCG and SCG radio resources are involved.

For split bearers, MN terminated SCG bearers and SN terminated MCG bearers, PDCP data is transferred between the MN and the SN via the MN-SN user plane interface.

It is noted, that the term "MN bearer" is sometimes used herein to denote an MN terminated MCG bearer while the term "SN bearer" is sometimes used herein to represent an SN terminated SCG bearer. An SN split bearer denotes an SN terminated split bearer and MN split bearer an MN terminated split bearer.

It is to be appreciated that having different split bearer types means supporting many options at the UE 106. The present disclosure provides for unifying the split bearers at the UE 106 such that, from the perspective of UE 106, there is only one split bearer type irrespective of the location of the termination point (PDCP) in the network. An advantage is that UE 106 implementations/operations can be simplified as there is a need to only consider one split bearer type. Furthermore, the number of bearer type changes needing to be supported and carried out during operation can be reduced. However, from the perspective of the network (e.g., MCG 103 including the eNB 102 and SCG 105 containing the gNB 104), both bearer types still exist and the PDCP could be terminated in either the MN 102 or the SN 104.

Figure 2:
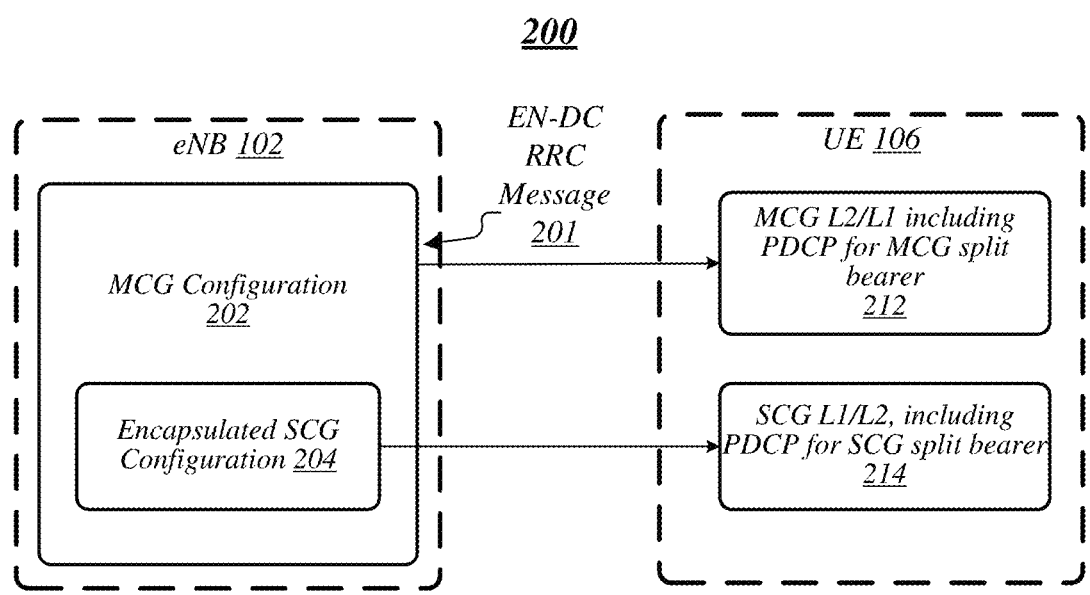
FIG. 2 illustrates a first embodiment of an RRC message structure.

FIG. 2 illustrates an EN-DC RRC signaling structure 200 that may be representative of the implementation of an RRC signaling structure according to various embodiments. As shown in FIG. 2, the RRC signaling structure 200 includes an RRC message 201 that itself includes an MCG configuration 202 and an encapsulated SCG configuration 204. The EN-DC RRC message 201 can be generated by the MN 102 (e.g., the eNB 102) from environment 100. The encapsulated SCG configuration can correspond to RRC configuration information received at MN 102, from the SN 104 (e.g., the gNB 104), for example, during an initiation of EN-DC for the environment 100.

In general, the MCG configuration 202 and the encapsulated SCG configuration 204 each contain radio resource configuration information for the respective MN or SN protocol stacks. As such, each RRC entity (or component) within the UE 106 can configure its protocol stack (e.g., layers, or the like) based on the configuration information for the respective MN or SN domains. For example, UE 106 can receive an RRC message from MN 102 including indications of MCG configuration 202 and encapsulated SCG configuration 204. UE 106 can use the configuration information to configure various layers (e.g., Layer 1, Layer 2, etc.) of the UE 106 to communicate via the protocol stack, including PDCP within the respective MCG or SCG. For example, UE 106 can use received MCG configuration information 212 to configure layers of UE 106 for PDCP and lower layers with eNB 102 of MCG 103 including an MN terminated split bearer configuration (sometimes referred to as MCG split bearer). Similarly, UE 106 can use received SCG configuration information 214 to configure layers of UE 106 for PDCP and lower layers with gNB 104 of SCG 105 including an SN terminated split bearer configuration (sometimes referred to as SCG split bearer). As used herein, layer 1 (or L1) can mean a physical communications interface or layer, layer 2 (or L2) can mean MAC, RLC and PDCP layers. The term lower layers can refer to any L1 or L2 layer, such as, L2 RLC and MAC, L1, or any physical layer. Examples of these layers are given in greater detail below (e.g., FIGS. 19-24).

It is to be appreciated, that due to the clear separation between RRC configuration fields of the MCG 103 and SCG 105, conventional RRC signaling frameworks cannot provide for the encapsulation of configuration information for the MCG 103 within an RRC message originating from the SN 104. Furthermore, it is to be appreciated that communication often utilizes security keys for the communication, where the security is applied at the PDCP layer. Conventionally, SCG split bearers utilize the SCG PDCP key while MCG split bearers utilize the MCG PDCP keys.

Figure 3:
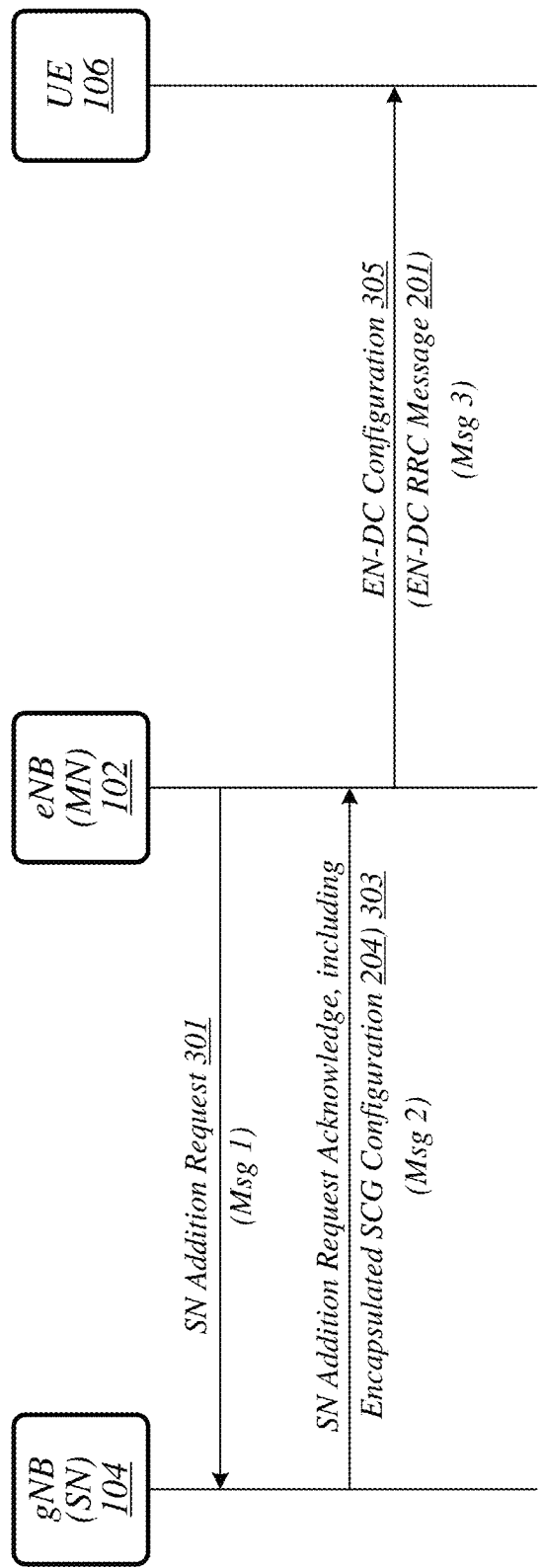
FIG. 3 illustrates a first embodiment of a communication flow.

FIG. 3 illustrates an example of a communications flow 300 that may be representative of communications between gNB 104, eNB 102, and UE 106 according to various embodiments. More particularly, communications flow 300 may be representative of communications associated with establishing a dual connectivity (DC) connection for a UE, such as, for example, the EN-DC connection between UE 106, eNB 102 and gNB 104 depicted in FIG. 1.

In various embodiments, eNB 102 (e.g., the MN) may initiate DC by sending a message to gNB 104 including an indication to add the gNB 104 as a SN. With some examples, Msg 1 can be an SgNB Addition Request. According to communications flow 300, eNB 102 may transmit a request 301 to add gNB 104 as a SN. In response to receipt of request 301, gNB 104 can transmit a request acknowledgment 303 including an indication of configuration information for SCG 105. In some examples, Msg 2 can be an SgNB Addition Request Acknowledge. Such configuration information can include configuration information for SRBs, such as RRC configuration information, PDCP configuration information, Lower layers, etc. In some examples, gNB 104 can transmit SCG configuration information in an encapsulated form (e.g., encapsulated SCG configuration 204) for inclusions in an RRC message to a UE, such as, UE 106.

eNB 102 can transmit an RRC configuration message 305 to UE 106 to establish communication with UE 106. In some examples, Msg 3 can be an RRCConnectionReconfiguration. For example, eNB 102 can transmit EN-DC RRC message 201 of FIG. 2 including MCG configuration 202 and encapsulated SCG configuration 204.

In some examples, the node establishing RRC with UE 106 may always provide PDCP configuration information (e.g., MCG configuration 202, SCG configuration 204, etc.) to the UE as part of MN or SN RRC message, irrespective of the bearer type on the network side, that is, irrespective of whether the PDCP for the split bearer is terminated at the MN or SN.

Accordingly, the RRC entity layer need only support one split bearer type (e.g., either MN or SN split bearer). Hence, there is only one bearer type to support from the perspective of the UE (e.g., UE 106). From the perspective of the UE, the PDCP of the split bearer can be modelled as belonging to the stack (MN or SN) which carries the PDCP configuration. For example, UE 106 could be configured to configure the PDCP for the split bearer based on the node (e.g., MN or SN) which carried the RRC message.

As another example, if the specification according to which the network operates were to say the RRC message is always carried as part of the MN RRC configuration, irrespective of the location of the PDCP on the network side, the UE 106 can model the PDCP for the split bearer to always be part of the MN stack. It is to be appreciated, such embodiments as this may introduce complexities to the network side. As an example, the PDCP configuration may be included in the MN RRC message (e.g., EN-DC RRC message 201) irrespective of whether the PDCP on network side is located in eNB 102 or gNB 104. In an example where the actual PDCP on the network side is in the gNB 104, it implies that the gNB 104 has to provide the SN PDCP configuration to the MN, to include as part of the MN RRC message.

Another complexity of this approach is that if a PDCP reconfiguration of the SCG were allowed to take place directly over a SCG SRB, the PDCP configuration may have to be carried as part of the SN RRC configuration. That is, the possibility to use MN RRC for the split bearer PDCP configuration will likely not be possible.

Furthermore, security key handling should be a consideration. Normally, the security key for the MN split bearer is part of the MN key (KeNB) while the security key for the SN split bearer is part of the SN key S-KeNB. This association of the key used for the split bearer with the type of split bearer cannot be applied for a unified split bearer. If say, the PDCP configuration is carried over MN RRC configuration, while the network is actually using an SCG split bearer, then the UE may need to be told to apply the appropriate key. In other words, the security key for the unified split bearer cannot be automatically associated with the MN or SN keys based on the bearer type and instead can be configured separately along with the PDCP configuration in the PDCP container.

In some embodiments, the PDCP configuration for split bearer may be carried in separate containers from the MCG/SCG configuration. For example, with some implementations, the MN RRC message may have two containers: a first container for the SCG configuration (e.g., SN RRC configuration) excluding PDCP configuration for any split bearer; and a second container carrying the PDCP configuration for the split bearer. These embodiments could be implemented irrespective of whether the PDCP for the split bearer is located in the MN or SN on the network side (e.g., irrespective of whether the split bearer is MN or SN terminated).

Figure 4:
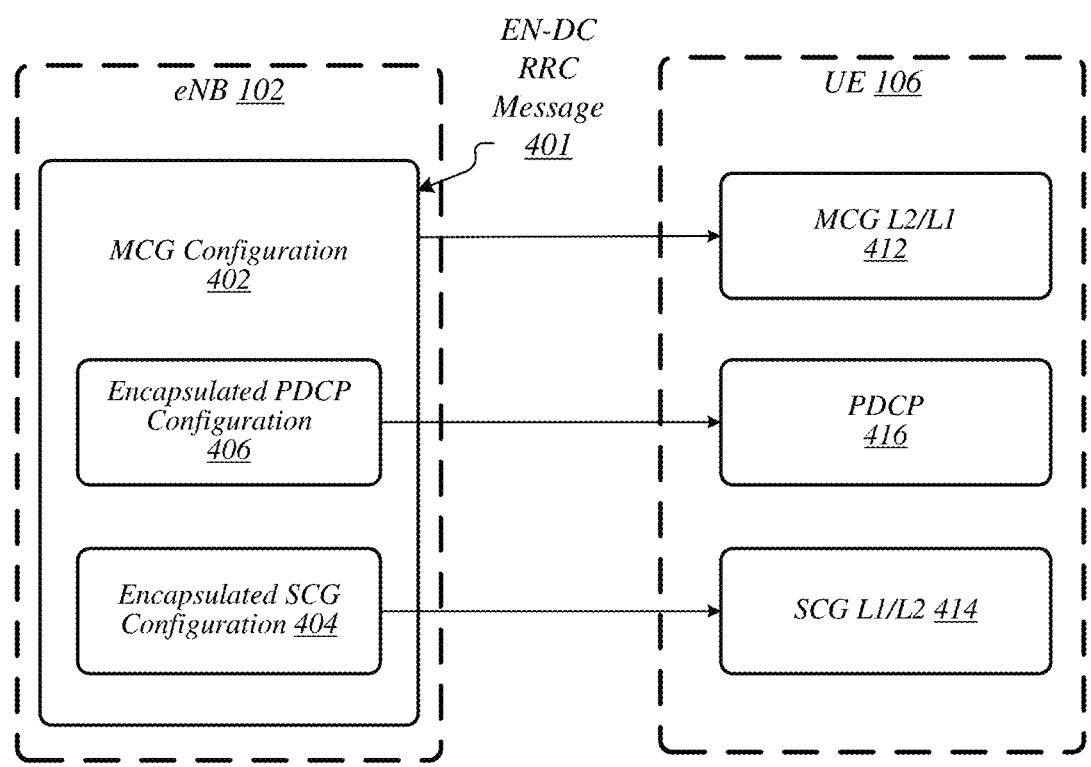
FIG. 4 illustrates a second embodiment of an RRC message structure.

FIG. 4 illustrates an EN-DC RRC signaling structure 400 that may be representative of the implementation of an RRC signaling structure according to various embodiments. As shown in FIG. 4, the RRC signaling structure 400 includes an RRC message 401 that itself includes an MCG configuration 402, an encapsulated SCG configuration 404, and an encapsulated PDCP configuration for split bearer 406. As depicted, the PDCP configuration is separated out from the rest of the node configurations and provided in container 406, which is sent to the UE 106. PDCP containers 406 can originate in either MN or SN (e.g., either eNB 102 or gNB 104), depending upon where the PDPC is located (or terminated). From the perspective of UE 106, however, the origin of PDCP container 406 is irrelevant and the configuration information within container 406 and the handling of container 406 by UE 106 is the same irrespective of where the container 406 originated from.

The EN-DC RRC message 401 can be generated by the MN 102 (e.g., the eNB 102) from environment 100. The encapsulated SCG configuration 404 can correspond to RRC configuration information received at MN 102, from the SN 104 (e.g., the gNB 104), for example, during an initiation of EN-DC for the environment 100. Said differently, MN 102 and SN 104 each provide their respective lower layer configurations to the UE as 402 and 404, respectively. That is, lower layer configuration for SN is encapsulated in container 404 while lower layer configuration for MN is within the RRC message itself. This creates the bearer configurations by combining the PDCP configuration received in 416 with the MN and SN lower layer configurations (RLC, MAC and PHY) configurations received in 412 and 414 respectively.

In general, the MCG configuration 402 and the encapsulated SCG configuration 404 each contain radio resource configuration information for the respective MN or SN protocol stacks. As such, each RRC entity (or component) within the UE 106 can configure its protocol stack (e.g., layers, or the like) based on the configuration information for the respective MN or SN domains, particularly SRBs. For example, UE 106 can receive an RRC message from MN 102 including indications of MCG configuration 402 and encapsulated SCG configuration 404. UE 106 can use the configuration information to configure various layers (e.g., Layer 1, Layer 2, etc.) of the UE 106 to communicate within the respective MCG or SCG. For example, UE 106 can use received MCG configuration information 412 to configure layers of UE 106 for communication with eNB 102 of MCG 103. Similarly, UE 106 can use received SCG configuration information 414 to configure layers of UE 106 for communication with gNB 104 of SCG 105.

The encapsulated PDCP configuration 406 may originate from either the eNB 102 or gNB 104, depending upon where the split bearer is terminated (e.g. MN or SN). Said differently, if the network has an MCG split bearer configuration, the PDCP configuration container 406 can be assembled by the MN (e.g., eNB 102) while if the network has an SCG split bearer configuration, the PDCP configuration container 406 can be assembled by the SN (e.g., gNB 104). A benefit to this RRC signaling structure is that the PDCP configuration 406 for SCG split bearers remains transparent to the MN. With some examples, the encapsulating container for PDPC configuration 406 includes a Service Discovery Application Profile (SDAP) configuration. In other examples, RRC structure 400 could include a separate SDAP container (not shown) provided similarly to PDPC configuration container 406. That is, RRC message could contain MCG configuration 402, container 406 for PDCP configuration information, container 404 for SCG configuration information as well as additional container(s) (not shown) that can include, for example, SDAP configuration information, or the like.

From the perspective of the UE 106, the PDCP can be modelled as a separate entity, not belonging to the MN or SN layer stack. Thus, UE 106 can receive PDCP configuration information 416 and can configure the PDCP layer accordingly. In some examples, either RRC entity (e.g., MCG or SCG) within the UE 106 can configure the PDCP as the PDCP configuration information 416 is a separate container. It is to be appreciated, that the RRC signaling structure 400 may be appropriate for user plane modeling of a "neutral"

PDCP entity as the PDCP configuration is not directly associated with the MN or SN RRC message.

It is to be appreciated, for a bearer that only used MCG resources (e.g., MN or MCG bearer), the network only configures the lower layer configuration for MCG while the UE 106 only receives configuration information (e.g., MCG configuration 412) for that bearer. Likewise, for a bearer that only used SCG resources (e.g., SN or SCG bearer), the network only configures the lower layer configuration for SCG while the UE 106 only receives configuration information (e.g., SCG configuration 414) for that bearer. For a split bearer, however, UE 106 received lower layer configurations for both nodes, that is, UE 106 receives both 412 and 414.

With some examples, the network (e.g., eNB 102, or the like) may send PDCP configuration information in multiple containers. For example, there could be multiple containers 406 each with PDCP configuration information. As a specific example, each of MN and SN could generate container 406 with respective MCG and SCG PDCP information. From the perspective of UE 106, however, the behavior is the same in that each container 406 is processed separately but identically by the UE.

FIG. 5 illustrates an example of a communications flow 500 that may be representative of communications between gNB 104, eNB 102, and UE 106 according to various embodiments. More particularly, communications flow 500 may be representative of communications associated with establishing a DC connection for a UE, such as, for example, the EN-DC connection between UE 106, eNB 102 and gNB 104 depicted in FIG. 1.

In various embodiments, eNB 102 (e.g., the MN) may initiate DC by sending a message to gNB 104 including an indication to add the gNB 104 as a SN. With some examples, Msg 1 can be an SgNB Addition Request. According to communications flow 500, eNB 102 may transmit a request 501 to add gNB 104 as a SN. In response to receipt of request 501, gNB 104 can transmit a request acknowledgment 503 including an indication of configuration information for lower layers of SCG 105 and an encapsulated PDCP configuration for SN terminated bearers, including SN terminated split bearer. In some examples, Msg 2 can be an SgNB Addition Request Acknowledge. Such configuration information can include configuration information for SRBs, DRBs such as RRC configuration information, PDCP configuration information, etc. In some examples, gNB 104 can transmit SCG configuration information and PDCP configuration for SN split bearer information in an encapsulated form (e.g., encapsulated SCG configuration 404, encapsulated PDPC configuration 406) for inclusions in an RRC message to a UE, such as, UE 106.

eNB 102 can transmit an RRC configuration message 505 to UE 106 to establish communication with UE 106. In some examples, Msg 3 can be an RRCConnectionReconfiguration. For example, eNB 102 can transmit EN-DC RRC message 201 of FIG. 2 including MSG configuration 402, encapsulated SCG configuration 404, and encapsulated PDCP for split bearer (e.g., either MN split bearer or SN split bearer) as discussed above with respect to FIG. 4 and RRC structure 400.

With some examples, PDCP reconfiguration of the SCG may be allowed directly over SCG SRB. In such an example, the container (e.g., container 406, or the like) can be included in the SN RRC configuration. That is, in embodiments, the PDCP configuration container can be included as part of SCG or MCG configurations. From the UE perspective, where it is included may not be relevant as the UE configures the PDCP for the split bearer in the same manner irrespective of whether the container is received as part of MCG or SCG configurations.

It is noted, that the failures when implementing the communication flow 500 and RRC structure 400 may have to be considered separately to MN and SN failure. However, response to failures can follow the existing behavior that any failure of this configuration will always behave as the failure of the encapsulating message.

With some examples, the security key for the unified split bearer may not be automatically associated with the MN or SN keys (e.g., security keys for eNB 102, security keys for gNB 104, etc.) based on the bearer type and instead, may be configured separately as part of the PDCP configuration. For example, an independent split bearer key could be provisioned and provided as part of the PDPC configuration for the split bearers (e.g., via capsule 406, or the like). Or an indication could be included in the PDCP container on which key to use, either MN or SN key.

With some examples, the PDPC configuration container (e.g., encapsulated PDCP configuration 406) can be included in the either or both of the MN RRC message definition and SN RRC message definition.

In some examples, a communication specification could be modified to provide for PDCP configuration information in a container outside of the MN or SN configuration, such as, container 406 of RRC structure 400. For example, in an LTE specification (e.g., 3GPP LTE, 3GPP LTE-A, 3GPP LTE-Advanced Pro, or the like), the PDCP configuration (PDPC config) needed for EN-DC might be the same as the LTE PDCP configuration. As such, the PDCP configuration definition in such an LTE specification may apply for the unified split bearer approaches discussed herein and can be re-used. The procedural text on UE behavior on receipt of the PDCP config in such an LTE specification is also likely to be directly applicable. As another example, in a 5G specification (e.g., 3GPP 5G-NR, or the like), current NR technologies may be reused for intra-NR DC and unified split bearer approaches discussed herein.

FIGS. 6A-6D, 7A-7D, 8A-8D, 9A-9D, 10A-10D, and 11A-11D each illustrate a communication flow that may be representative of the implementation of one more communication flows to transition bearer types in a DC environment, such as, environment 100 of FIG. 1. It is noted that the communication flows each depict operations of components of the environment 100, and particularly of MN and SN nodes in environment 100, such as, for example, eNB 102 and gNB 104. Furthermore, it is to be appreciated that FIGS. 6A, 7A, 8A, 9A, 10A, and 11A each illustrate a communication flow to transition between bearer types where the environment does not support a unified bearer. FIGS. 6B, 7B, 8B, 9B, 10B, and 11B each illustrate a communication flow to transition between bearer types where the environment supports a unified bearer and the PDCP information is encapsulated in the MCG configuration information of the RRC message. FIGS. 6C, 7C, 8C, 9C, 10C, and 11C each illustrate a communication flow to transition between bearer types where the environment supports a unified bearer and the PDCP information is encapsulated in the SCG configuration information of the RRC message. FIGS. 6D, 7D, 8D, 9D, 10D, and 11D each illustrate a communication flow to transition between bearer types where the environment supports a unified bearer and the PDCP information is encapsulated in a separate container from the MCG configuration and the SCG configuration information.

It is noted, that the communication flows depicted in these figures omit a number of operations that may be found in a complete communication flow. For example, the flows often omit sending SN addition request messages and acknowledgments as well as receiving SN addition request messages and acknowledgments. Additionally, these flows often omit sending indications to re-establish PDPC, or the like. It is to be appreciated that these messages as well as other messages could be included in an overall flow. However, for purposes of clarity of presentation, operations dealing with generating an RRC for a UE where the bearer is unified from the perspective of the UE are described.

Turning more particularly to FIG. 6A, which depicts a communication flow 600. As depicted in this figure, SN (e.g., gNB 104) can establish the SN component of the MN split bearer in SCG (e.g., NG-RAN cell 105) at 602. At 604, MN (e.g., eNB 102) may not need to modify the PDCP configuration to a change from an MN bearer to MN split bearer. Optionally, at 606, MN may retransmit (e.g., if needed to reestablish communication, or the like) an RRC message to UE 106 to establish communication in the with the transition from MN bearer to MN bearer split.

Turning more particularly to FIG. 6B, which depicts a communication flow 610. As depicted in this figure, SN (e.g., gNB 104) can establish the SN component of the MN split bearer in SCG (e.g., NG-RAN cell 105) at 602. At 604, MN (e.g., eNB 102) may not need to modify the PDCP configuration to a change from an MN bearer to MN split bearer. Optionally, at 612, MN may retransmit (e.g., if needed to reestablish communication, or the like) an RRC message to UE 106 to establish communication in the with the transition from MN bearer to MN bearer split. In some examples, the RRC message may not change when transitioning from MN bearer to MN split bearer and the bearer types are unified at the UE with the PDCP configuration encoded in the MSG configuration information. However, in some examples, the RRC may be regenerated with PDCP configuration information encoded in the MCG configuration information (e.g., MCG configuration 202, or the like).

Turning more particularly to FIG. 6C, which depicts a communication flow 620. As depicted in this figure, SN (e.g., gNB 104) can establish the SN component of the MN split bearer in SCG (e.g., NG-RAN cell 105) at 602. At 622, MN (e.g., eNB 102) can transmit PDPC configuration information for MN split bearer to SN. At 624, SN can encapsulate the SCG configuration information including the PDPC configuration for MN split bearer and can transmit the encapsulated SCG configuration including the PDCP configuration to the MN at 626. At 628 MN may generate and transmit an RRC message to UE 106 including SCG configuration information with PDCP configuration for MN split bearer (e.g., RRC message 200, or the like).

Figure 6D:
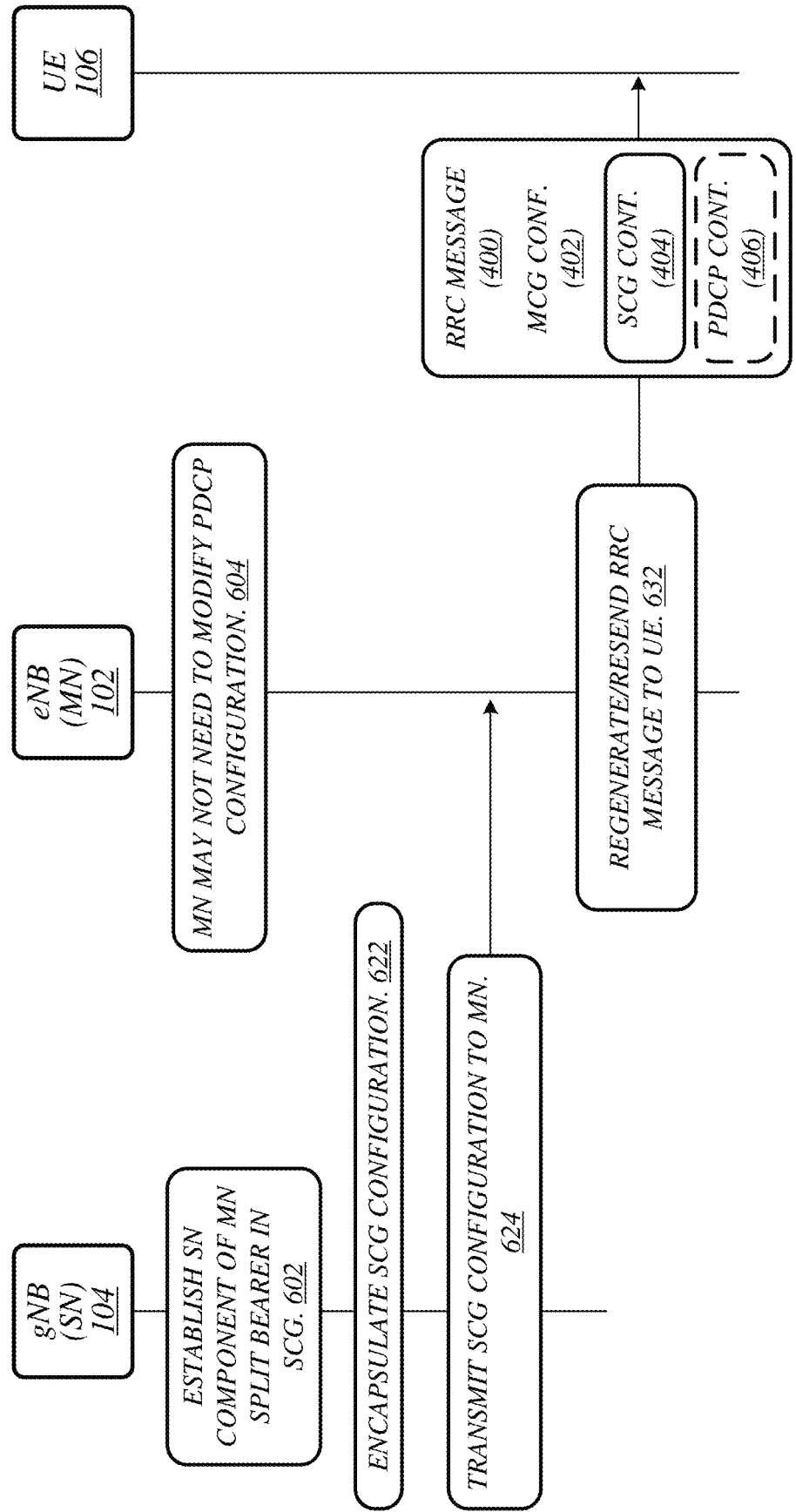

Turning more particularly to FIG. 6D, which depicts a communication flow 630. As depicted in this figure, SN (e.g., gNB 104) can establish the SN component of the MN split bearer in SCG (e.g., NG-RAN cell 105) at 602. For example, if the PDCP configuration is not changing form the prior PDPC configuration, then the MN does not need to change the PDCP configuration or regenerate container 406 with PDCP configuration information. At 604, MN (e.g., eNB 102) may not need to modify the PDCP configuration to a change from an MN bearer to MN split bearer. At 622, the SN can encapsulate the SCG configuration in a container (e.g., container 404, or the like) and can transmit the encapsulated SCG configuration for MN split bearer to MN at 624.

At 632, MN may transmit an RRC message to UE 106 to establish communication with the transition from MN bearer to MN bearer split. For example, the MN can generate and transmit RRC message 400 including MCG configuration 402 and containers 404 and 406 for SCG configuration and PDCP configuration, respectively, at 632. In some examples, the RRC message may optionally include the PDCP configuration container 406. For example, where the PDCP configuration does not change, RRC message generated at 632 may not include PDCP container 406. In such examples, the RRC message can be transmitted without the PDPC container 406. However, in some examples, the RRC may be regenerated with encoded PDCP information for the Radio bearers (e.g., encapsulated PDCP configuration for split bearer 406, or the like).

Turning more particularly to FIG. 7A, which depicts a communication flow 700. As depicted in this figure, each of MN (e.g., eNB 102) and SN (e.g., gNB 104) can release the respective (e.g., MN or SN) component of the MN split bearer in their respective cell groups (e.g., MCG or SCG) at blocks 702 and 704. For example, gNB 104 can release the SN component of MN split bearer in NG-RAN Cell 105 at 702 while eNB 102 can release the MN component of MN split bearer in LTE-RAT Cell 103 at 704. At 706, MN (e.g., eNB 102) may not need to modify the PDCP configuration to a change from an MN split bearer to MN bearer. Optionally, at 708, MN may retransmit (e.g., if needed to reestablish communication, or the like) an RRC message to UE 106 to establish communication in the with the transition from MN split bearer to MN bearer.

Figure 7B:
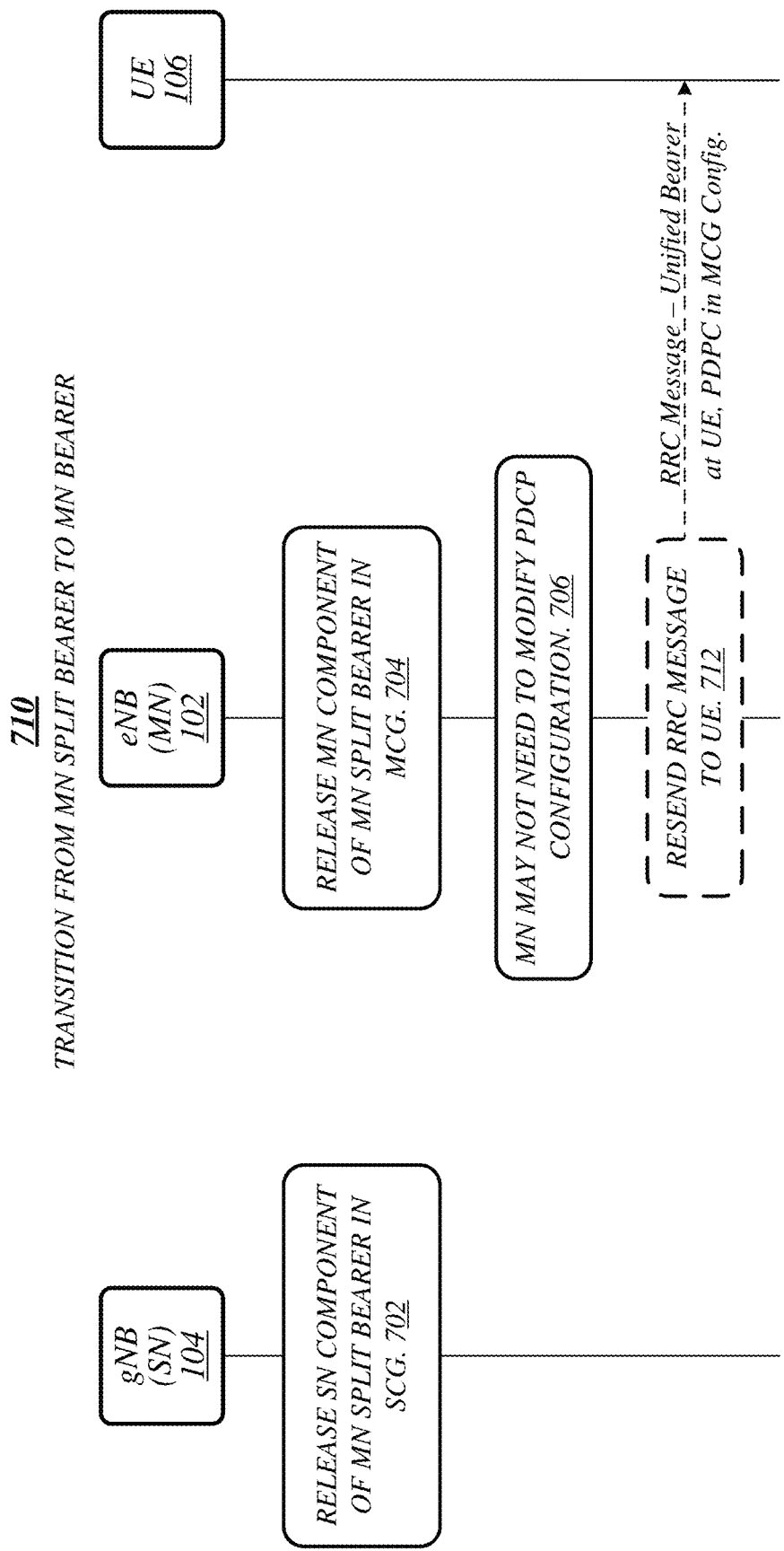

Turning more particularly to FIG. 7B, which depicts a communication flow 710. As depicted in this figure, each of MN (e.g., eNB 102) and SN (e.g., gNB 104) can release the respective (e.g., MN or SN) component of the MN split bearer in their respective cell groups (e.g., MCG or SCG) at blocks 702 and 704. For example, gNB 104 can release the SN component of MN split bearer in NG-RAN Cell 105 at 702 while eNB 102 can release the MN component of MN split bearer in LTE-RAT Cell 103 at 704. At 706, MN (e.g., eNB 102) may not need to modify the PDCP configuration to a change from an MN split bearer to MN bearer. Optionally, at 712, MN may retransmit (e.g., if needed to reestablish communication, or the like) an RRC message to UE 106 to establish communication in the with the transition from MN split bearer to MN bearer. In some examples, the RRC message may not change when transitioning from MN split bearer to MN bearer and the bearer types are unified at the UE with the PDCP configuration encoded in the MSG configuration information. However, in some examples, the RRC may be regenerated with PDCP configuration information encoded in the MCG configuration information (e.g., MCG configuration 202, or the like).

Figure 7C:
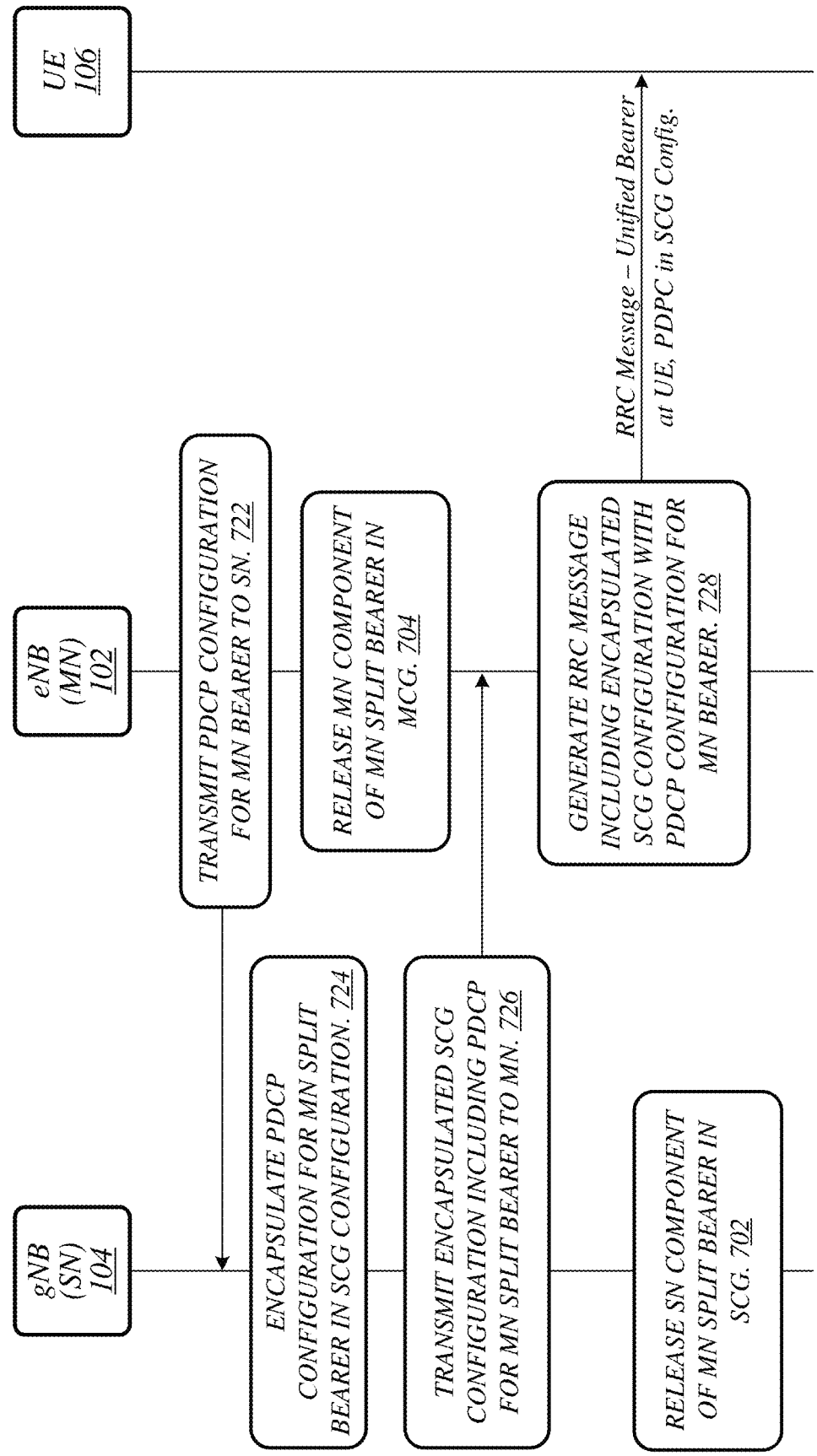

Turning more particularly to FIG. 7C, which depicts a communication flow 720. As depicted in this figure, each of MN (e.g., eNB 102) and SN (e.g., gNB 104) can release the respective (e.g., MN or SN) component of the MN split bearer in their respective cell groups (e.g., MCG or SCG) at blocks 702 and 704. For example, gNB 104 can release the SN component of MN split bearer in NG-RAN Cell 105 at 702 while eNB 102 can release the MN component of MN split bearer in LTE-RAT Cell 103 at 704.

At 722, MN (e.g., eNB 102) can transmit PDPC configuration information for MN bearer to SN. At 724, SN can encapsulate the SCG configuration information including the PDPC configuration for MN bearer and can transmit the encapsulated SCG configuration including the PDCP configuration to the MN at 726. At 728 MN may generate and transmit an RRC message to UE 106 including SCG configuration information with PDCP configuration for MN bearer (e.g., RRC message 200, or the like).

Figure 7D:
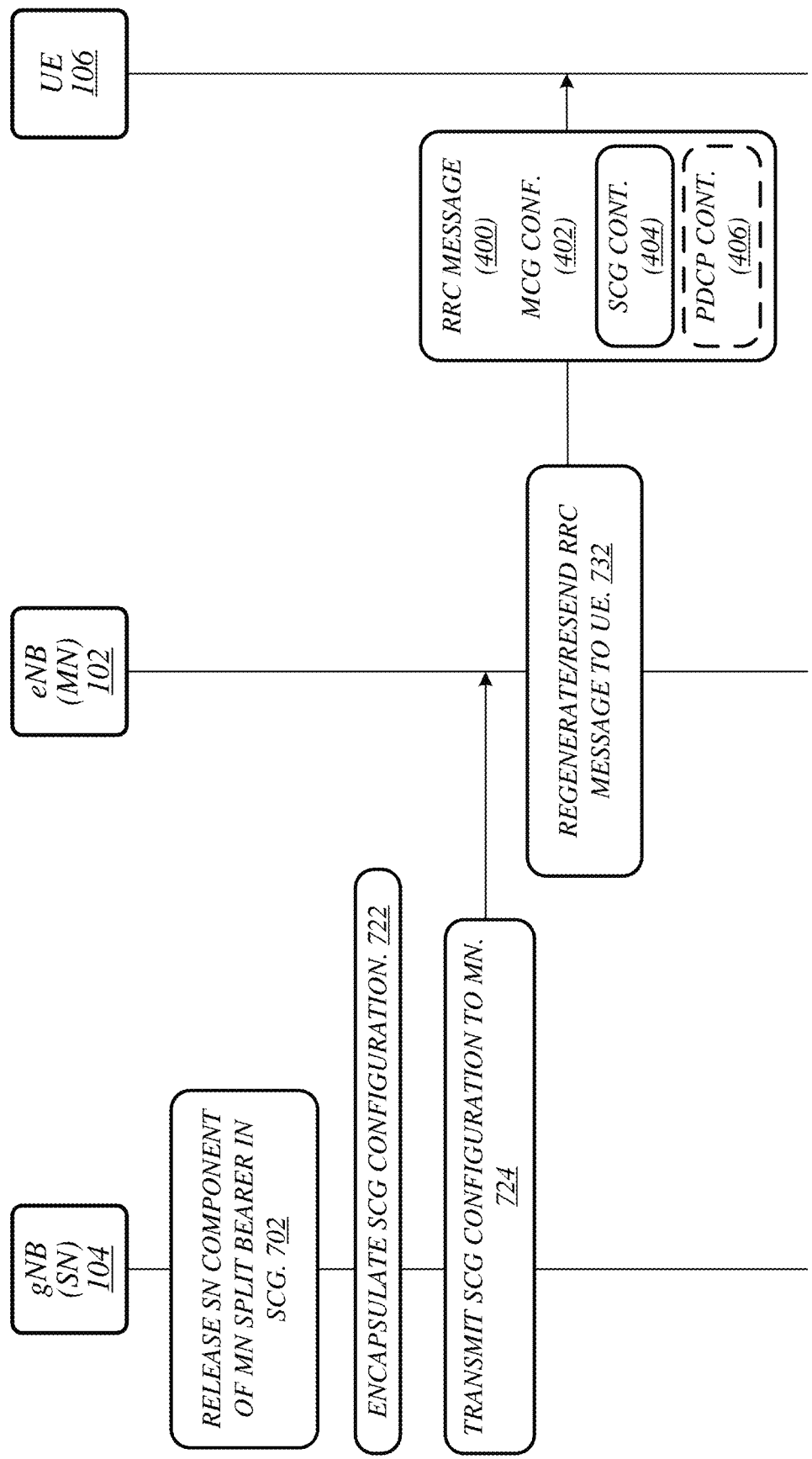

Turning more particularly to FIG. 7D, which depicts a communication flow 730. As depicted in this figure, SN (e.g., gNB 104) can release the respective SN component of the MN split bearer in SCG 702. For example, gNB 104 can release the SN component of MN split bearer in NG-RAN Cell 105 at 702. At 722, the SN can encapsulate the SCG configuration in a container (e.g., container 404, or the like) and can transmit the encapsulated SCG configuration for MN split bearer to MN at 724.

At 732, MN may transmit an RRC message to UE 106 to establish communication with the transition from MN split bearer to MN bearer. For example, the MN can generate and transmit RRC message 400 including MCG configuration 402 and containers 404 and 406 for SCG configuration and PDCP configuration, respectively, at 732. In some examples, the RRC message may optionally include the PDCP configuration container 406. For example, where the PDCP configuration does not change, the RRC message generated at 732 may not include PDCP container 406. In such examples, the RRC message can be transmitted without the PDPC container 406. However, in some examples, the RRC may be regenerated with encoded PDCP information for the RRC (e.g., encapsulated PDCP configuration for split bearer 406, or the like).

Turning more particularly to FIG. 8A, which depicts a communication flow 800. As depicted in this figure, MN (e.g., eNB 102) can transmit an information element to SN (e.g., gNB 104) including an indication to re-establish PDCP for the SN split bearer at 801. At 802, SN can establish PDCP for the SN split bearer. At 803, SN can transmit an encapsulated message to MN including an indication of the SCG configuration and the PDCP configuration for SN split bearer. At 804, MN can generate and transmit to UE 106 an RRC message including SCG configuration information and PDPC configuration information for the SN split bearer. At 805, MN can establish the MN component of the SN split bearer in MCG (e.g., LTE-RAN cell 103).

Turning more particularly to FIG. 8B, which depicts a communication flow 810. As depicted in this figure, MN (e.g., eNB 102) can transmit an information element to SN (e.g., gNB 104) including an indication to re-establish PDCP for the SN split bearer at 801. At 802, SN can establish PDCP for the SN split bearer. At 803, SN can transmit an encapsulated message to MN including an indication of the SCG configuration and the PDCP configuration for SN split bearer. At 812, MN can generate and transmit to UE 106 an RRC message including SCG configuration information and MCG configuration information where PDPC configuration information for the SN split bearer is encoded in the MCG configuration information. At 805, MN can establish the MN component of the SN split bearer in MCG (e.g., LTE-RAN cell 103).

Turning more particularly to FIG. 8C, which depicts a communication flow 820. As depicted in this figure, MN (e.g., eNB 102) can transmit an information element to SN (e.g., gNB 104) including an indication to re-establish PDCP for the SN split bearer at 801. At 802, SN can establish PDCP for the SN split bearer. At 822, SN can encapsulate SCG configuration information including the PDCP configuration for SN split bearer and can transmit the encapsulated SCG configuration to MN at 824. At 826 MN may generate and transmit an RRC message to UE 106 including SCG configuration information with PDCP configuration for MN bearer (e.g., RRC message 200, or the like). At 805, MN can establish the MN component of the SN split bearer in MCG (e.g., LTE-RAN cell 103).

Figure 8D:
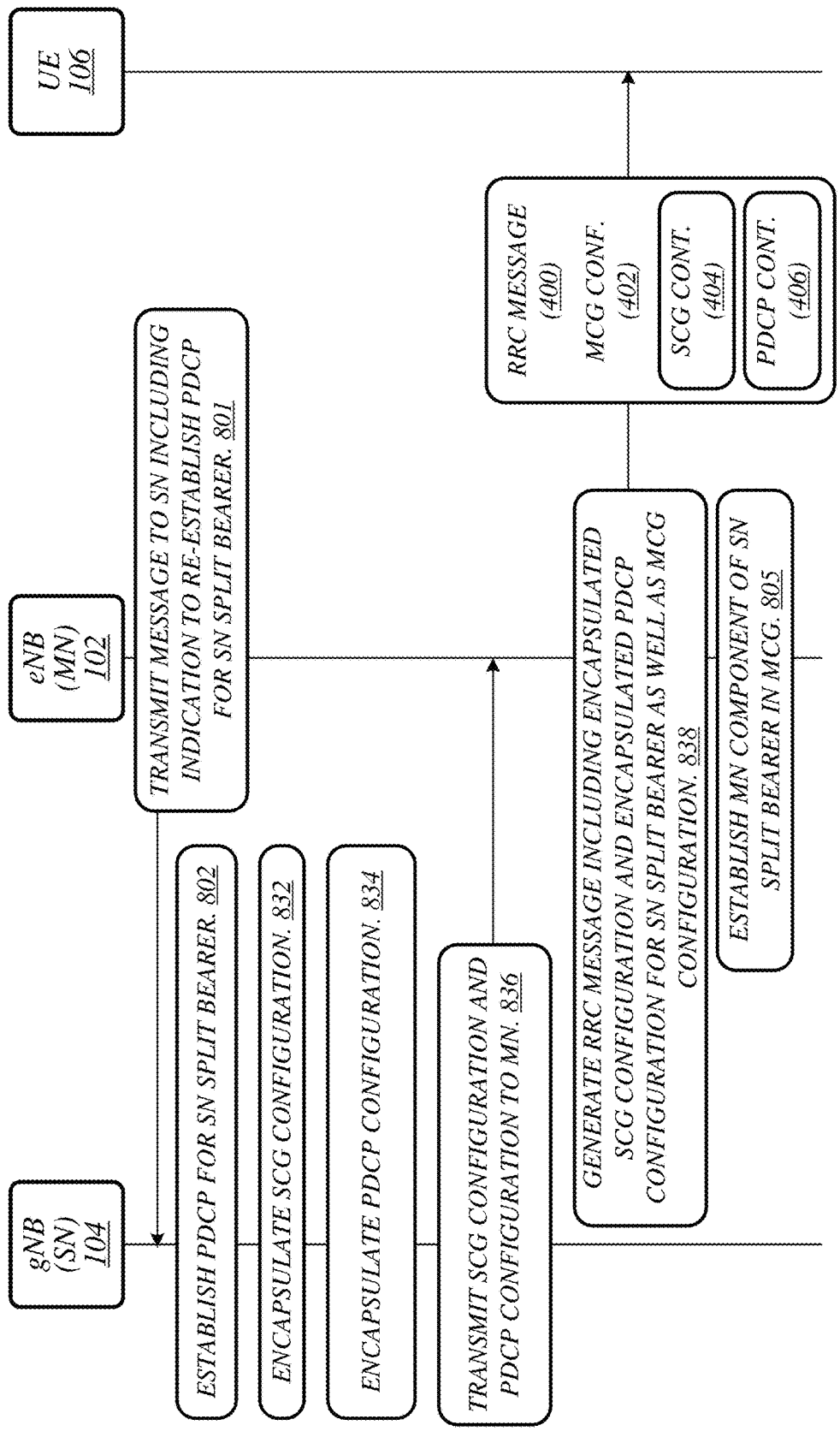

Turning more particularly to FIG. 8D, which depicts a communication flow 830. As depicted in this figure, MN (e.g., eNB 102) can transmit an information element to SN (e.g., gNB 104) including an indication to re-establish PDCP for the SN split bearer at 801. At 802, SN can establish PDCP for the SN split bearer. SN can separately encapsulate the SCG configuration and the PDCP configuration for SN split bearer at 832 and 834, respectively. At 836, SN can transmit the encapsulated SCG configuration and PDCP configuration for SN split bearer to MN. At 838, MN can generate and transmit to UE 106 RRC message including separately encoded SCG configuration and PDCP configuration for SN split bearer (e.g., RRC structure 400, or the like) For example, at 838, MN 102 can generate RRC message 400 including MCG configuration 402, capsule 404 of SCG configuration (e.g., as received from SN 104) and capsule 404 of PDCP configuration (e.g., as received from SN 104). At 805, MN can establish the MN component of the SN split bearer in MCG (e.g., LTE-RAN cell 103).

Figure 9A:
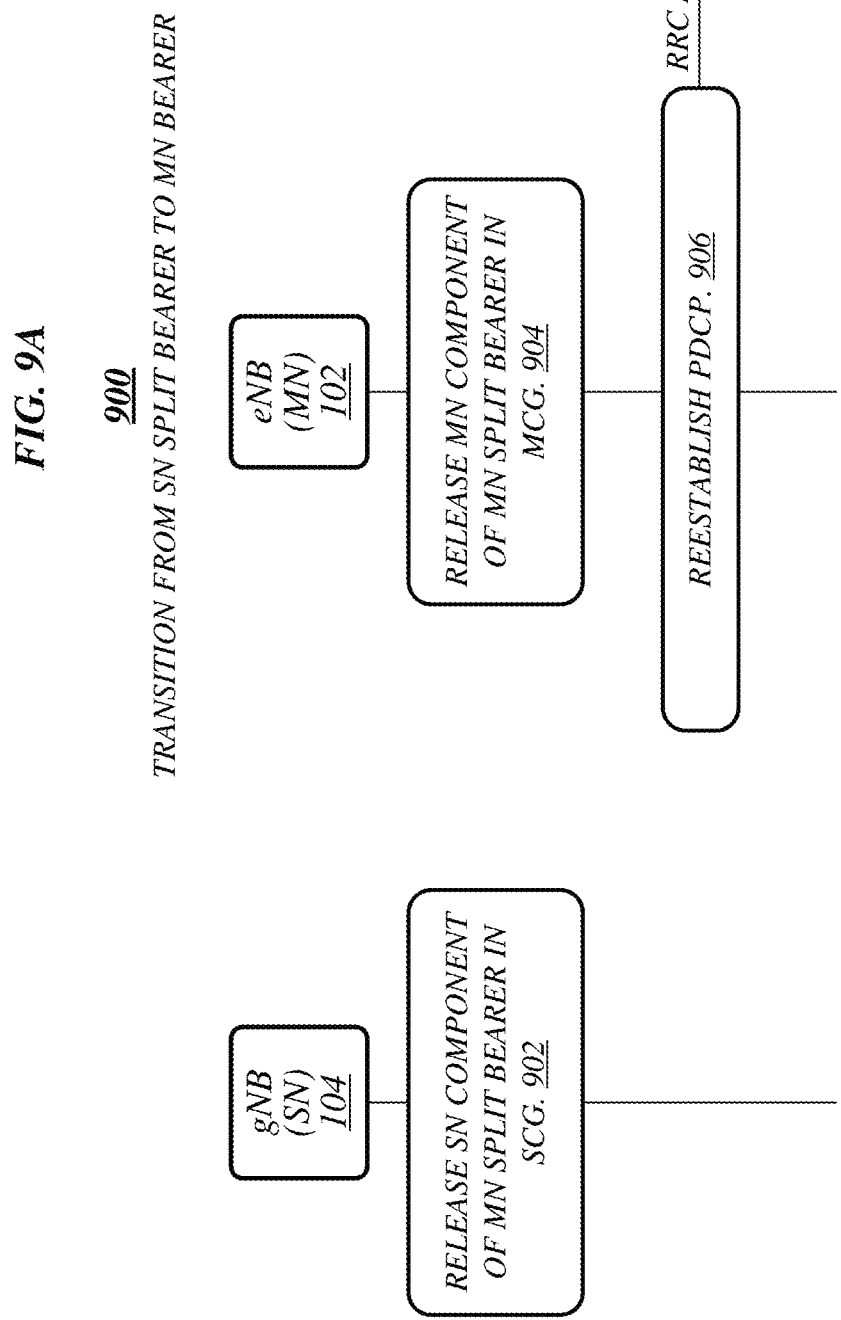

Turning more particularly to FIG. 9A, which depicts a communication flow 900. As depicted in this figure, each of MN (e.g., eNB 102) and SN (e.g., gNB 104) can release the respective (e.g., MN or SN) component of the SN split bearer in their respective cell groups (e.g., MCG or SCG) at blocks 902 and 904. For example, gNB 104 can release the SN component of SN split bearer in NG-RAN Cell 105 at 902 while eNB 102 can release the SN component of MN split bearer in LTE-RAT Cell 103 at 902. At 906, MN can generate and transmit to UE 106 an RRC message including MCG configuration information to reestablish PDPC for environment 100 (e.g., LTE-RAN cell 103 and NG-RAN cell 105, or the like).

Turning more particularly to FIG. 9B, which depicts a communication flow 910. As depicted in this figure, each of MN (e.g., eNB 102) and SN (e.g., gNB 104) can release the respective (e.g., MN or SN) component of the SN split bearer in their respective cell groups (e.g., MCG or SCG) at blocks 902 and 904. For example, gNB 104 can release the SN component of SN split bearer in NG-RAN Cell 105 at 902 while eNB 102 can release the SN component of MN split bearer in LTE-RAT Cell 103 at 902. At 912, SN can encapsulate the SCG configuration information and can transmit the encapsulated SCG configuration information to the MN at 914. At 916, MN can generate RRC message including MCG configuration where the PDCP configuration in in the MCG configuration and an encapsulated SCG configuration (e.g., RRC structure 200, or the like). At 918, MN can transmit the RRC message to UE 106 to reestablish PDPC for environment 100 (e.g., LTE-RAN cell 103 and NG-RAN cell 105, or the like).

Turning more particularly to FIG. 9C, which depicts a communication flow 920. As depicted in this figure, each of MN (e.g., eNB 102) and SN (e.g., gNB 104) can release the respective (e.g., MN or SN) component of the SN split bearer in their respective cell groups (e.g., MCG or SCG) at blocks 902 and 904. For example, gNB 104 can release the SN component of SN split bearer in NG-RAN Cell 105 at 902 while eNB 102 can release the SN component of MN split bearer in LTE-RAT Cell 103 at 902. At 922, MN (e.g., eNB 102) can transmit PDPC configuration information for MN bearer to SN. At 924, SN can encapsulate the SCG configuration information including PDCP configuration information for MN bearer and can transmit the encapsulated SCG configuration information to the MN at 926. At 928, MN can generate RRC message including MCG configuration and encapsulated SCG configuration where the PDCP configuration in in the SCG configuration (e.g., RRC structure 200, or the like). At 918, MN can transmit the RRC message to UE 106 to reestablish PDPC for environment 100 (e.g., LTE-RAN cell 103 and NG-RAN cell 105, or the like).

Turning more particularly to FIG. 9D, which depicts a communication flow 930. As depicted in this figure, each of MN (e.g., eNB 102) and SN (e.g., gNB 104) can release the respective (e.g., MN or SN) component of the SN split bearer in their respective cell groups (e.g., MCG or SCG) at blocks 902 and 904. At 906, MN can encapsulate the PDCP configuration for MN bearer. At 912, SN can encapsulate the SCG configuration information and can transmit the encapsulated SCG configuration information to the MN at 914. At 932, MN can generate RRC message including separately encoded SCG configuration and PDCP configuration for MN bearer (e.g., RRC structure 400, or the like). At 918, MN can transmit the RRC message to UE 106 to reestablish PDPC for environment 100 (e.g., LTE-RAN cell 103 and NG-RAN cell 105, or the like).

Turning more particularly to FIG. 10A, which depicts a communication flow 1000. As depicted in this figure, SN (e.g., gNB 104) may not need to modify the PDCP configuration to a change from an SN bearer to SN split bearer. At 1004, SN can transmit an encapsulated message to MN including an indication of the SCG configuration and the PDCP configuration for SN split bearer. At 1006, MN can generate and transmit to UE 106 an RRC message including SCG configuration information and PDPC configuration information for the SN split bearer. At 1008, MN can establish the MN component of the SN split bearer in MCG (e.g., LTE-RAN cell 103).

Figure 10B:
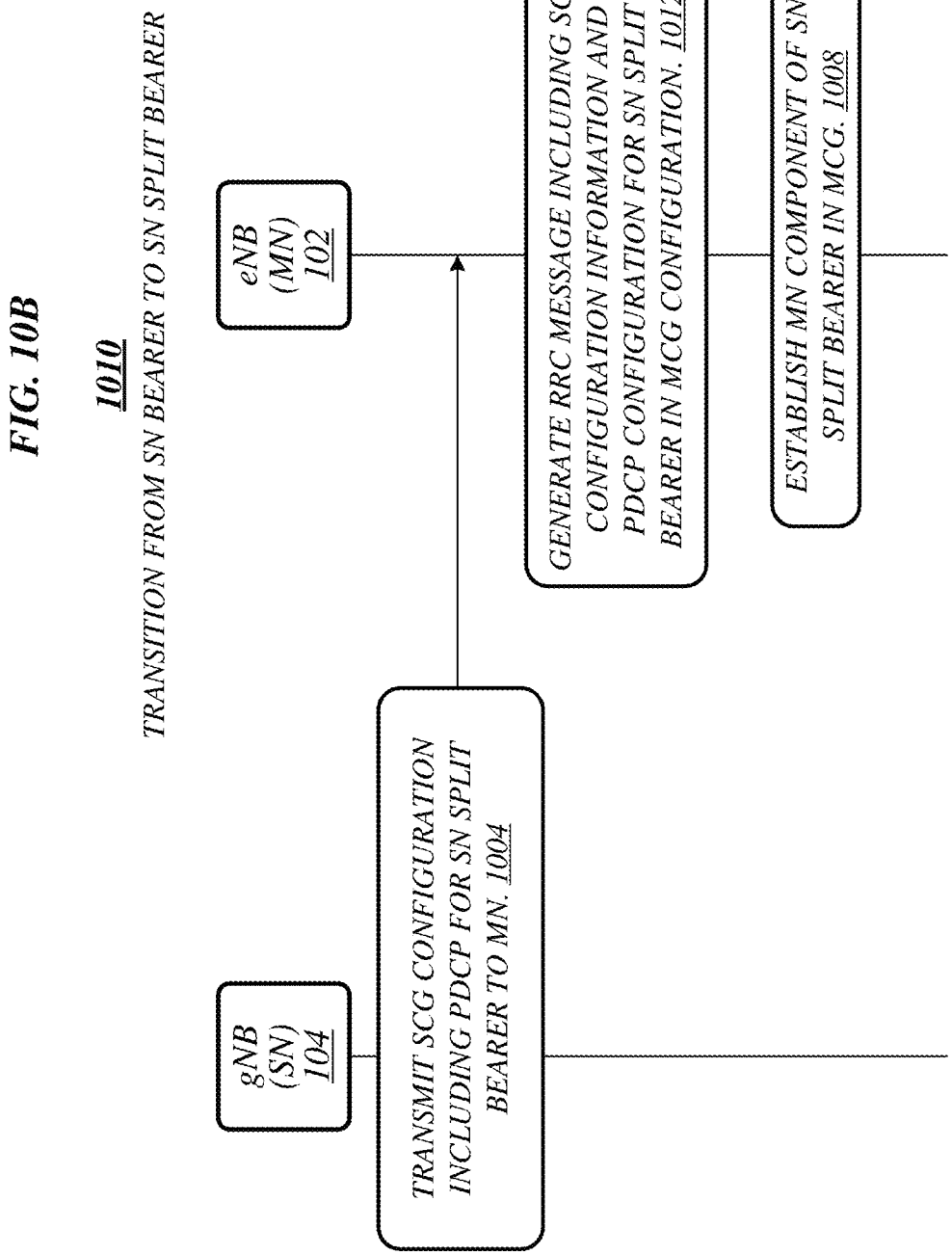

Turning more particularly to FIG. 10B, which depicts a communication flow 1010. As depicted in this figure, SN can transmit an encapsulated message to MN including an indication of the SCG configuration and the PDCP configuration for SN split bearer at 1004. At 1012, MN can generate and transmit to UE 106 an RRC message including SCG configuration information and MCG configuration information where PDPC configuration information for the SN split bearer is encoded in the MCG configuration information. At 1008, MN can establish the MN component of the SN split bearer in MCG (e.g., LTE-RAN cell 103).

Turning more particularly to FIG. 10C, which depicts a communication flow 1020. As depicted in this figure, SN can encapsulate SCG configuration information including the PDCP configuration for SN split bearer at 1022 and can transmit the encapsulated SCG configuration to MN at 1024. At 1026, MN may generate and transmit an RRC message to UE 106 including SCG configuration information with PDCP configuration for MN bearer (e.g., RRC message 200, or the like). At 1008, MN can establish the MN component of the SN split bearer in MCG (e.g., LTE-RAN cell 103).

Turning more particularly to FIG. 10D, which depicts a communication flow 1030. As depicted in this figure, SN can separately encapsulate the SCG configuration and the PDCP configuration for SN split bearer at 1032 and 1034, respectively. It is noted that both of 1032 and 1034 are optional. More specifically, if either the SCG configuration or the PDCP configuration does not change, SN may not generate the respective container. For example, if the PDCP configuration is not changing from SN bearer to SN split bearer then SN 104 may not generate PDCP container 406. Likewise, if the SCG configuration is not changing then SN 104 may not generate SCG configuration container 404. At 1036, SN can transmit the encapsulated SCG configuration and encapsulated PDCP configuration for SN split bearer to MN. It is noted, that only containers which are generated (e.g., where the configuration changes) need be transmitted.

At 1038, MN can generate and transmit to UE 106 RRC message including separately encoded SCG configuration and PDCP configuration for SN split bearer (e.g., RRC structure 400, or the like). In some examples, the RRC message generated at 1038 may omit either or both containers 404 and/or 406. For example, the RRC message may omit container 404 if the SCG configuration is not changing and SN 104 did not generate the container at 1032. Likewise, the RRC message may omit container 406 if the PDCP configuration is not changing and SN 104 did not generate the container at 1034. At 1008, MN can establish the MN component of the SN split bearer in MCG (e.g., LTE-RAN cell 103).

Figure 11A:
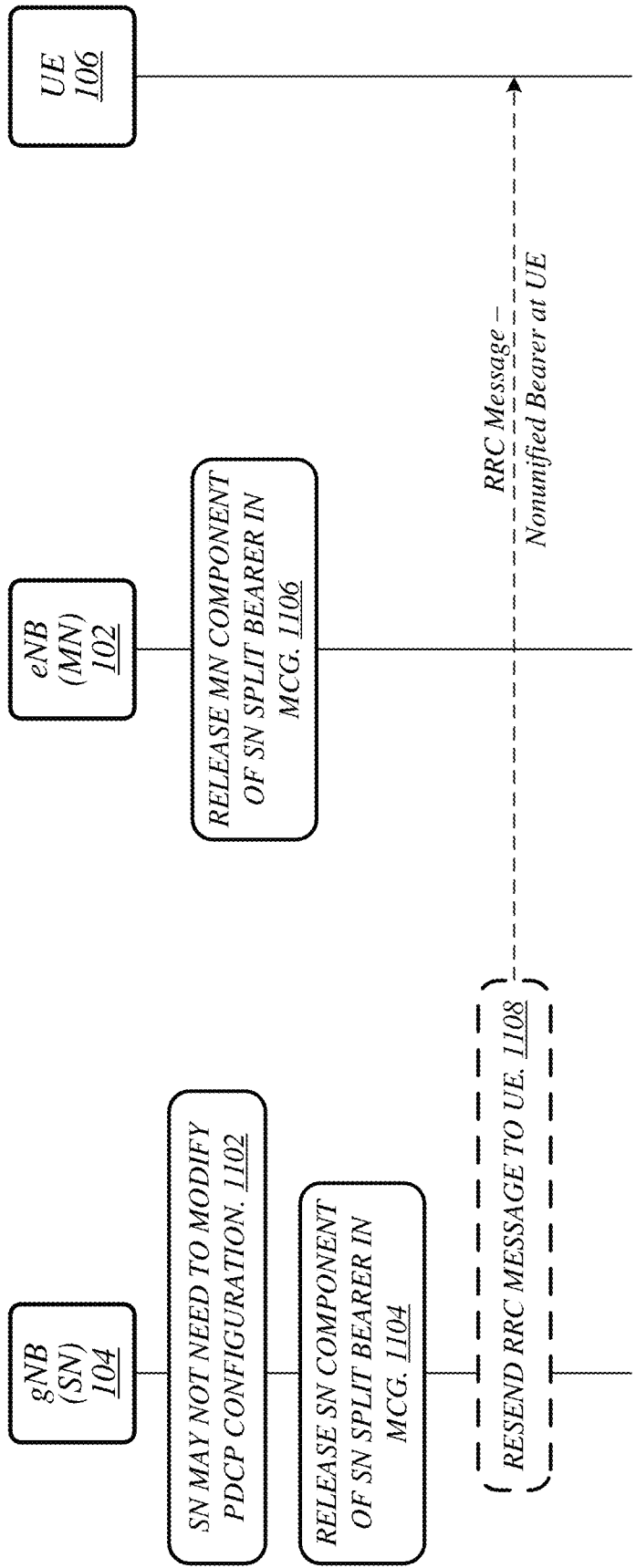

Turning more particularly to FIG. 11A, which depicts a communication flow 1100. As depicted in this figure, SN (e.g., gNB 104) may not need to modify the PDCP configuration to change from an SN split bearer to SN bearer. Each of MN (e.g., eNB 102) and SN can release the respective (e.g., MN or SN) component of the SN split bearer in their respective cell groups (e.g., MCG or SCG) at blocks 1104 and 1106. For example, gNB 104 can release the SN component of SN split bearer in NG-RAN Cell 105 at 1104 while eNB 102 can release the MN component of SN split bearer in LTE-RAT Cell 103 at 1106. Optionally, at 1108, MN or SN may retransmit (e.g., if needed to reestablish communication, or the like) an RRC message to UE 106 to establish communication in the with the transition from SN split bearer to SN bearer.

Turning more particularly to FIG. 11B, which depicts a communication flow 1110. As depicted in this figure, each of MN (e.g., eNB 102) and SN can release the respective (e.g., MN or SN) component of the SN split bearer in their respective cell groups (e.g., MCG or SCG) at blocks 1104 and 1106. For example, gNB 104 can release the SN component of SN split bearer in NG-RAN Cell 105 at 1104 while eNB 102 can release the MN component of SN split bearer in LTE-RAT Cell 103 at 1106. At 1112, MN can release PDCP configuration related to SN split bearer. At 1114, SN can transmit an encapsulated message to MN including an indication of the SCG configuration and the PDCP configuration for SN bearer. At 1116, MN can generate and transmit to UE 106 an RRC message including SCG configuration information and MCG configuration information where PDPC configuration information for the SN bearer is encoded in the MCG configuration information.

Turning more particularly to FIG. 11C, which depicts a communication flow 1120. As depicted in this figure, SN (e.g., gNB 104) may not need to modify the PDCP configuration to change from an SN split bearer to SN bearer. Each of MN (e.g., eNB 102) and SN can release the respective (e.g., MN or SN) component of the SN split bearer in their respective cell groups (e.g., MCG or SCG) at blocks 1104 and 1106. For example, gNB 104 can release the SN component of SN split bearer in NG-RAN Cell 105 at 1104 while eNB 102 can release the MN component of SN split bearer in LTE-RAT Cell 103 at 1106. At 1122, SN can encapsulate SCG configuration information including the PDCP configuration for SN bearer and can transmit the encapsulated SCG configuration to MN at 1124. At 1126, MN may generate and transmit an RRC message to UE 106 including SCG configuration information with PDCP configuration for MN bearer (e.g., RRC message 200, or the like).

Turning more particularly to FIG. 11D, which depicts a communication flow 1130. As depicted in this figure, SN (e.g., gNB 104) may not need to modify the PDCP configuration to change from an SN split bearer to SN bearer. MN can release the MN component of the SN split bearer in MCG at block 1106. For example, eNB 102 can release the MN component of SN split bearer in LTE-RAT Cell 103 at 1106. At 1132 and 1134, respectively, SN can separately encapsulate the SCG configuration and the PDCP configuration for SN split bearer. It is noted that both of 1032 and 1034 are optional. More specifically, if either the SCG configuration or the PDCP configuration does not change, SN may not generate the respective container. For example, if the PDCP configuration is not changing from SN bearer to SN split bearer then SN 104 may not generate PDCP container 406. Likewise, if the SCG configuration is not changing then SN 104 may not generate SCG configuration container 404. At 1136, SN can transmit the encapsulated SCG configuration and the encapsulated PDCP configuration for SN split bearer to MN. It is noted, that only containers which are generated (e.g., where the configuration changes) need be transmitted.

At 1138, MN can generate and transmit to UE 106 RRC message including separately encoded SCG configuration and PDCP configuration for SN split bearer (e.g., RRC structure 400, or the like). In some examples, the RRC message generated at 1038 may omit either or both containers 404 and/or 406. For example, the RRC message may omit container 404 if the SCG configuration is not changing and SN 104 did not generate the container at 1032. Likewise, the RRC message may omit container 406 if the PDCP configuration is not changing and SN 104 did not generate the container at 1034.

It is to be appreciated, that the example communication flows for technique to unify bearers in the UE depicted in FIGS. 6D, 7D, 8D, 9D, 10D, and 11D provide for the least impact on network handling compared to the example communication flows for techniques to unify bearers in the UE depicted in FIGS. 6B-6C, 7B-7C, 8B-8C, 9B-9C, 10B-10C, and 11B-11C. For example, flows depicted in FIGS. 6B-6C, 7B-7C, 8B-8C, 9B-9C, 10B-10C, and 11B-11C may require the SN to provide PDCP configuration for the split bearer to the MN to be included in the MCG configuration and vice versa. For example, if the PDCP configuration for the split bearer is to be included in the MCG configuration for the SCG bearer to SCG split bearer (e.g., flow 1010 of FIG. 10B), the SN has to provide the PDCP configuration of the split bearer to the MN in order for it to include it in MCG configuration.

Figure 12A:
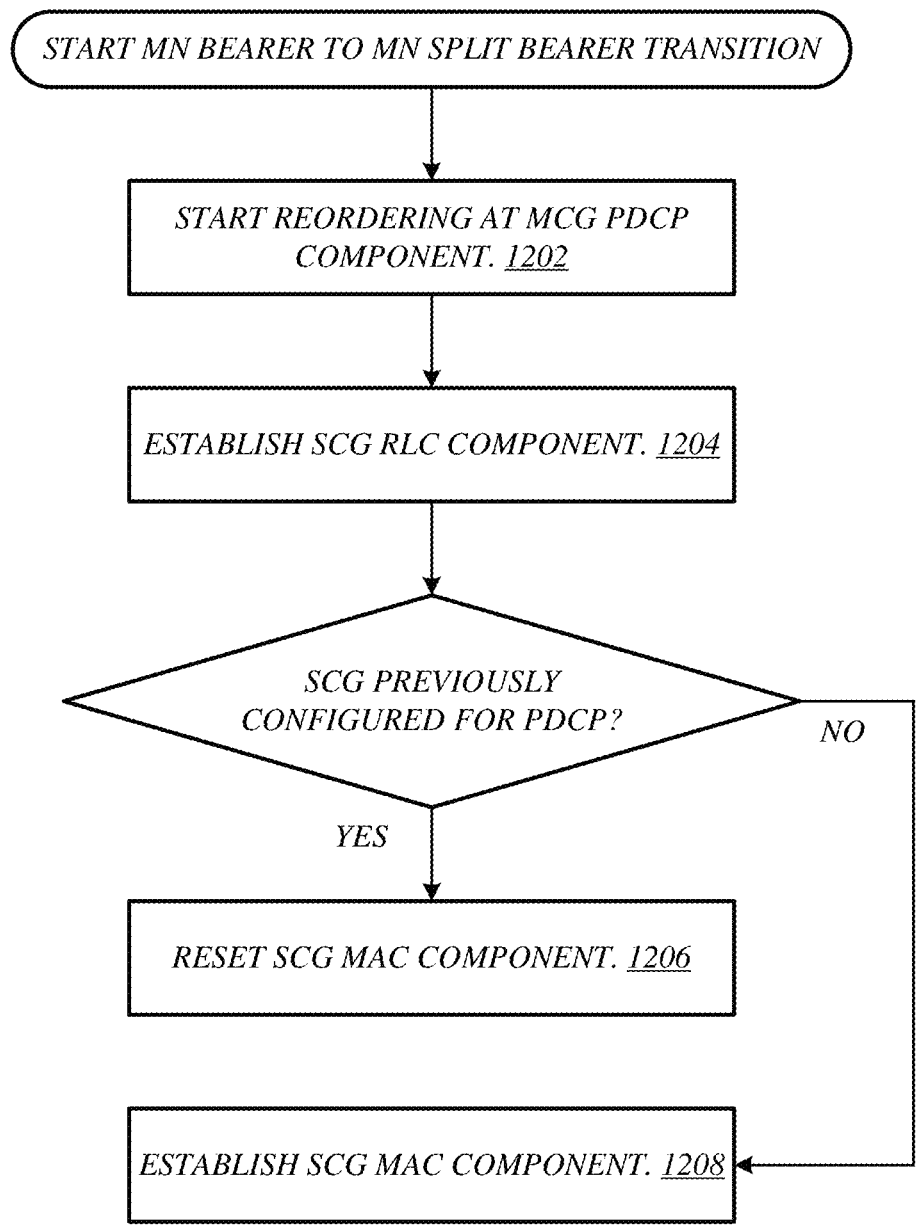
FIGS. 12A-12B illustrates embodiments of first and second logic flows.
Figure 12B:
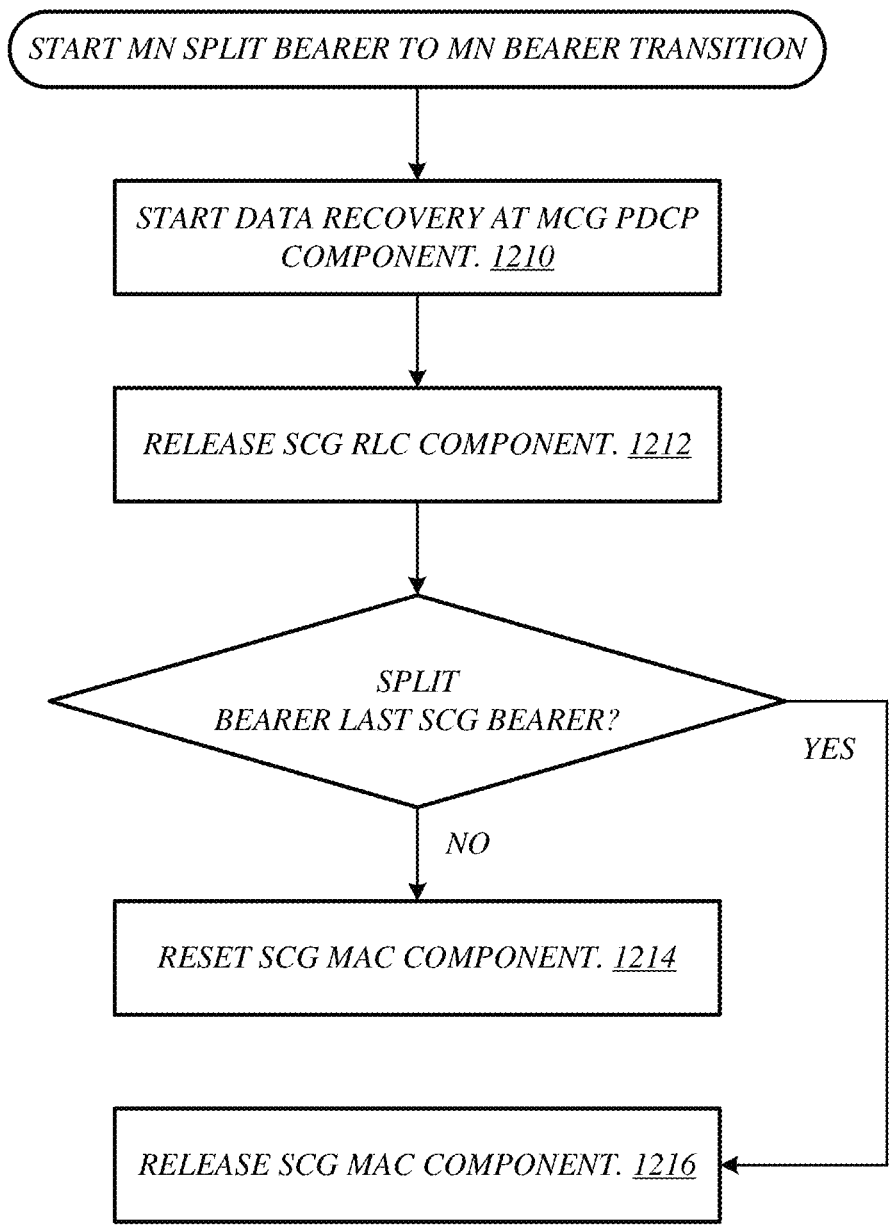
Figure 13A:
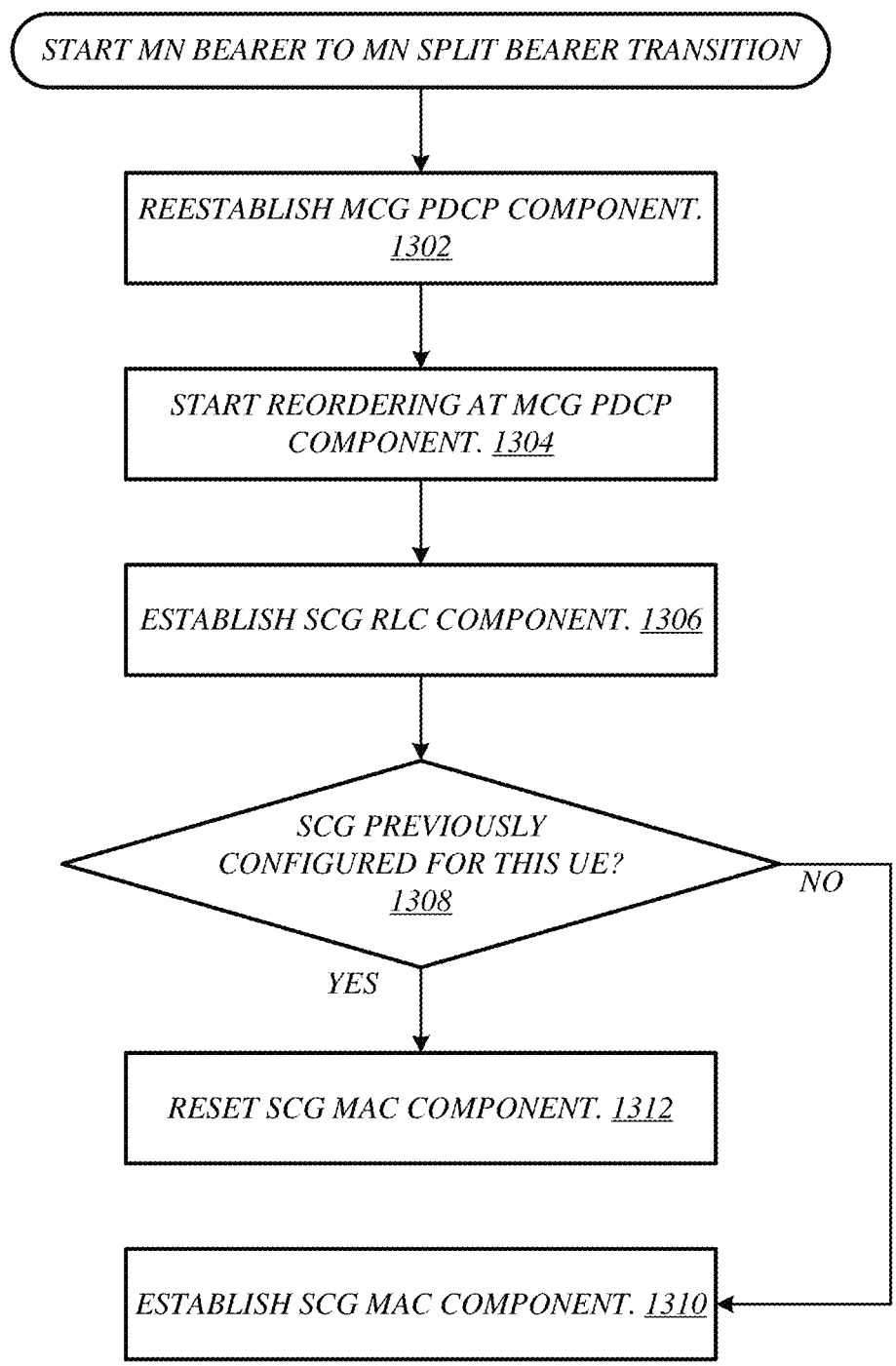
FIGS. 13A-13B illustrates embodiments of third and fourth logic flows.
Figure 13B:
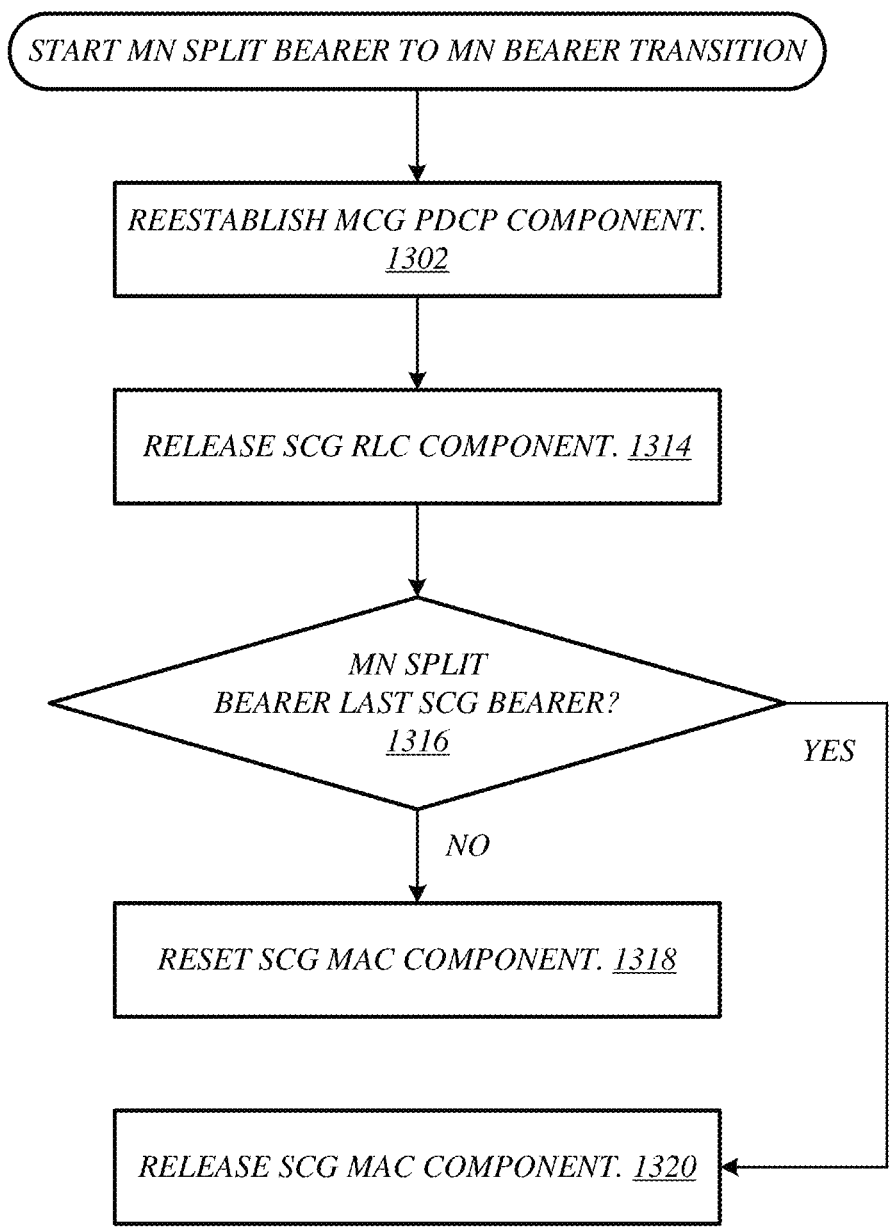

FIGS. 12A-12B and 13A-13B illustrate examples of logic flows that may be representative of the implementation of one or more of the disclosed bearer type change techniques according to various embodiments. For example, according to some embodiments, the depicted logic flows may be representative of operations that UE 106 may perform in conjunction with establishing PDCP communication in environment 100 during a bearer type change. FIGS. 12A-12B depict logic flows representative of operations of a UE responsive to a bearer type change where the bearer is not unified at the UE while FIGS. 13A-13B depict logic flows representative of operations of a UE responsive to a bearer type change where the bearer is unified at the UE. It is noted, that FIGS. 12A-12B and 13A-13B are representative of operation performed by a UE responsive to MN bearer to MN split bearer or MN split bearer to MN bearer type changes. These figures are also representative of operations performed by a UE responsive to SN bearer to SN split bearer or SN split bearer to SN bearer type changes. Examples are not limited in this context.

Turning more particularly to FIG. 12A, logic flow 1200 representative of operations that may be performed by UE 106 in conjunction with a bearer type change from MN bearer to MN split bearer where the bearer is not unified at the UE is depicted. As shown in this figure, UE 106 may start reordering at the MCG PDCP layer component of the layer stack of UE 106 at 1202. At 1204, UE 106 may establish the SCG radio link control (RLC) layer component of the layer stack of UE 106. At 1206, UE 106 can reset the SCG medium access control (MAC) layer component of the layer stack of UE 106 where the SCG was previously configured for PDCP. Alternatively, UE 106 can establish the SCG MAC layer component of the layer stack of UE 106 where the SCG was not previously configured for PDCP at 1208.

Turning more particularly to FIG. 12B, logic flow 1201 representative of operations that may be performed by UE 106 in conjunction with a bearer type change from MN split bearer to MN bearer where the bearer is not unified at the UE is depicted. As shown in this figure, UE 106 may start data recovery at the MCG PDCP layer component of the layer stack of UE 106 at 1210. At 1212, UE 106 may release the SCG RLC layer component of the layer stack of UE 106. At 1214, UE 106 can reset the SCG MAC layer component of the layer stack of UE 106 where the MN split bearer was not the last SCG bearer. Alternatively, UE 106 can release the SCG MAC layer component of the layer stack of UE 106 where the MN split bearer was the last SCG bearer at 1216.

Turning more particularly to FIG. 13A, logic flow 1300 representative of operations that may be performed by UE 106 in conjunction with a bearer type change from MN bearer to MN split bearer where the bearer is unified at the UE is depicted. As shown in this figure, UE 106 may be requested to reestablish the MCG PDCP layer component of the layer stack of UE 106 at 1302. For example, UE 106 may reestablish the MCG layers to push remaining PDCP service data units (SDUs) to upper layers of the layer stack as UE 106 does not know whether the split is MN or SN bearer. At 1304, UE 106 may start reordering at the MCG PDCP layer component of the layer stack of UE 106. At 1306 UE 106 may establish the SCG RLC layer component of the layer stack of UE 106.

Continuing to decision block 1308, a determination can be made as to whether SCG was previously configured for UE 106. For example, a determination can be made (e.g., by the UE 106, by a node on the network (e.g., MN 102, or the like)) whether SCG RLC and MAC layer components were previously configured. Logic flow 1300 can continue from decision block 1308 to block 1310 based on a determination that SCG was not previously configured for UE 106. At 1310, UE 106 can establish the SCG MAC layer component of the layer stack of UE 106 where the SCG was not previously configured for PDCP at 1310. Alternatively, logic flow 1300 can continue from decision block 1308 to block 1312 based on a determination that SCG was previously configured for UE 106. At 1312, UE 106 can be requested to reset the SCG MAC layer component of the layer stack of UE 106 where the SCG was previously configured for this UE. In some examples, UE 106 may only reset SCG MAC layer components of the layer stack of UE 106 where the SCG was previously configured and where the current PDCP configuration is different. It is noted, that block 1312 is optional and may not always be included in logic flow 1300.

Turning more particularly to FIG. 13B, logic flow 1301 representative of operations that may be performed by UE 106 in conjunction with a bearer type change from MN split bearer to MN bearer where the bearer is unified at the UE is depicted. As shown in this figure, UE 106 may be requested to reestablish the MCG PDCP layer components of the layer stack of UE 106 at 1302. For example, UE 106 may be requested to perform PDCP reestablishment at 1302 as the UE does not know whether the split is MN or SN bearer. At 1314, UE 106 may release the SCG RLC layer component of the layer stack of UE 106.

Continuing to decision block 1316, a determination can be made as to whether the MN split bearer was the last SCG bearer was previously configured for UE 106. For example, a determination can be made (e.g., by the UE 106, by a node on the network (e.g., MN 102, or the like)) whether the MN split bearer was the last SCG bearer. Logic flow 1301 can continue from decision block 1316 to block 1318 based on a determination that the MN split bearer was not the last SCG bearer. At 1318, UE 106 can be requested to reset the SCG MAC layer component of the layer stack of UE 106 where the MN split bearer was not the last SCG bearer. In some examples, UE 106 may only be requested to reset SCG MAC layer components (e.g., at 1318) of the layer stack of UE 106 where the SCG was previously configured and where the current PDCP configuration is different. Alternatively, logic flow 1301 can continue from decision block 1316 to block 1320 based on a determination that the MN split bearer was the last SCG bearer. At 1320, UE 106 can release the SCG MAC layer component of the layer stack of UE 106 where the MN split bearer was the last SCG bearer.

As noted above, the logic flows for a UE depicted in FIGS. 13A and 13B can be abstracted and applied to other bearer type changes, such as, for example and SN bearer to SN split bearer type change or an SN split to SN bearer type change.

Figure 14:
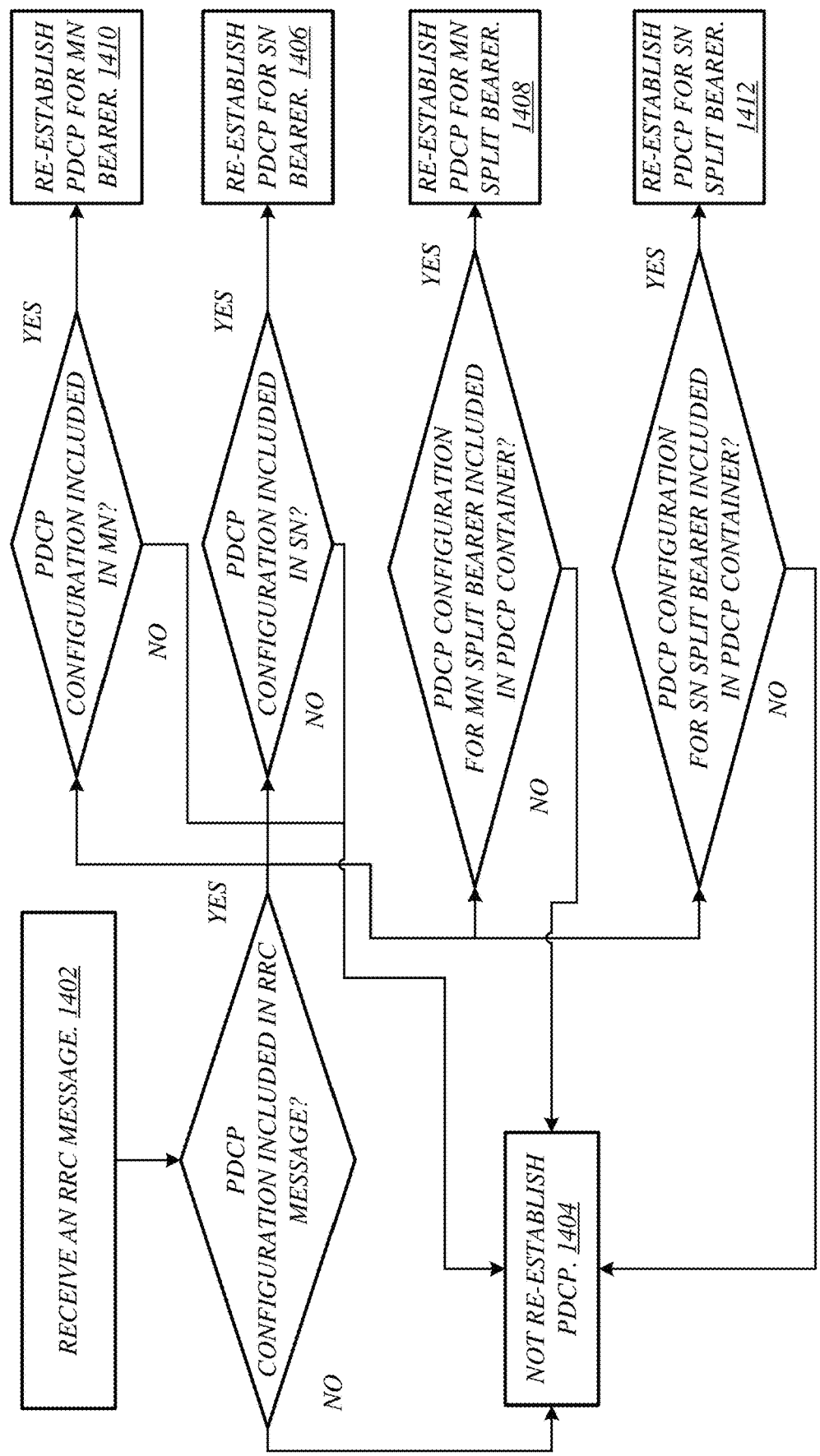
FIG. 14 illustrates an embodiment of a fifth logic flow.

FIG. 14 illustrates an example logic flow 1400 that may be representative of the implementation of one or more of the disclosed communication techniques according to various embodiments. For example, according to some embodiments, logic flow 1400 may be representative of operations that UE 106 may perform in conjunction with receiving an RRC message.

At 1402, UE 106 can receive an RRC message. For example, UE 106 can receive an RRC message having a message structure like structure 200, like structure 400, or another RRC message structure. Said differently, at 1402, UE 106 may not re-establish PDCP for either MCG or SCG where the RRC message does not include PDCP configuration information. For example, for an SCG change with mobility where the final RRC message sent by the network does not include PDCP configuration information; UE 106, upon receiving the SCG change via RRC message where no PDCP configuration is included in the RRC message may not perform PDCP re-establishment. That is, UE 106 may not reestablish PDCP for any MN bearer, SN bearer, MN split bearer, or SN split bearer.

At 1406 and/or 1408, UE 106 can re-establish PDCP where the RRC message includes PDCP configuration information. For example, for an SN bearer where the final RRC message sent by the network includes PDCP configuration information for the SN bearer; UE 106, upon receiving the SCG change via RRC message where PDCP configuration is included in the RRC message, may perform PDCP re-establishment for the SN bearer at 1406. As another example, for an SN split bearer where the final RRC message sent by the network includes PDCP configuration information for the SN split bearer; UE 106, upon receiving the SCG change via RRC message where PDCP configuration is included in the RRC message, may perform PDCP re-establishment for the SN split bearer at 1408. As another example, for MN bearer and MN split bearer, where the final RRC message sent by the network does not include PDCP configuration information; UE 106, responsive to receiving the SCG change via RRC message where no PDCP configuration information is included in the RRC message, may not re-establish PDCP for the MN bearer or MN split bearer at 1404.

At 1410 and/or 1412, UE 106 can re-establish PDCP where the RRC message includes PDCP configuration information. For example, for an MN bearer where the final RRC message sent by the network includes PDCP configuration information for the MN bearer; UE 106, upon receiving an RRC message for MCG handover (HO) where PDCP configuration is included in the RRC message, may perform PDCP re-establishment for the MN bearer at 1410. As another example, for an MN split bearer where the final RRC message sent by the network includes PDCP configuration information for the MN split bearer; UE 106, upon receiving an RRC message for MCG HO where PDCP configuration is included in the RRC message, may perform PDCP re-establishment for the MN split bearer at 1412. As another example, for SN bearer and SN split bearer, where the final RRC message sent by the network does not include PDCP configuration information; UE 106, responsive to receiving the MCG HO via RRC message where no PDCP configuration information is included in the RRC message, may not re-establish PDCP for the MN bearer or MN split bearer at 1404.

As another example, for an SN bearer where the final RRC message sent by the network includes PDCP configuration information for the SN bearer; UE 106, upon receiving an RRC message for MCG handover (HO) where PDCP configuration is included in the RRC message, may perform PDCP re-establishment for the SN bearer at 1406. Likewise, for an SN split bearer where the final RRC message sent by the network includes PDCP configuration information for the SN split bearer; UE 106, upon receiving an RRC message for MCG HO where PDCP configuration is included in the RRC message, may perform PDCP re-establishment for the SN split bearer at 1408.

Figure 15:
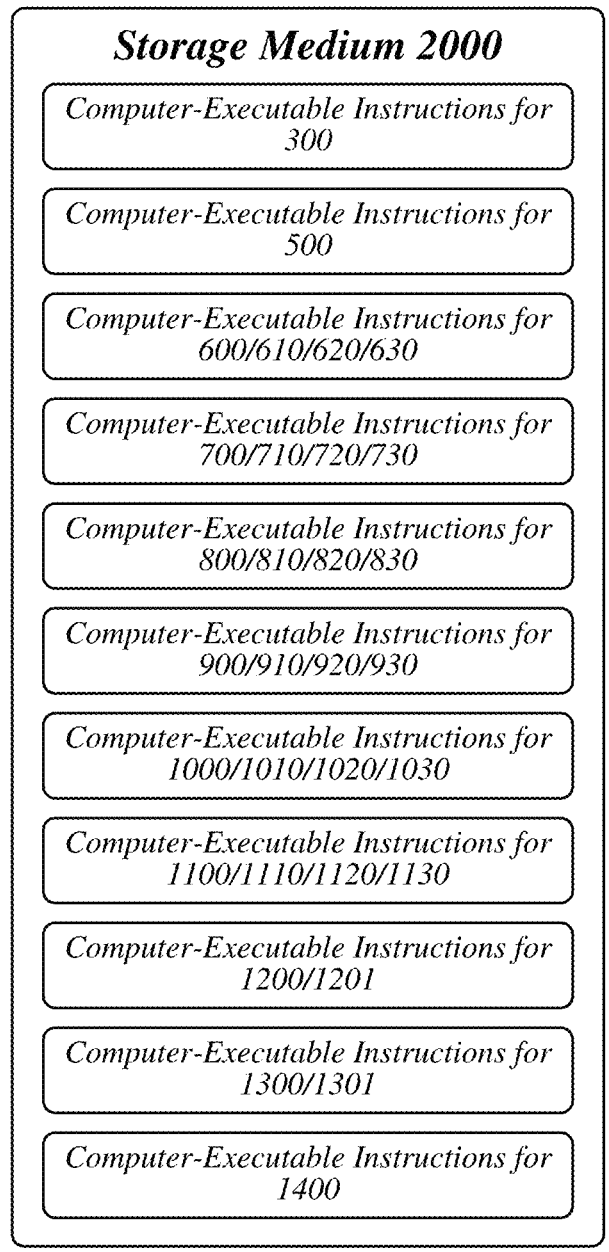
FIG. 15 illustrates an embodiment of a storage medium.

FIG. 15 illustrates an embodiment of a storage medium 1500. Storage medium 1500 may comprise any non-transitory computer-readable storage medium or machine-readable storage medium, such as an optical, magnetic or semiconductor storage medium. In various embodiments, storage medium 1500 may comprise an article of manufacture. In some embodiments, storage medium 1500 may store computer-executable instructions, such as computer-executable instructions to implement one or more of communication flow 300, communication flow 500, communication flow 600, communication flow 610, communication flow 620, communication flow 630, communication flow 700, communication flow 710, communication flow 720, communication flow 730, communication flow 800, communication flow 810, communication flow 820, communication flow 830, communication flow 900, communication flow 910, communication flow 920, communication flow 930, communication flow 1000, communication flow 1010, communication flow 1020, communication flow 1030, communication flow 1100, communication flow 1110, communication flow 1120, communication flow 1130, logic flow 1200, logic flow 1201, logic flow 1300, logic flow 1301, and logic flow 1400.

Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 16:
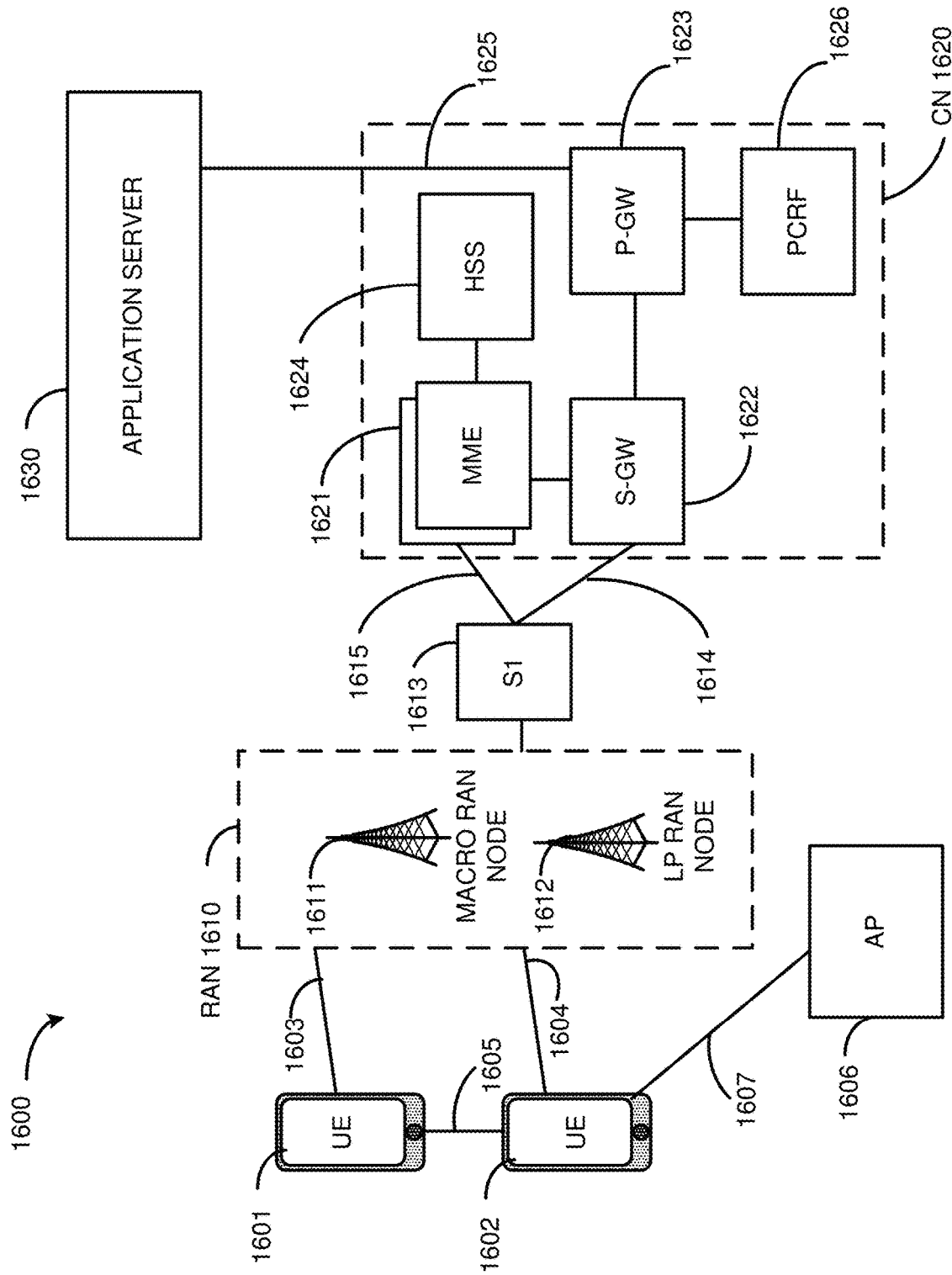
FIG. 16 illustrates an embodiment of a system architecture.

FIG. 16 illustrates an architecture of a system 1600 of a network in accordance with some embodiments. The system 1600 is shown to include a user equipment (UE) 1601 and a UE 1602. The UEs 1601 and 1602 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1601 and 1602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1601 and 1602 may be configured to connect, e.g., communicatively couple, with a radio access network (RAN) 1610—the RAN 1610 may be, for example, an Evolved Universal Mobile Telecommunications System (UMTS) Terrestrial Radio Access Network (E-UTRAN), a NextGen RAN (NG RAN), or some other type of RAN. The UEs 1601 and 1602 utilize connections 1603 and 1604, respectively, each of which comprises a physical communications interface or layer (discussed in further detail below); in this example, the connections 1603 and 1604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1601 and 1602 may further directly exchange communication data via a ProSe interface 1605. The ProSe interface 1605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1602 is shown to be configured to access an access point (AP) 1606 via connection 1607. The connection 1607 can comprise a local wireless connection, such as a connection consistent with any IEEE 802.11 protocol, wherein the AP 1606 would comprise a wireless fidelity (WiFi®) router. In this example, the AP 1606 is shown to be connected to the Internet without connecting to the core network of the wireless system (described in further detail below).

The RAN 1610 can include one or more access nodes that enable the connections 1603 and 1604. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1610 may include one or more RAN nodes for providing macrocells, e.g., macro RAN node 1611, and one or more RAN nodes for providing femtocells or picocells (e.g., cells having smaller coverage areas, smaller user capacity, or higher bandwidth compared to macrocells), e.g., low power (LP) RAN node 1612.

Any of the RAN nodes 1611 and 1612 can terminate the air interface protocol and can be the first point of contact for the UEs 1601 and 1602. In some embodiments, any of the RAN nodes 1611 and 1612 can fulfill various logical functions for the RAN 1610 including, but not limited to, radio network controller (RNC) functions such as radio bearer management, uplink and downlink dynamic radio resource management and data packet scheduling, and mobility management.

In accordance with some embodiments, the UEs 1601 and 1602 can be configured to communicate using Orthogonal Frequency-Division Multiplexing (OFDM) communication signals with each other or with any of the RAN nodes 1611 and 1612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1611 and 1612 to the UEs 1601 and 1602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1601 and 1602. The physical downlink control channel (PDCCH) may carry information about the transport format and resource allocations related to the PDSCH channel, among other things. It may also inform the UEs 1601 and 1602 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1611 and 1612 based on channel quality information fed back from any of the UEs 1601 and 1602. The downlink resource assignment information may be sent on the PDCCH used for (e.g., assigned to) each of the UEs 1601 and 1602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1610 is shown to be communicatively coupled to a core network (CN) 1620—via an S1 interface 1613. In embodiments, the CN 1620 may be an evolved packet core (EPC) network, a NextGen Packet Core (NPC) network, or some other type of CN. In this embodiment the S1 interface 1613 is split into two parts: the S1-U interface 1614, which carries traffic data between the RAN nodes 1611 and 1612 and the serving gateway (S-GW) 1622, and the S1-mobility management entity (MME) interface 1615, which is a signaling interface between the RAN nodes 1611 and 1612 and MMEs 1621.

In this embodiment, the CN 1620 comprises the MMEs 1621, the S-GW 1622, the Packet Data Network (PDN) Gateway (P-GW) 1623, and a home subscriber server (HSS) 1624. The MMEs 1621 may be similar in function to the control plane of legacy Serving General Packet Radio Service (GPRS) Support Nodes (SGSN). The MMEs 1621 may manage mobility aspects in access such as gateway selection and tracking area list management. The HSS 1624 may comprise a database for network users, including subscription-related information to support the network entities' handling of communication sessions. The CN 1620 may comprise one or several HSSs 1624, depending on the number of mobile subscribers, on the capacity of the equipment, on the organization of the network, etc. For example, the HSS 1624 can provide support for routing/roaming, authentication, authorization, naming/addressing resolution, location dependencies, etc.

The S-GW 1622 may terminate the S1 interface 1613 towards the RAN 1610, and routes data packets between the RAN 1610 and the CN 1620. In addition, the S-GW 1622 may be a local mobility anchor point for inter-RAN node handovers and also may provide an anchor for inter-3GPP mobility. Other responsibilities may include lawful intercept, charging, and some policy enforcement.

The P-GW 1623 may terminate an SGi interface toward a PDN. The P-GW 1623 may route data packets between the EPC network 1623 and external networks such as a network including the application server 1630 (alternatively referred to as application function (AF)) via an Internet Protocol (IP) interface 1625. Generally, the application server 1630 may be an element offering applications that use IP bearer resources with the core network (e.g., UMTS Packet Services (PS) domain, LTE PS data services, etc.). In this embodiment, the P-GW 1623 is shown to be communicatively coupled to an application server 1630 via an IP communications interface 1625. The application server 1630 can also be configured to support one or more communication services (e.g., Voice-over-Internet Protocol (VoIP) sessions, PTT sessions, group communication sessions, social networking services, etc.) for the UEs 1601 and 1602 via the CN 1620.

The P-GW 1623 may further be a node for policy enforcement and charging data collection. Policy and Charging Enforcement Function (PCRF) 1626 is the policy and charging control element of the CN 1620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1626 may be communicatively coupled to the application server 1630 via the P-GW 1623. The application server 1630 may signal the PCRF 1626 to indicate a new service flow and select the appropriate Quality of Service (QoS) and charging parameters. The PCRF 1626 may provision this rule into a Policy and Charging Enforcement Function (PCEF) (not shown) with the appropriate traffic flow template (TFT) and QoS class of identifier (QCI), which commences the QoS and charging as specified by the application server 1630.

Figure 17:
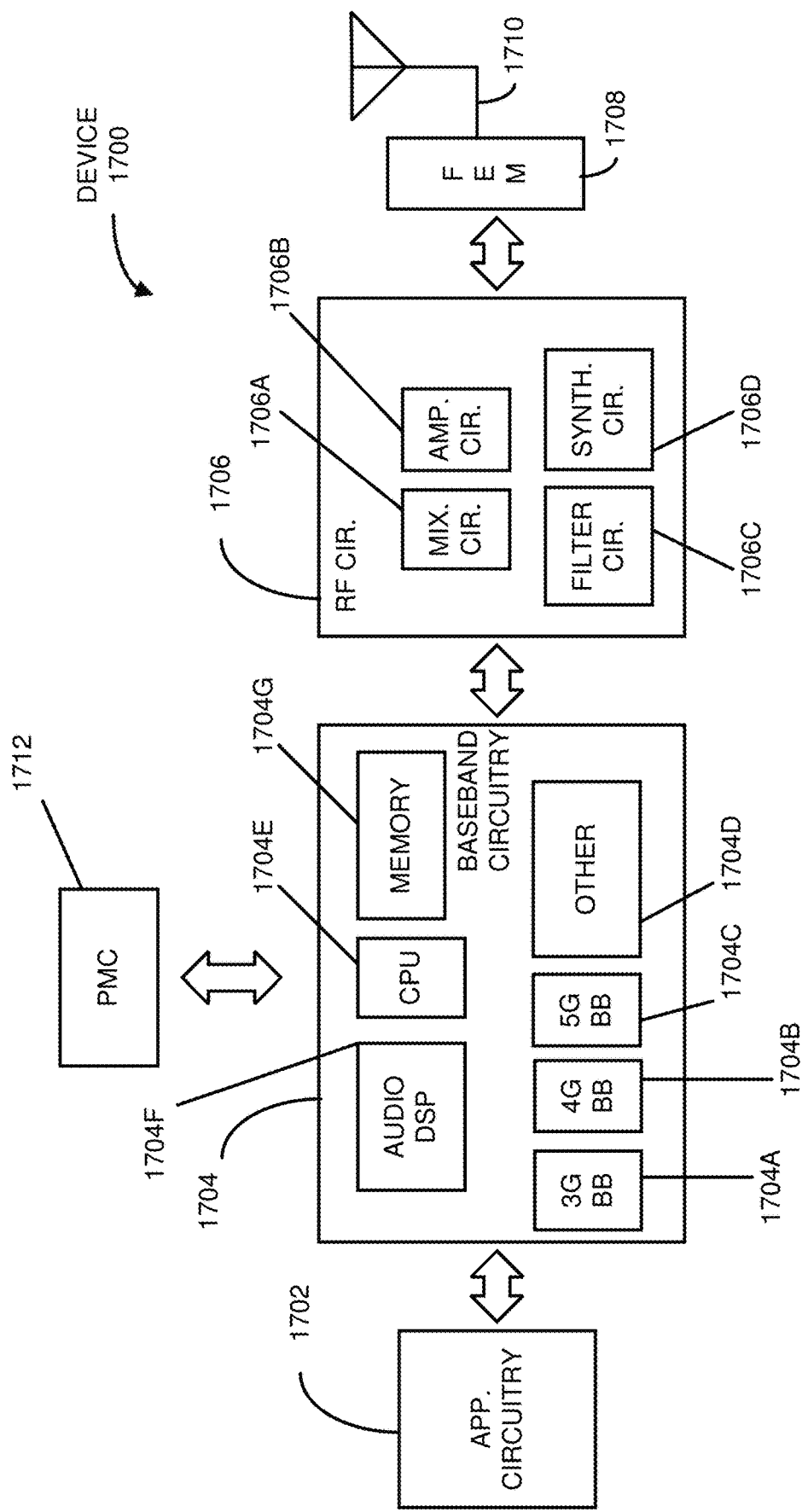
FIG. 17 illustrates an embodiment of a device.

FIG. 17 illustrates example components of a device 1700 in accordance with some embodiments. In some embodiments, the device 1700 may include application circuitry 1702, baseband circuitry 1704, Radio Frequency (RF) circuitry 1706, front-end module (FEM) circuitry 1708, one or more antennas 1710, and power management circuitry (PMC) 1712 coupled together at least as shown. The components of the illustrated device 1700 may be included in a UE or a RAN node. In some embodiments, the device 1700 may include less elements (e.g., a RAN node may not utilize application circuitry 1702, and instead include a processor/controller to process IP data received from an EPC). In some embodiments, the device 1700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1702 may include one or more application processors. For example, the application circuitry 1702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1700. In some embodiments, processors of application circuitry 1702 may process IP data packets received from an EPC.

The baseband circuitry 1704 may include circuitry such as, but not limited to, one or more single-core or multi-core processors. The baseband circuitry 1704 may include one or more baseband processors or control logic to process baseband signals received from a receive signal path of the RF circuitry 1706 and to generate baseband signals for a transmit signal path of the RF circuitry 1706. Baseband processing circuitry 1704 may interface with the application circuitry 1702 for generation and processing of the baseband signals and for controlling operations of the RF circuitry 1706. For example, in some embodiments, the baseband circuitry 1704 may include a third generation (3G) baseband processor 1704A, a fourth generation (4G) baseband processor 1704B, a fifth generation (5G) baseband processor 1704C, or other baseband processor(s) 1704D for other existing generations, generations in development or to be developed in the future (e.g., second generation (2G), sixth generation (6G), etc.). The baseband circuitry 1704 (e.g., one or more of baseband processors 1704A-D) may handle various radio control functions that enable communication with one or more radio networks via the RF circuitry 1706. In other embodiments, some or all of the functionality of baseband processors 1704A-D may be included in modules stored in the memory 1704G and executed via a Central Processing Unit (CPU) 1704E. The radio control functions may include, but are not limited to, signal modulation/demodulation, encoding/decoding, radio frequency shifting, etc. In some embodiments, modulation/demodulation circuitry of the baseband circuitry 1704 may include Fast-Fourier Transform (FFT), preceding, or constellation mapping/demapping functionality. In some embodiments, encoding/decoding circuitry of the baseband circuitry 1704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1704 may include one or more audio digital signal processor(s) (DSP) 1704F. The audio DSP(s) 1704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1704 and the application circuitry 1702 may be implemented together such as, for example, on a system on a chip (SOC).

In some embodiments, the baseband circuitry 1704 may provide for communication compatible with one or more radio technologies. For example, in some embodiments, the baseband circuitry 1704 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1704 is configured to support radio communications of more than one wireless protocol may be referred to as multi-mode baseband circuitry.

RF circuitry 1706 may enable communication with wireless networks using modulated electromagnetic radiation through a non-solid medium. In various embodiments, the RF circuitry 1706 may include switches, filters, amplifiers, etc. to facilitate the communication with the wireless network. RF circuitry 1706 may include a receive signal path which may include circuitry to down-convert RF signals received from the FEM circuitry 1708 and provide baseband signals to the baseband circuitry 1704. RF circuitry 1706 may also include a transmit signal path which may include circuitry to up-convert baseband signals provided by the baseband circuitry 1704 and provide RF output signals to the FEM circuitry 1708 for transmission.

In some embodiments, the receive signal path of the RF circuitry 1706 may include mixer circuitry 1706a, amplifier circuitry 1706b and filter circuitry 1706c. In some embodiments, the transmit signal path of the RF circuitry 1706 may include filter circuitry 1706c and mixer circuitry 1706a. RF circuitry 1706 may also include synthesizer circuitry 1706d for synthesizing a frequency for use by the mixer circuitry 1706a of the receive signal path and the transmit signal path. In some embodiments, the mixer circuitry 1706a of the receive signal path may be configured to down-convert RF signals received from the FEM circuitry 1708 based on the synthesized frequency provided by synthesizer circuitry 1706d. The amplifier circuitry 1706b may be configured to amplify the down-converted signals and the filter circuitry 1706c may be a low-pass filter (LPF) or band-pass filter (BPF) configured to remove unwanted signals from the down-converted signals to generate output baseband signals. Output baseband signals may be provided to the baseband circuitry 1704 for further processing. In some embodiments, the output baseband signals may be zero-frequency baseband signals, although this is not a requirement. In some embodiments, mixer circuitry 1706a of the receive signal path may comprise passive mixers, although the scope of the embodiments is not limited in this respect.

In some embodiments, the mixer circuitry 1706a of the transmit signal path may be configured to up-convert input baseband signals based on the synthesized frequency provided by the synthesizer circuitry 1706d to generate RF output signals for the FEM circuitry 1708. The baseband signals may be provided by the baseband circuitry 1704 and may be filtered by filter circuitry 1706c.

In some embodiments, the mixer circuitry 1706a of the receive signal path and the mixer circuitry 1706a of the transmit signal path may include two or more mixers and may be arranged for quadrature downconversion and upconversion, respectively. In some embodiments, the mixer circuitry 1706a of the receive signal path and the mixer circuitry 1706a of the transmit signal path may include two or more mixers and may be arranged for image rejection (e.g., Hartley image rejection). In some embodiments, the mixer circuitry 1706a of the receive signal path and the mixer circuitry 1706a may be arranged for direct downconversion and direct upconversion, respectively. In some embodiments, the mixer circuitry 1706a of the receive signal path and the mixer circuitry 1706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1706 may include analog-to-digital converter (ADC) and digital-to-analog converter (DAC) circuitry and the baseband circuitry 1704 may include a digital baseband interface to communicate with the RF circuitry 1706.

In some dual-mode embodiments, a separate radio IC circuitry may be provided for processing signals for each spectrum, although the scope of the embodiments is not limited in this respect.

In some embodiments, the synthesizer circuitry 1706d may be a fractional-N synthesizer or a fractional N/N+1 synthesizer, although the scope of the embodiments is not limited in this respect as other types of frequency synthesizers may be suitable. For example, synthesizer circuitry 1706d may be a delta-sigma synthesizer, a frequency multiplier, or a synthesizer comprising a phase-locked loop with a frequency divider.

The synthesizer circuitry 1706d may be configured to synthesize an output frequency for use by the mixer circuitry 1706a of the RF circuitry 1706 based on a frequency input and a divider control input. In some embodiments, the synthesizer circuitry 1706d may be a fractional N/N+1 synthesizer.

In some embodiments, frequency input may be provided by a voltage controlled oscillator (VCO), although that is not a requirement. Divider control input may be provided by either the baseband circuitry 1704 or the applications processor 1702 depending on the desired output frequency. In some embodiments, a divider control input (e.g., N) may be determined from a look-up table based on a channel indicated by the applications processor 1702.

Synthesizer circuitry 1706d of the RF circuitry 1706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1706 may include an IQ/polar converter.

FEM circuitry 1708 may include a receive signal path which may include circuitry configured to operate on RF signals received from one or more antennas 1710, amplify the received signals and provide the amplified versions of the received signals to the RF circuitry 1706 for further processing. FEM circuitry 1708 may also include a transmit signal path which may include circuitry configured to amplify signals for transmission provided by the RF circuitry 1706 for transmission by one or more of the one or more antennas 1710. In various embodiments, the amplification through the transmit or receive signal paths may be done solely in the RF circuitry 1706, solely in the FEM 1708, or in both the RF circuitry 1706 and the FEM 1708.

In some embodiments, the FEM circuitry 1708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1706). The transmit signal path of the FEM circuitry 1708 may include a power amplifier (PA) to amplify input RF signals (e.g., provided by RF circuitry 1706), and one or more filters to generate RF signals for subsequent transmission (e.g., by one or more of the one or more antennas 1710).

In some embodiments, the PMC 1712 may manage power provided to the baseband circuitry 1704. In particular, the PMC 1712 may control power-source selection, voltage scaling, battery charging, or DC-to-DC conversion. The PMC 1712 may often be included when the device 1700 is capable of being powered by a battery, for example, when the device is included in a UE. The PMC 1712 may increase the power conversion efficiency while providing desirable implementation size and heat dissipation characteristics.

This figure shows the PMC 1712 coupled only with the baseband circuitry 1704. However, in other embodiments, the PMC 1712 may be additionally or alternatively coupled with, and perform similar power management operations for, other components such as, but not limited to, application circuitry 1702, RF circuitry 1706, or FEM 1708.

In some embodiments, the PMC 1712 may control, or otherwise be part of, various power saving mechanisms of the device 1700. For example, if the device 1700 is in an RRC_Connected state, where it is still connected to the RAN node as it expects to receive traffic shortly, then it may enter a state known as Discontinuous Reception Mode (DRX) after a period of inactivity. During this state, the device 1700 may power down for brief intervals of time and thus save power.

If there is no data traffic activity for an extended period of time, then the device 1700 may transition off to an RRC_Idle state, where it disconnects from the network and does not perform operations such as channel quality feedback, handover, etc. The device 1700 goes into a very low power state and it performs paging where again it periodically wakes up to listen to the network and then powers down again. The device 1700 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1702 and processors of the baseband circuitry 1704 may be used to execute elements of one or more instances of a protocol stack. For example, processors of the baseband circuitry 1704, alone or in combination, may be used execute Layer 3, Layer 2, or Layer 1 functionality, while processors of the application circuitry 1704 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 18:
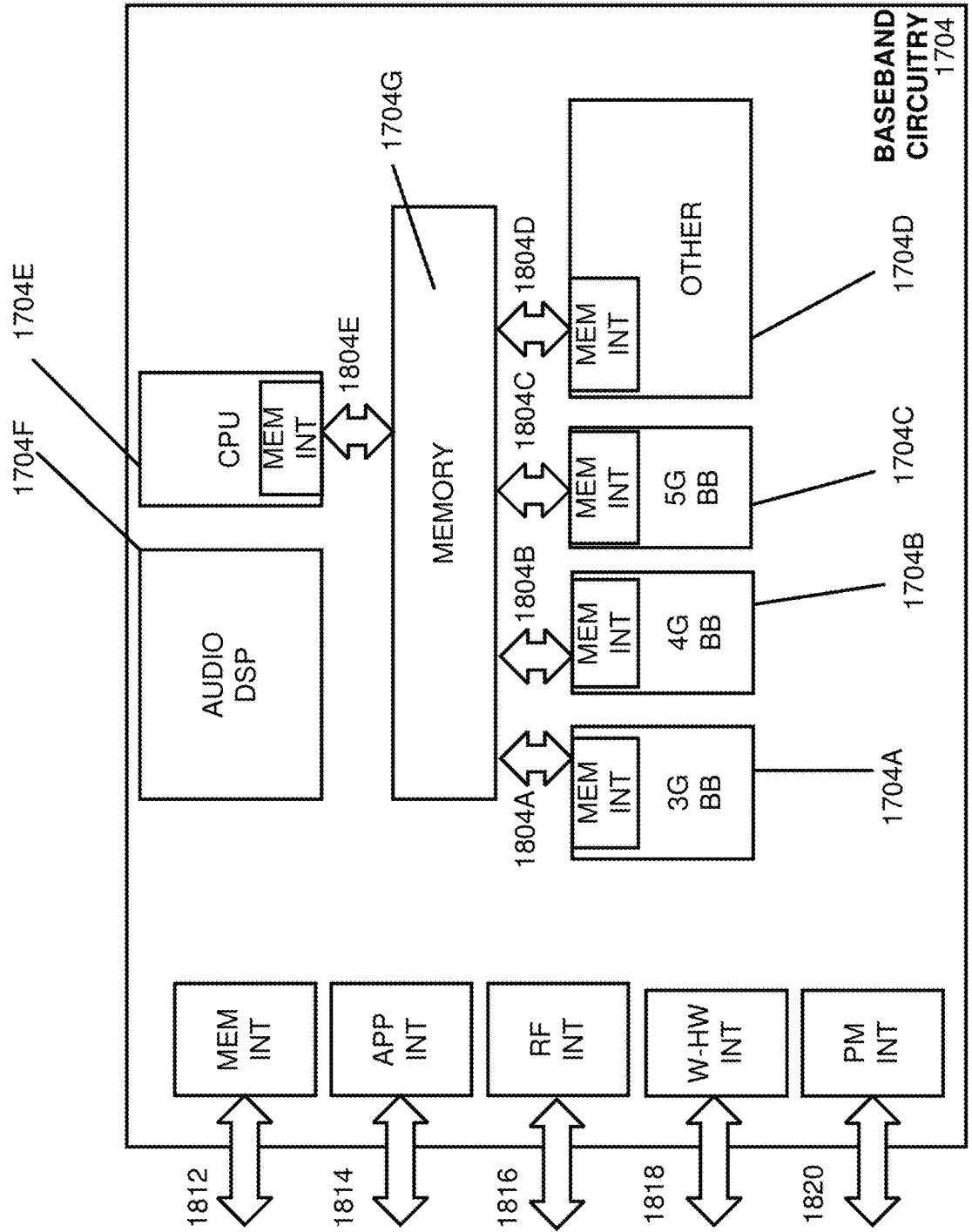
FIG. 18 illustrates an embodiment of baseband circuitry.

FIG. 18 illustrates example interfaces of baseband circuitry in accordance with some embodiments. As discussed above, the baseband circuitry 1704 of FIG. 17 may comprise processors 1704A-1704E and a memory 1704G utilized by said processors. Each of the processors 1704A-1704E may include a memory interface, 1804A-1804E, respectively, to send/receive data to/from the memory 1704G.

The baseband circuitry 1704 may further include one or more interfaces to communicatively couple to other circuitries/devices, such as a memory interface 1812 (e.g., an interface to send/receive data to/from memory external to the baseband circuitry 1704), an application circuitry interface 1814 (e.g., an interface to send/receive data to/from the application circuitry 1702 of FIG. 17), an RF circuitry interface 1816 (e.g., an interface to send/receive data to/from RF circuitry 1706 of FIG. 17), a wireless hardware connectivity interface 1818 (e.g., an interface to send/receive data to/from Near Field Communication (NFC) components, Bluetooth® components (e.g., Bluetooth® Low Energy), Wi-Fi® components, and other communication components), and a power management interface 1820 (e.g., an interface to send/receive power or control signals to/from the PMC 1712.

Figure 19:
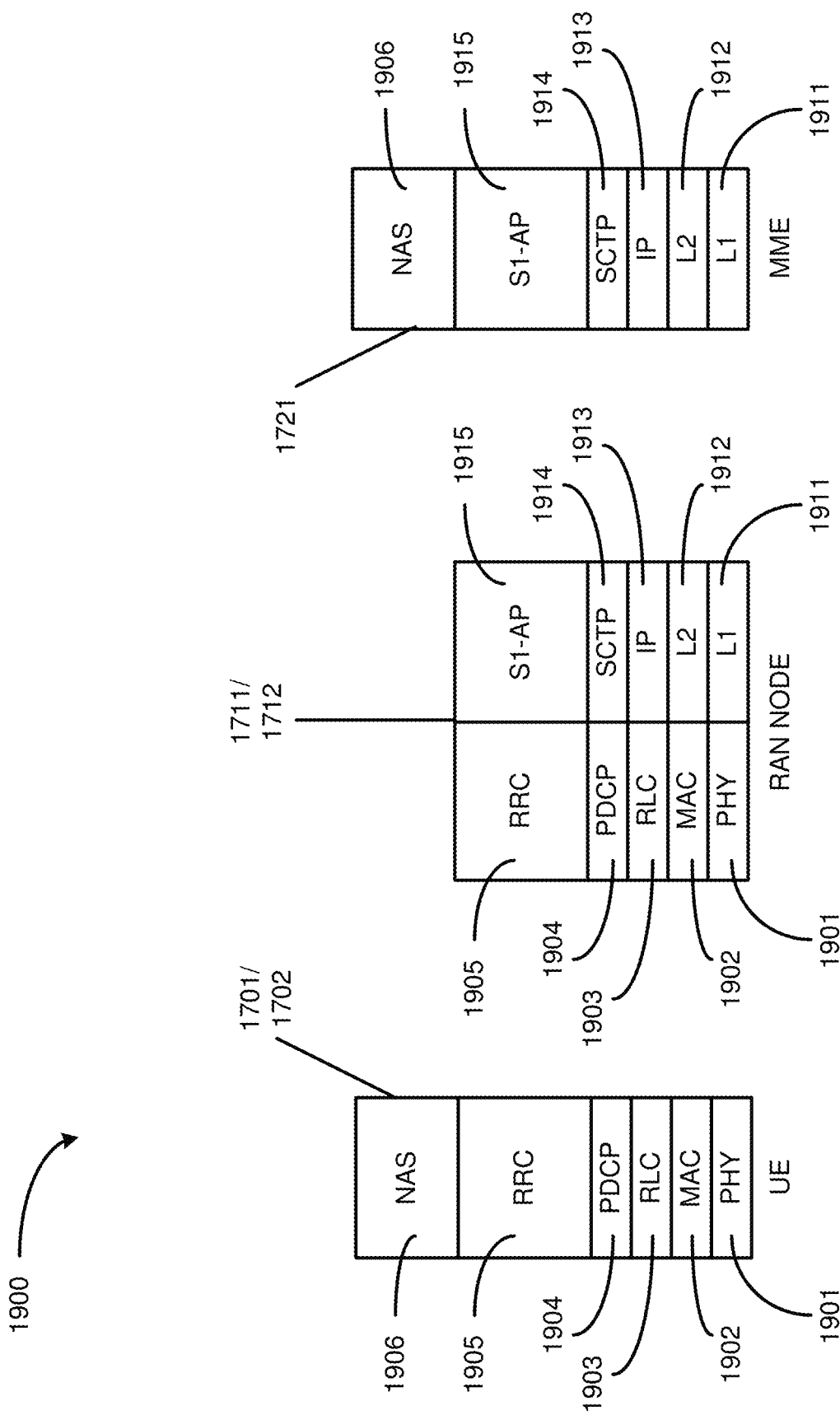
FIG. 19 illustrates an embodiment of a control plane protocol stack.

FIG. 19 is an illustration of a control plane protocol stack in accordance with some embodiments. In this embodiment, a control plane 1900 is shown as a communications protocol stack between the UE 1701 (or alternatively, the UE 1702), the RAN node 1711 (or alternatively, the RAN node 1712), and the MME 1721.

The PHY layer 1901 may transmit or receive information used by the MAC layer 1902 over one or more air interfaces. The PHY layer 1901 may further perform link adaptation or adaptive modulation and coding (AMC), power control, cell search (e.g., for initial synchronization and handover purposes), and other measurements used by higher layers, such as the RRC layer 1905. The PHY layer 1901 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1902 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1903 may operate in a plurality of modes of operation, including: Transparent Mode (TM), Unacknowledged Mode (UM), and Acknowledged Mode (AM). The RLC layer 1903 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1903 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1904 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1905 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 1701 and the RAN node 1711 may utilize a Uu interface (e.g., an LTE-Uu interface) to exchange control plane data via a protocol stack comprising the PHY layer 1901, the MAC layer 1902, the RLC layer 1903, the PDCP layer 1904, and the RRC layer 1905.

The non-access stratum (NAS) protocols 1906 form the highest stratum of the control plane between the UE 1701 and the MME 1721. The NAS protocols 1906 support the mobility of the UE 1701 and the session management procedures to establish and maintain IP connectivity between the UE 1701 and the P-GW 1723.

The S1 Application Protocol (S1-AP) layer 1915 may support the functions of the S1 interface and comprise Elementary Procedures (EPs). An EP is a unit of interaction between the RAN node 1711 and the CN 1720. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1914 may ensure reliable delivery of signaling messages between the RAN node 1711 and the MME 1721 based, in part, on the IP protocol, supported by the IP layer 1913. The L2 layer 1912 and the L1 layer 1911 may refer to communication links (e.g., wired or wireless) used by the RAN node and the MME to exchange information.

The RAN node 1711 and the MME 1721 may utilize an S1-MME interface to exchange control plane data via a protocol stack comprising the L1 layer 1911, the L2 layer 1912, the IP layer 1913, the SCTP layer 1914, and the S1-AP layer 1915.

Figure 20:
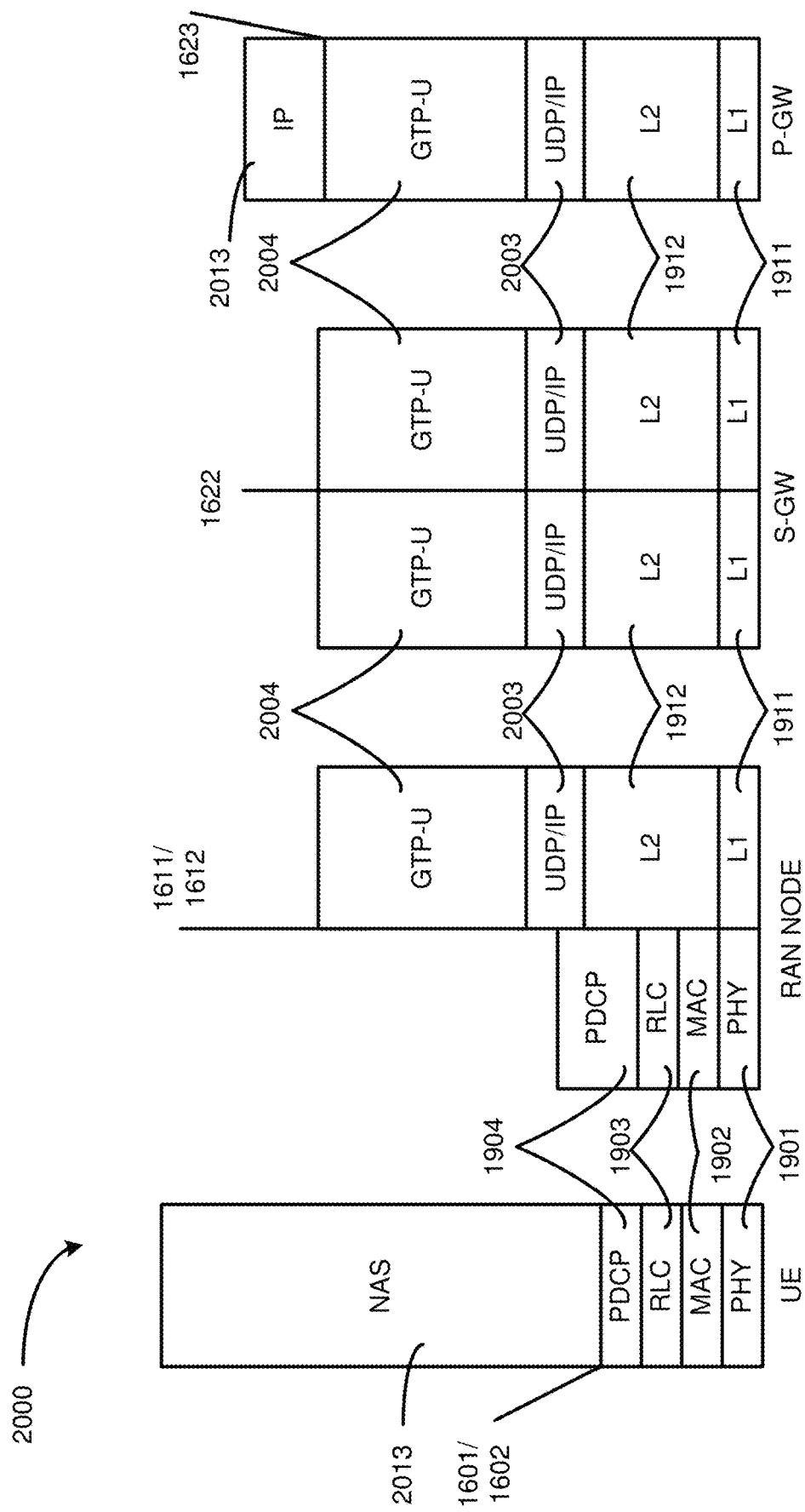
FIG. 20 illustrates an embodiment of a user plane protocol stack.

FIG. 20 is an illustration of a user plane protocol stack in accordance with some embodiments. In this embodiment, a user plane 2000 is shown as a communications protocol stack between the UE 1601 (or alternatively, the UE 1602), the RAN node 1611 (or alternatively, the RAN node 1612), the S-GW 1622, and the P-GW 1623. The user plane 2000 may utilize at least some of the same protocol layers as the control plane 1900. For example, the UE 1601 and the RAN node 1611 may utilize a Uu interface (e.g., an LTE-Uu interface) to exchange user plane data via a protocol stack comprising the PHY layer 1901, the MAC layer 1902, the RLC layer 1903, the PDCP layer 1904.

The General Packet Radio Service (GPRS) Tunneling Protocol for the user plane (GTP-U) layer 2004 may be used for carrying user data within the GPRS core network and between the radio access network and the core network. The user data transported can be packets in any of IPv4, IPv6, or PPP formats, for example. The UDP and IP security (UDP/IP) layer 2003 may provide checksums for data integrity, port numbers for addressing different functions at the source and destination, and encryption and authentication on the selected data flows. The RAN node 1611 and the S-GW 1622 may utilize an S1-U interface to exchange user plane data via a protocol stack comprising the L1 layer 1911, the L2 layer 1912, the UDP/IP layer 2003, and the GTP-U layer 2004. The S-GW 1622 and the P-GW 1623 may utilize an S5/S8a interface to exchange user plane data via a protocol stack comprising the L1 layer 1911, the L2 layer 19112, the UDP/IP layer 2003, and the GTP-U layer 2004. As discussed above with respect to FIG. 19, NAS protocols support the mobility of the UE 1601 and the session management procedures to establish and maintain IP connectivity between the UE 1601 and the P-GW 1623.

Figure 21:
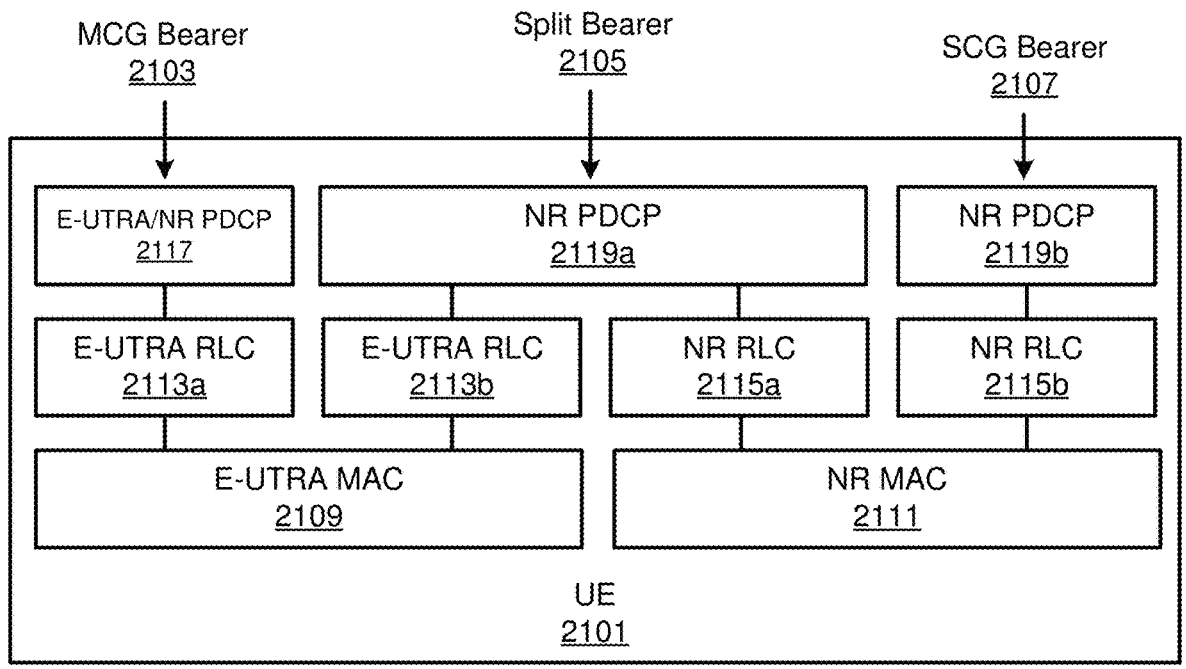
FIG. 21 illustrates an embodiment of a first example radio protocol architecture for a UE.
Figure 22:
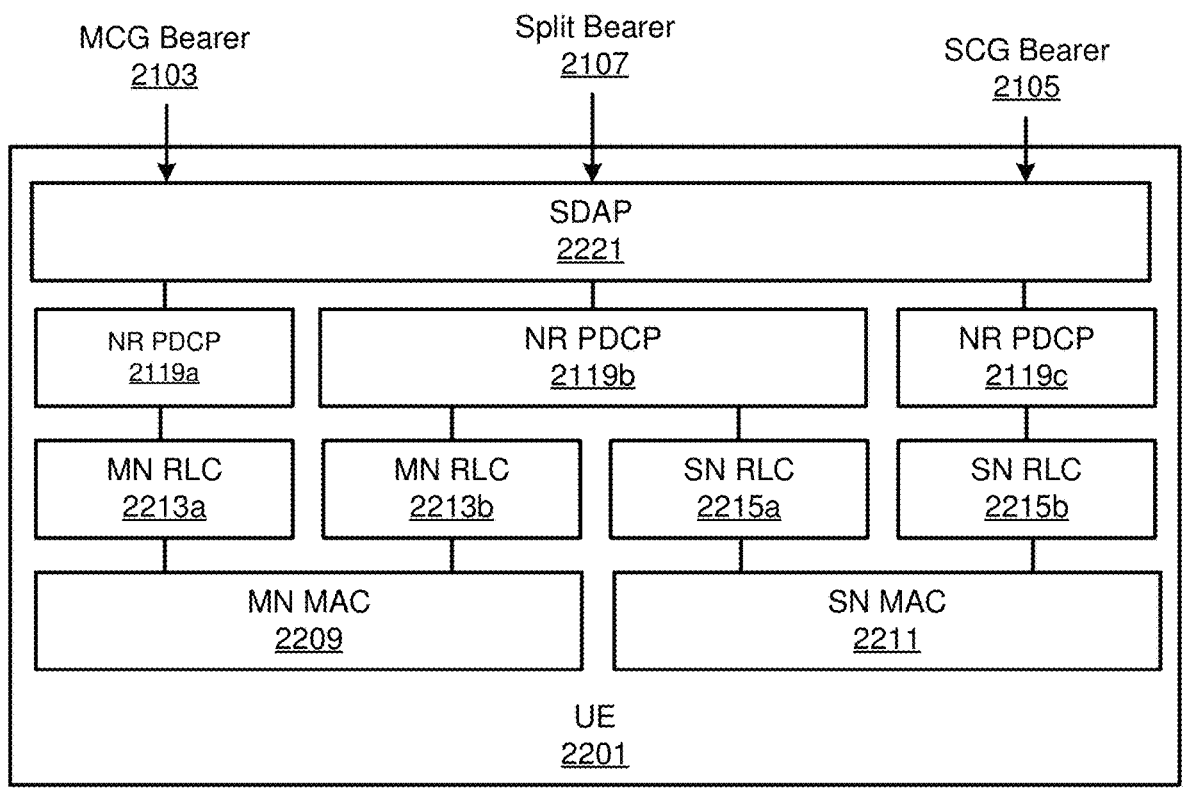
FIG. 22 illustrates an embodiment of a second example radio protocol architecture for a UE.

As described herein, split bearer types can be unified at the UE but separate at the network. Thus, from the UE perspective, only three bearer types exist, MCG bearer, SCG bearer, and split bearer while on the network multiple split bearers can still exist. FIGS. 21-22 depict example radio protocol architectures from the perspective of a UE while FIGS. 23-24 depict example network side protocol termination options, each arranged according to various example embodiment of the present disclosure.

Turning more specifically to FIG. 21, which depicts an example radio protocol architecture 2100 for MCG bearer 2103, SCG bearer 2105 and split bearers 2107 from the perspective of a UE 2101 in MR-DC with EPC (EN-DC). UE 2101 includes an E-UTRA MAC layer 2109 and an NR MAC layer 2111 (e.g., MAC layers 1902). UE 2101 also includes E-UTRA RLC layers 2113*a* and 2113*b* (e.g., RLC layers 1903) as well as NR RLC layers 2115*a* and 2115*b* (e.g., RLC layers 1903). Furthermore, UE 2101 includes an E-UTRA/NR PDCP layer 2117 (e.g., PDCP layers 1904) and NR PDCP layers 2119*a* and 2119*b* (e.g., PDCP layers 1904). During operation, UE 2101 can configure either E-UTRA PDCP 2117 or NR PDCP 2119*a* for MCG bearers while UE 2101 always configures NR PDCP 2119*a* or 2119*b* for SCG and split bearers.

Turning more specifically to FIG. 22, which depicts an example radio protocol architecture 2200 for MCG bearer 2103, SCG bearer 2105 and split bearers 2107 from the perspective of a UE 2201 in MR-DC with 5GC (NGEN-DC or NE-DC). UE 2201 includes an MN MAC layer 2209 and an SN MAC layer 2211 (e.g., MAC layers 1902). UE 2101 also includes MN RLC layers 2213*a* and 2213*b* (e.g., RLC layers 1903) as well as SN RLC layers 2215*a* and 2215*b* (e.g., RLC layers 1903). UE 2201 additionally includes NR PDCP layers 2119*a*, 2119*b*, and 2119*c* (e.g., PDCP layers 1904) as well as SDAP layer 2221. During operation, UE 2201 can always configure NR PDCP 2119 (e.g., 2219*a*, 2119*b*, 2119*c*, etc.) for all bearer types. However, in NGEN-DC, E-UTRA RLC is used for MN RLC 2213 (e.g., 2213*a*, 2213*b*, etc.) and E-UTRA MAC is used for MN MAC 2209 while NR RLC is used for SN RCL (e.g., 2215*a*, 2215*b*, etc.) and NR MAC is used for SN MAC 2211. In NE-DC, NR RLC is used for MN RCL (e.g., 2213*a*, 2213*b*, etc.) and NR MAC is used for MN MAC 2209 while E-UTRA RLC is used for SN RLC 2215 (e.g., 2215*a*, 2215*b*, etc.) and E-UTRA MAC is used for SN MAC 2211.

Figure 23:
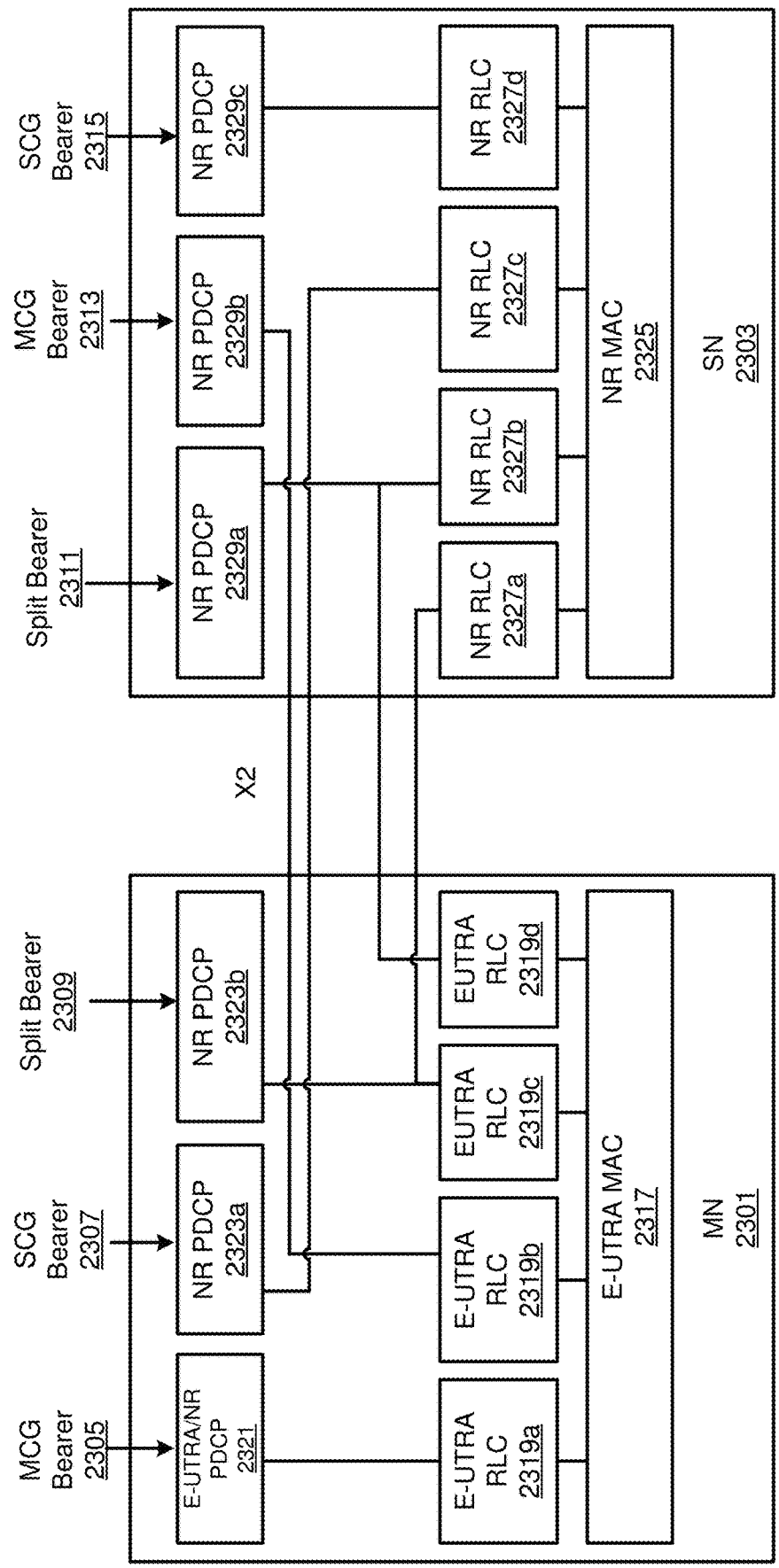
FIG. 23 illustrates an embodiment of first example of bearer termination options on the network side.

Turning more specifically to FIG. 23, which depicts example network side protocol termination options 2300 for an MN terminated MCG bearer 2305, an MN terminated SCG bearer 2307, and MN terminated split bearer 2309, an SN terminated MCG bearer 2311, an SN terminated SCG bearer 2313, and SN terminated split bearer 2315; all from the perspective of MN node 2301 and SN node 2303 in MR-DC with EPC (EN-DC). MN node 2301 includes an E-UTRA MAC layer 2317 (e.g., MAC layers 1902), E-UTRA RLC layers 2319*a*, 2319*b*, 2319*c*, 2319*d* (e.g., RLC layers 1903), an E-UTRA/NR PDCP layer 2321 as well as NR PDCP layers 2323*a* and 2323*b* (e.g. PDCP layers 1904). SN node 2303 includes an NR MAC layer 2325 (e.g., MAC layers 1902), NR RLC layers 2327*a*, 2327*b*, 2327*c*, 2327*d* (e.g., RLC layers 1903), as well as NR PDCP layers 2329*a*, 2329*b* and 2329*c* (e.g. PDCP layers 1904). It is noted, even if only SCG bearers are configured for a UE for DRBs, the logical channels may always be configured at least in the MCG as this is still an MR-DC configuration and a primary cell (Pcell) should always exist. Furthermore, it is noted, if only MCG bearers are configured for a UE (e.g., there is no SCG) this is still considered an MR-DC configuration, as long as at least one of the bearers is terminated in the SN.

Turning more specifically to FIG. 24, which depicts example network side protocol termination options 2400 for an MN terminated MCG bearer 2405, an MN terminated SCG bearer 2407, and MN terminated split bearer 2409, an SN terminated MCG bearer 2411, an SN terminated SCG bearer 2413, and SN terminated split bearer 2415; all from the perspective of MN node 2401 and SN node 2403 in MR-DC with 5GC (NGEN-DC or NE-DC). MN node 2401 includes an MN MAC layer 2417 (e.g., MAC layers 1902), MN RLC layers 2419*a*, 2419*b*, 2419*c*, 2419*d* (e.g., RLC layers 1903), NR PDCP layers 2421*a*, 2421*b*, 2421*c* (e.g., PDCP layers 1904) and SDAP layer 2423. SN node 2403 includes an SN MAC layer 2425 (e.g., MAC layers 1902), SN RLC layers 2427*a*, 2427*b*, 2427*c*, 2427*d* (e.g., RLC layers 1903), NR PDCP layers 2429*a*, 2429*b* and 2429*c* (e.g. PDCP layers 1904) and SDAP layer 2431. It is noted, even if only SCG bearers are configured for a UE for DRBs, the logical channels may always be configured at least in the MCG as this is still an MR-DC configuration and a primary cell (Pcell) should always exist. Furthermore, it is noted, if only MCG bearers are configured for a UE (e.g., there is no SCG) this is still considered an MR-DC configuration, as long as at least one of the bearers is terminated in the SN.

Figure 25:
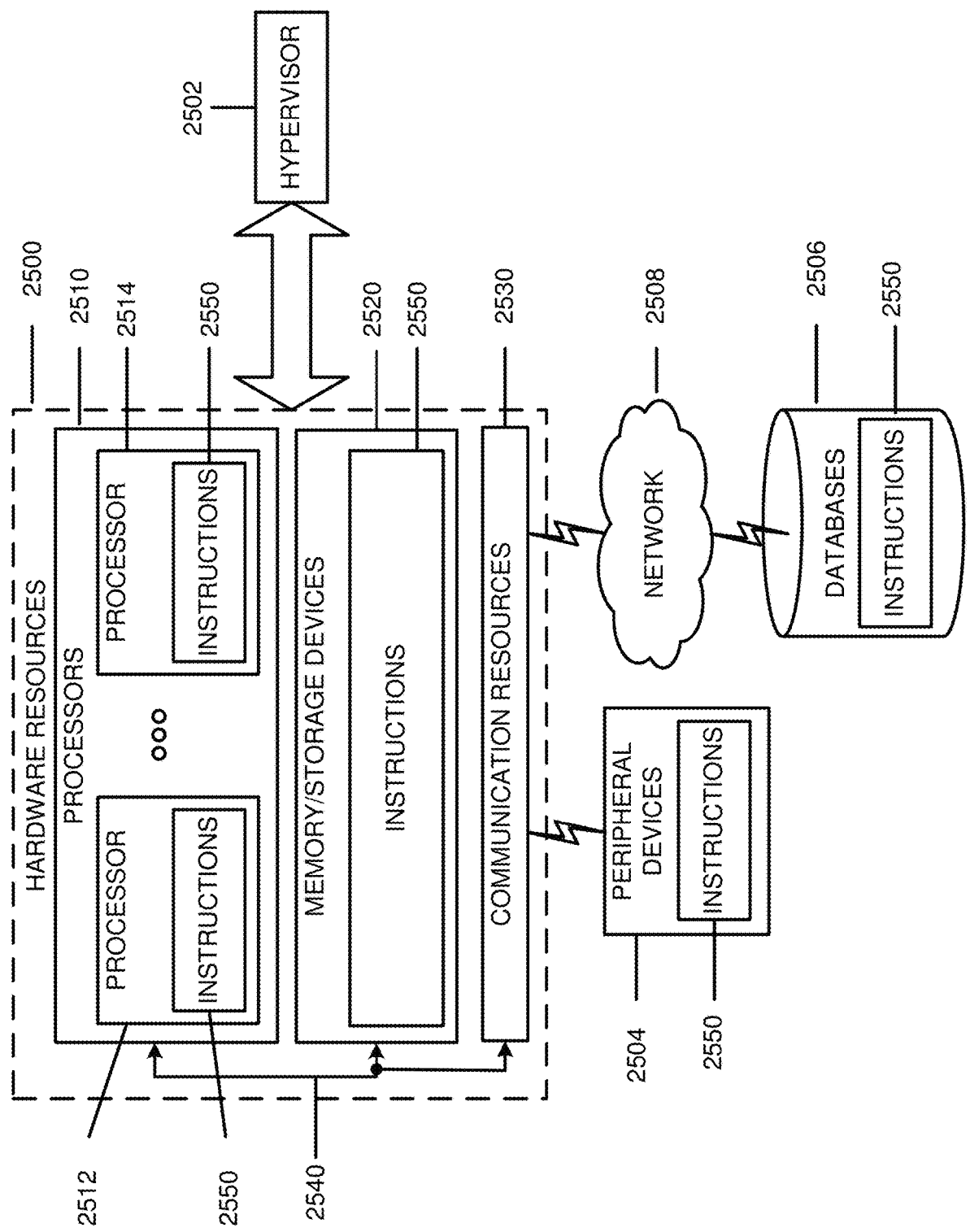
FIG. 25 illustrates an embodiment of a set of hardware resources.

FIG. 25 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 25 shows a diagrammatic representation of hardware resources 2500 including one or more processors (or processor cores) 2510, one or more memory/storage devices 2520, and one or more communication resources 2530, each of which may be communicatively coupled via a bus 2540. For embodiments where node virtualization (e.g., NFV) is utilized, a hypervisor 2502 may be executed to provide an execution environment for one or more network slices/sub-slices to utilize the hardware resources 2500

The processors 2510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2512 and a processor 2514.

The memory/storage devices 2520 may include main memory, disk storage, or any suitable combination thereof. The memory/storage devices 2520 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 2530 may include interconnection or network interface components or other suitable devices to communicate with one or more peripheral devices 2504 or one or more databases 2506 via a network 2508. For example, the communication resources 2530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2550 may comprise software, a program, an application, an applet, an app, or other executable code for causing at least any of the processors 2510 to perform any one or more of the methodologies discussed herein. The instructions 2550 may reside, completely or partially, within at least one of the processors 2510 (e.g., within the processor's cache memory), the memory/storage devices 2520, or any suitable combination thereof. Furthermore, any portion of the instructions 2550 may be transferred to the hardware resources 2500 from any combination of the peripheral devices 2504 or the databases 2506. Accordingly, the memory of processors 2510, the memory/storage devices 2520, the peripheral devices 2504, and the databases 2506 are examples of computer-readable and machine-readable media.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, ASICs, programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following examples pertain to further embodiments:

Example 1. A method, comprising: receiving a radio resource control (RRC) message from a master node (MN), the RRC message comprising indications of at least one of a radio bearer (RB) configuration for a master cell group (MCG), a RB configuration for a secondary cell group (SCG), or a packet data convergence protocol (PDCP) configuration; configuring, based on the at least one of the RB configuration for the MCG, the RB configuration for the SCG, or the PDCP configuration of the RRC message, at least one component of a layer stack; and establishing, using the layer stack, communication with the MN in the MCG and a secondary node (SN) in the SCG, where data to or from the UE can be split and communicated to or from the UE via either the MN or the SN.

Example 2. The method of example 1, the RRC message comprising at least one PDCP container, the at least one PDCP container to include indications of the PDCP configuration for the UE to communicatively couple to both the MN and the SN in either an MN bearer, an MN split bearer, an SN bearer, an SN split bearer, an MN terminated SCG bearer, or an SN terminated MCG bearer.

Example 3. The method of example 2, the at least one PDCP container to be generated by the MN and to include PDCP configuration information for the MN bearer, the MN split bearer, or the MN terminated SCG bearer.

Example 4. The method of example 2, the at least one PDCP container to be generated by the SN and to include PDCP configuration information for the SN bearer, the SN split bearer, or the SN terminated MCG bearer.

Example 5. The method of example 2, the at least one PDCP container to comprise an indication of a security key or algorithm, the method comprising securing the communication with the MN and the SN based at least in part on the security key or algorithm.

Example 6. The method of example 1, the RRC message comprising an SCG configuration container, the SCG configuration container to include indications of the RB configuration for the SCG.

Example 7. The method of example 1, configuring at least one component of the layer stack comprising adding or deleting at least one of an RLC layer or a MAC layer of the layer stack to change from a first bearer type to a second bearer type.

Example 8. The method of example 7, wherein the first bearer type is an MN bearer, an MN split bearer, an MN terminated SCG bearer, an SN bearer, an SN split bearer, or an SN terminated MCG bearer and wherein the second bearer type is an MN bearer, an MN split bearer, an MN terminated SCG bearer, an SN bearer, an SN split bearer, or an SN terminated MCG bearer different than the first bearer type.

Example 9. The method of any one of examples 1 to 8, the MN an evolved node B (eNB) of a long term evolution radio access network (LTE-RAN) cell and the SN a next generation node B (gNB) of a next generation radio access network (NG-RAN) cell, the RRC message to be received from the eNB.

Example 10. The method of any one of examples 1 to 8, the MN a next generation node B (gNB) of a next generation radio access network (NG-RAN) cell and the SN an evolved node B (eNB) of a long term evolution radio access network (LTE-RAN) cell, the RRC message to be received from the gNB.

Example 11. The method of any one of examples 1 to 8, the MN an evolved node B (eNB) of a long term evolution radio access network (LTE-RAN) cell coupled to a next generation (5G) core network.

Example 12. The method of any one of examples 1 to 8, where the SCG is a small cell.

Example 13. An apparatus, comprising: a memory interface; and circuitry for user equipment (UE), the circuitry to perform the method of any one of examples 1 to 12.

Example 14. A device, comprising: the apparatus of example 13; one or more application processors; radio frequency (RF) circuitry; and one or more RF antennas.

Example 15. User equipment (UE), comprising: radio frequency (RF) circuitry; and baseband circuitry coupled to the RF circuitry, the baseband circuitry to perform the method of any one of examples 1 to 12.

Example 16. At least one computer-readable storage medium having stored thereon instructions that, when executed by processing circuitry of user equipment (UE), cause the UE to perform the method of any one of examples 1 to 12.

Example 17. An apparatus, comprising means for performing the method of any one of examples 1 to 12.

Example 18. User equipment (UE), comprising: the apparatus of example 17; one or more application processors; radio frequency (RF) circuitry; and one or more RF antennas.

Example 19. A method, comprising: generating, at a master node (MN) of a master cell group (MCG), a radio resource control (RRC) message, the RRC message comprising indications of at least one of a radio bearer (RB) configuration for the MCG, a RB configuration for a secondary cell group (SCG), or a packet data convergence protocol (PDCP) configuration; sending the RRC message to a user equipment (UE) to cause the UE to configure at least one component of a layer stack of the UE based on the at least one of the RB configuration for the MCG, the RB configuration for the SCG, or the PDCP configuration of the RRC message; and establishing communication with the UE and a secondary node (SN) in the SCG, where data to or from the UE can be split and communicated to or from the UE via either the MN or the SN.

Example 20. The method of example 19, the RRC message comprising at least one PDCP container, the at least one PDCP container to include indications of the PDCP configuration for the UE to communicatively couple to both the MN and the SN in either an MN bearer, an MN split bearer, an SN bearer, an SN split bearer, an MN terminated SCG bearer, or an SN terminated MCG bearer.

Example 21. The method of example 20, comprising generating, at the MN, the at least one PDCP container to include PDCP configuration information for the MN bearer, the MN split bearer, or the MN terminated SCG bearer.

Example 22. The method of example 20, comprising receiving, from the SN, the at least one PDCP container, the at least one PDCP container to include PDCP configuration information for the SN bearer, the SN split bearer, or the SN terminated MCG bearer.

Example 23. The method of example 20, the at least one PDCP container to comprise an indication of a security key or algorithm, the UE to secure the communication with the MN and the SN based at least in part on the security key or algorithm.

Example 24. The method of example 19, comprising: receiving, from the SN, an SCG configuration container, the SCG configuration container to include indications of the RB configuration for the SCG; and generating the RRC message to include the SCG configuration container.

Example 24. The method of example 19, the RRC message to cause the UE to configure at least one component of the layer stack of the UE comprising adding or deleting at least one of an RLC layer or a MAC layer of the layer stack to change from a first bearer type to a second bearer type.

Example 25. The method of example 24, wherein the first bearer type is an MN bearer, an MN split bearer, an MN terminated SCG bearer, an SN bearer, an SN split bearer, or an SN terminated MCG bearer and wherein the second bearer type is an MN bearer, an MN split bearer, an MN terminated SCG bearer, an SN bearer, an SN split bearer, or an SN terminated MCG bearer different than the first bearer type.

Example 26. The method of any one of examples 19 to 25, the MN an evolved node B (eNB) of a long term evolution radio access network (LTE-RAN) cell and the SN a next generation node B (gNB) of a next generation radio access network (NG-RAN) cell, the RRC message to be received from the eNB.

Example 27. The method of any one of examples 19 to 25, the MN a next generation node B (gNB) of a next generation radio access network (NG-RAN) cell and the SN an evolved node B (eNB) of a long term evolution radio access network (LTE-RAN) cell, the RRC message to be received from the gNB.

Example 28. The method of any one of examples 19 to 25, the MN an evolved node B (eNB) of a long term evolution radio access network (LTE-RAN) cell coupled to a next generation (5G) core network.

Example 29. The method of any one of examples 19 to 25, where the SCG is a small cell.

Example 30. An apparatus, comprising: a memory interface; and circuitry for a node (NB), the circuitry to perform the method of any one of examples 19 to 29.

Example 31. A device, comprising: the apparatus of example 30; one or more application processors; radio frequency (RF) circuitry; and one or more RF antennas.

Example 32. A node (NB), comprising: radio frequency (RF) circuitry; and baseband circuitry coupled to the RF circuitry, the baseband circuitry to perform the method of any one of examples 19 to 29.

Example 33. At least one computer-readable storage medium having stored thereon instructions that, when executed by processing circuitry of a node (NB), cause the NB to perform the method of any one of examples 19 to 29.

Example 34. An apparatus, comprising means for performing the method of any one of examples 19 to 29.

Example 35. A node (NB), comprising: the apparatus of example 34; one or more application processors; radio frequency (RF) circuitry; and one or more RF antennas.

Example 36. A method, comprising: generating, at a secondary node (SN) of a secondary cell group (SCG), at least one of a PDCP container to include indications of a packet data convergence protocol (PDCP) configuration or an SCG configuration container to include indication of a radio bearer (RB) configuration for the SCG; sending the at least one of the PDCP container or the SCG configuration container to a master node (MN) of a master cell group (MCG), the MN to generate a radio resource control (RRC) message for a user equipment (UE) to include a RB configuration for the MCG and the at least one of the PDCP container or the SCG configuration container, the RRC message to cause the UE to configure at least one component of a layer stack of the UE based on the RB configuration for the MCG and that at least one the RB configuration for the SCG or the PDCP configuration; and establishing communication with the UE and the MN, where data to or from the UE can be split and communicated to or from the UE via either the MN or the SN.

Example 37. The method of example 36, the RRC message comprising the PDCP container, the at least one PDCP container to include indications of the PDCP configuration for the UE to communicatively couple to both the MN and the SN in either an MN bearer, an MN split bearer, an SN bearer, an SN split bearer, an MN terminated SCG bearer, or an SN terminated MCG bearer.

Example 38. The method of example 36, comprising generating, at the SN, the PDCP container to include PDCP configuration information for the SN bearer, the SN split bearer, or the SN terminated MCG bearer.

Example 39. The method of 36, the PDCP container to comprise an indication of a security key or algorithm, the UE to secure the communication with the MN and the SN based at least in part on the security key or algorithm.

Example 40. The method of example 36, the RRC message to cause the UE to configure at least one component of the layer stack of the UE comprising adding or deleting at least one of an RLC layer or a MAC layer of the layer stack to change from a first bearer type to a second bearer type.

Example 41. The method of example 40, wherein the first bearer type is an MN bearer, an MN split bearer, an MN terminated SCG bearer, an SN bearer, an SN split bearer, or an SN terminated MCG bearer and wherein the second bearer type is an MN bearer, an MN split bearer, an MN terminated SCG bearer, an SN bearer, an SN split bearer, or an SN terminated MCG bearer different than the first bearer type.

Example 42. The method of any one of examples 36 to 40, the MN an evolved node B (eNB) of a long term evolution radio access network (LTE-RAN) cell and the SN a next generation node B (gNB) of a next generation radio access network (NG-RAN) cell, the RRC message to be received from the eNB.

Example 43. The method of any one of examples 36 to 40, the MN a next generation node B (gNB) of a next generation radio access network (NG-RAN) cell and the SN an evolved node B (eNB) of a long term evolution radio access network (LTE-RAN) cell, the RRC message to be received from the gNB.

Example 44. The method of any one of examples 36 to 40, the MN an evolved node B (eNB) of a long term evolution radio access network (LTE-RAN) cell coupled to a next generation (5G) core network.

Example 45. The method of any one of examples 36 to 40, where the SCG is a small cell.

Example 46. An apparatus, comprising: a memory interface; and circuitry for a node (NB), the circuitry to perform the method of any one of examples 36 to 45.

Example 47. A device, comprising: the apparatus of example 46; one or more application processors; radio frequency (RF) circuitry; and one or more RF antennas.

Example 48. A node (NB), comprising: radio frequency (RF) circuitry; and baseband circuitry coupled to the RF circuitry, the baseband circuitry to perform the method of any one of examples 36 to 45.

Example 49. At least one computer-readable storage medium having stored thereon instructions that, when executed by processing circuitry of a node (NB), cause the NB to perform the method of any one of examples 36 to 45.

Example 50. An apparatus, comprising means for performing the method of any one of examples 36 to 45.

Example 51. A node (NB), comprising: the apparatus of example 50; one or more application processors; radio frequency (RF) circuitry; and one or more RF antennas.

Example 52. An apparatus, comprising: a memory interface to store a radio resource control (RRC) message; and circuitry for user equipment (UE), the circuitry to: receive the RRC message from a master node (MN), the RRC message comprising indications of at least one of a radio bearer (RB) configuration for a master cell group (MCG), a RB configuration for a secondary cell group (SCG), or a packet data convergence protocol (PDCP) configuration; configure, based on the at least one of the RB configuration for the MCG, the RB configuration for the SCG, or the PDCP configuration of the RRC message, at least one component of a layer stack to enable communication with the MN in the MCG and a secondary node (SN) in the SCG, where data to or from the UE can be split and communicated to or from the UE via either the first MN or the SN.

Example 53. The apparatus of example 52, the RRC message comprising at least one PDCP container, the at least one PDCP container to include indications of the PDCP configuration for the UE to communicatively couple to both the MN and the SN in either an MN bearer, an MN split bearer, an SN bearer, an SN split bearer, an MN terminated SCG bearer, or an SN terminated MCG bearer.

Example 54. The apparatus of example 53, the at least one PDCP container to be generated by the MN and to include PDCP configuration information for the MN bearer, the MN split bearer, or the MN terminated SCG bearer.

Example 55. The apparatus of example 53, the at least one PDCP container to be generated by the SN and to include PDCP configuration information for the SN bearer, the SN split bearer, or the SN terminated MCG bearer.

Example 56. The apparatus of example 53, the MN an evolved node B (eNB) of a long term evolution radio access network (LTE-RAN) cell and the SN a next generation node B (gNB) of a next generation radio access network (NG-RAN) cell, the RRC message to be received from the eNB.

Example 57. The apparatus of example 53, the MN a next generation node B (gNB) of a next generation radio access network (NG-RAN) cell and the SN an evolved node B (eNB) of a long term evolution radio access network (LTE-RAN) cell, the RRC message to be received from the gNB.

Example 58. The apparatus of example 53, the MN an evolved node B (eNB) of a long term evolution radio access network (LTE-RAN) cell coupled to a next generation (5G) core network.

Example 59. The apparatus of example 53, the RRC message to comprise an SCG configuration container, the SCG configuration container to include indications of the RB configuration for the SCG.

Example 60. The apparatus of example 59, the SCG container to be generated by the SN and to include the RB configuration for the SCG for the SN bearer, the SN split bearer, or the SN terminated MCG bearer.

Example 61. The apparatus of any one of example 53 to 60, the at least one PDCP container to comprise an indication of a security key or algorithm, the circuitry to configure a PDCP component of the layer stack to apply security based in part on the security key or algorithm.

Example 62. The apparatus of example 52, the circuitry to configure at least one component of the layer stack comprising adding or deleting at least one of an RLC layer or a MAC layer of the layer stack to change from a first bearer type to a second bearer type.

Example 63. The apparatus of example 62, wherein the first bearer type is an MN bearer, an MN split bearer, an MN terminated SCG bearer, an SN bearer, an SN split bearer, or an SN terminated MCG bearer and wherein the second bearer type is an MN bearer, an MN split bearer, an MN terminated SCG bearer, an SN bearer, an SN split bearer, or an SN terminated MCG bearer different than the first bearer type.

Example 64. A device, comprising: the apparatus of example 52; one or more application processors; radio frequency (RF) circuitry; and one or more RF antennas.

Example 65. User equipment (UE), comprising: radio frequency (RF) circuitry; and baseband circuitry coupled to the RF circuitry, the baseband circuitry to: receive, via the RF circuitry, a radio resource control (RRC) message from a master node (MN), the RRC message comprising indications of at least one of a radio bearer (RB) configuration for a master cell group (MCG), a RB configuration for a secondary cell group (SCG), or a packet data convergence protocol (PDCP) configuration; and establish, based on the at least one of the RB configuration for the MCG, the RB configuration for the SCG, or the PDCP configuration of the RRC message, communication with the MN in the MCG and a secondary node (SN) in the SCG, where data to or from the UE can be split and communicated to or from the UE via either the MN or the SN.

Example 66. The UE of example 65, the RRC message comprising at least one PDCP container, the at least one PDCP container to include indications of the PDCP configuration for the UE to communicatively couple to both the MN and the SN in either an MN bearer, an MN split bearer, an SN bearer, an SN split bearer, an MN terminated SCG bearer, or an SN terminated MCG bearer.

Example 67. The UE of example 66, the at least one PDCP container to be generated by the MN and to include PDCP configuration information for the MN bearer, the MN split bearer, or the MN terminated SCG bearer.

Example 68. The UE of example 66, the at least one PDCP container to be generated by the SN and to include PDCP configuration information for the SN bearer, the SN split bearer, or the SN terminated MCG bearer.

Example 69. The UE of example 66, the MN an evolved node B (eNB) of a long term evolution radio access network (LTE-RAN) cell and the SN a next generation node B (gNB) of a next generation radio access network (NG-RAN) cell, the RRC message to be received from the eNB.

Example 70. The UE of example 66, the MN a next generation node B (gNB) of a next generation radio access network (NG-RAN) cell and the SN an evolved node B (eNB) of a long term evolution radio access network (LTE-RAN) cell, the RRC message to be received from the gNB.

Example 71. The UE of example 65, the at least one PDCP container to comprise an indication of a security key or algorithm, the baseband circuitry to secure the communication based at least in part on the security key or algorithm.

Example 72. At least one computer-readable storage medium having stored thereon instructions that, when executed by processing circuitry of user equipment (UE), cause the UE to: receive a radio resource control (RRC) message from a master node (MN), the RRC message comprising indications of at least one of a radio bearer (RB) configuration for a master cell group (MCG), a RB configuration for a secondary cell group (SCG), or a packet data convergence protocol (PDCP) configuration; configure, based on the at least one of the RB configuration for the MCG, the RB configuration for the SCG, or the PDCP configuration of the RRC message, at least one component of a layer stack; and establish, using the layer stack, communication with the MN in the MCG and a secondary node (SN) in the SCG, where data to or from the UE can be split and communicated to or from the UE via either the MN or the SN.

Example 73. The at least one computer-readable storage medium of example 72, the RRC message comprising at least one PDCP container, the at least one PDCP container to include indications of the PDCP configuration for the UE to communicatively couple to both the MN and the SN in either an MN bearer, an MN split bearer, an SN bearer, an SN split bearer, an MN terminated SCG bearer, or an SN terminated MCG bearer.

Example 74. The at least one computer-readable storage medium of example 73, the at least one PDCP container to be generated by the MN and to include PDCP configuration information for the MN bearer, the MN split bearer, or the MN terminated SCG bearer.

Example 75. The at least one computer-readable storage medium of example 73, the at least one PDCP container to be generated by the SN and to include PDCP configuration information for the SN bearer, the SN split bearer, or the SN terminated MCG bearer.

Example 76. The at least one computer-readable storage medium of example 73, the at least one PDCP container to comprise an indication of a security key or algorithm, the instructions when executed by the processing circuitry, cause the UE to secure the communication based at least in part on the security key or algorithm.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It should be noted that the methods described herein do not necessarily have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided merely to allow the reader to ascertain the general nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are m expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A baseband processor of a user equipment (UE) comprising:
   a memory; and
   processing circuitry configured to:
      receive a radio resource control (RRC) message from a master node (MN), wherein the RRC message includes a master cell group (MCG) radio bearer (RB) configuration, wherein the MCG RB configuration encapsulates a first container comprising a secondary cell group (SCG) configuration and wherein the SCG configuration includes at least one packet data convergence protocols (PDCP) container comprising a packet data convergence protocol (PDCP) configuration for a split bearer to communicatively couple to both the MN and a secondary node (SN) in the SCG, wherein the PDCP configuration includes an independent split bearer key or an indication of which security key to use for the split bearer, either an MN key or an SN key; and
      configure, based on the RRC message, at least one component of a layer stack to enable communication with the MN in the MCG and the SN in the SCG, where data to or from the UE is split and communicated to or from the UE via either the MN or the SN.

2. The baseband processor of claim 1, the RRC message comprising the at least one PDCP container, the at least one PDCP container to include indications of the PDCP configuration for the UE to communicatively couple to both the MN and the SN in either an MN bearer, an MN split bearer, an SN bearer, an SN split bearer, an MN terminated SCG bearer, or an SN terminated MCG bearer.

3. The baseband processor of claim 2, the at least one PDCP container to be generated by the MN and to include PDCP configuration information for the MN bearer, the MN split bearer, or the MN terminated SCG bearer.

4. The baseband processor of claim 2, the at least one PDCP container to be generated by the SN and to include PDCP configuration information for the SN bearer, the SN split bearer, or the SN terminated MCG bearer.

5. The baseband processor of claim 2, the MN an evolved node B (eNB) of a long term evolution radio access network (LTE-RAN) cell and the SN a next generation node B (gNB) of a next generation radio access network (NG-RAN) cell, the RRC message to be received from the eNB.

6. The baseband processor of claim 2, the MN a next generation node B (gNB) of a next generation radio access network (NG-RAN) cell and the SN an evolved node B (eNB) of a long term evolution radio access network (LTE-RAN) cell, the RRC message to be received from the gNB.

7. The baseband processor of claim 2, the MN an evolved node B (eNB) of a long term evolution radio access network (LTE-RAN) cell coupled to a next generation (5G) core network.

8. The baseband processor of claim 2, the RRC message to comprise an SCG configuration container, the SCG configuration container to include indications of the RB configuration for the SCG.

9. The baseband processor of claim 8, the SCG configuration container to be generated by the SN and to include the RB configuration for the SCG for the SN bearer, the SN split bearer, or the SN terminated MCG bearer.

10. The baseband processor of claim 2, the processing circuitry to configure a PDCP component of the layer stack to apply security based in part on the security key.

11. The baseband processor of claim 1, the processing circuitry to configure at least one component of the layer stack comprising adding or deleting at least one of an RLC layer or a MAC layer of the layer stack to change from a first bearer type to a second bearer type.

12. The baseband processor of claim 11, wherein the first bearer type is an MN bearer, an MN split bearer, an MN terminated SCG bearer, an SN bearer, an SN split bearer, or an SN terminated MCG bearer and wherein the second bearer type is an MN bearer, an MN split bearer, an MN terminated SCG bearer, an SN bearer, an SN split bearer, or an SN terminated MCG bearer different than the first bearer type.

13. User equipment (UE), comprising:
   radio frequency (RF) circuitry; and
   baseband circuitry coupled to the RF circuitry, the baseband circuitry to:
      receive, via the RF circuitry, a radio resource control (RRC) message from a master node (MN), wherein the RRC message includes a master cell group (MCG) radio bearer (RB) configuration comprising a secondary cell group (SCG) configuration encapsulated in a first container, wherein the SCG configuration includes an at least one packet data convergence protocols (PDCP) container comprising a PDCP configuration for a split bearer to communicatively couple to both the MN and a secondary node (SN) in the SCG, wherein the PDCP configuration includes an independent split bearer key or an indication of which security key to use for the split bearer, either an MN key or an SN key; and establish, based on the RRC message, communication with the MN in the MCG and the SN in the SCG, where data to or from for the UE is split and communicated to or from the UE via either the MN or the SN.

14. The UE of claim 13, the RRC message comprising at least one PDCP container, the at least one PDCP container to include indications of the PDCP configuration for the UE to communicatively couple to both the MN and the SN in either an MN bearer, an MN split bearer, an SN bearer, an SN split bearer, an MN terminated SCG bearer, or an SN terminated MCG bearer.

15. The UE of claim 14, the at least one PDCP container to be generated by the MN and to include PDCP configuration information for the MN bearer, the MN split bearer, or the MN terminated SCG bearer.

16. The UE of claim 14, the at least one PDCP container to be generated by the SN and to include PDCP configuration information for the SN bearer, the SN split bearer, or the SN terminated MCG bearer.

17. The UE of claim 14, the MN an evolved node B (eNB) of a long term evolution radio access network (LTE-RAN) cell and the SN a next generation node B (gNB) of a next generation radio access network (NG-RAN) cell, the RRC message to be received from the eNB.

18. The UE of claim 14, the MN a next generation node B (gNB) of a next generation radio access network (NG-RAN) cell and the SN an evolved node B (eNB) of a long term evolution radio access network (LTE-RAN) cell, the RRC message to be received from the gNB.

19. The UE of claim 14, the at least one PDCP container to comprise the indication of the security key, the baseband circuitry to secure the communication based at least in part on the security key or an algorithm.

20. At least one non-transitory computer-readable storage medium having stored thereon instructions that, when executed by processing circuitry of user equipment (UE), cause the UE to:

receive a radio resource control (RRC) message from a master node (MN), wherein the RRC message comprises a master cell group (MCG) radio bearer (RB) configuration, wherein the MCG RB configuration encapsulates a first container comprising a secondary cell group (SCG) configuration and wherein the SCG configuration includes at least one packet data convergence protocols (PDCP) container comprising a packet data convergence protocol (PDCP) configuration for a split bearer to communicatively couple to both the MN and a secondary node (SN) in the SCG, wherein the PDCP configuration includes an independent split bearer key or an indication of which security key to use for the split bearer, either an MN key or an SN key;

configure, based on the RRC message, at least one component of a layer stack; and establish, using the layer stack, communication with the MN in the MCG and a secondary node (SN) in the SCG, where data to or from the UE is split and communicated to or from the UE via either the MN or the SN.

21. The at least one non-transitory computer-readable storage medium of claim 20, the RRC message comprising at least one PDCP container, the at least one PDCP container to include indications of the PDCP configuration for the UE to communicatively couple to both the MN and the SN in either an MN bearer, an MN split bearer, an SN bearer, an SN split bearer, an MN terminated SCG bearer, or an SN terminated MCG bearer.

22. The at least one non-transitory computer-readable storage medium of claim 21, the at least one PDCP container to be generated by the MN and to include PDCP configuration information for the MN bearer, the MN split bearer, or the MN terminated SCG bearer.

23. The at least one non-transitory computer-readable storage medium of claim 21, the at least one PDCP container to be generated by the SN and to include PDCP configuration information for the SN bearer, the SN split bearer, or the SN terminated MCG bearer.

24. The at least one non-transitory computer-readable storage medium of claim 21, the at least one PDCP container to comprise the indication of the security key, the instructions when executed by the processing circuitry, cause the UE to secure the communication based at least in part on the security key.

* * * * *